United States Patent

Fujishiro et al.

[11] Patent Number: 5,902,534
[45] Date of Patent: *May 11, 1999

[54] METHOD OF INJECTION-MOLDING THERMOPLASTIC RESINS

[75] Inventors: Takeshi Fujishiro; Toshiaki Izumida; Kazuyuki Akahori, all of Hiratsuka; Yoshiaki Yamamoto, Komaki, all of Japan

[73] Assignees: Mitsubishi Engineering-Plastics Corp.; Dai Nippon Toryo Co., Ltd., both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/523,554

[22] Filed: Sep. 5, 1995

[30] Foreign Application Priority Data

Sep. 21, 1994 [JP] Japan .................................. 6-253073
Sep. 22, 1994 [JP] Japan .................................. 6-254799

[51] Int. Cl.$^6$ .............................. B29B 33/20; B29B 33/56
[52] U.S. Cl. ................... 264/255; 264/328.7; 264/328.8; 425/130; 425/575
[58] Field of Search ................................ 264/255, 328.8, 264/328.7; 425/130, 575

[56] References Cited

U.S. PATENT DOCUMENTS 4,076,788  2/1978  Ditto ....................... 264/255
4,668,460  5/1987  Ongena ................... 264/255

FOREIGN PATENT DOCUMENTS 5-301251  11/1993  Japan .
5-318527  12/1993  Japan .

*Primary Examiner*—Jill L. Heitbrink
*Assistant Examiner*—Suzanne E. Mason
*Attorney, Agent, or Firm*—Wenderoth, Lind & Ponack, L.L.P.

[57] ABSTRACT

A method of injection-molding a thermoplastic resin, which involves the steps of (a) injecting a molten resin of a thermoplastic resin into a cavity provided in a mold composed of a fixed mold member and a movable mold member, (b) introducing a predetermined amount of a coating material into between the resin in the cavity and the cavity wall after the injection of the molten resin is completed, to allow the resin in the cavity to be compressed with the introduced coating material and/or to allow the movable mold member to move in the mold-opening direction, and (c) maintaining a molding pressure before the mold releasing at a level higher than 0 kgf/cm$^2$.

13 Claims, 33 Drawing Sheets

Fig. 1

[VOLUME CHANGE IN CAVITY, RESIN AND COATING MATERIAL]

(1) IMMEDIATELY BEFORE INJECTION OF MOLTEN RESIN

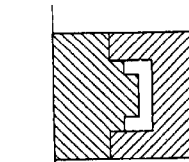

$v_{C0}$ (2) COMPLETION OF INJECTION OF MOLTEN RESIN

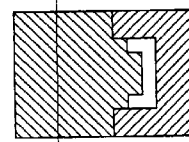

$v_{C0} + \Delta v_{C0}$ (3) COMPLETION OF LOW-PRESSURE CLAMPING OPERATION OR COMPLETION OF MOVABLE MOLD MEMBER SPACING OPERATION

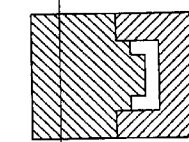

$v_{C0} + \Delta v_{C1}$ (4) IMMEDIATELY AFTER INTRODUCTION OF COATING MATERIAL $v_{R3}$
$v_{F0}$

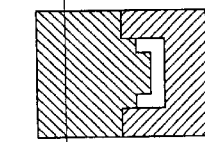

$v_{C0} + \Delta v_{C3}$

MOVABLE MOLD MEMBER (5) IMMEDIATELY BEFORE MOLD RELEASING $v_{R4}$
$v_{F4}$

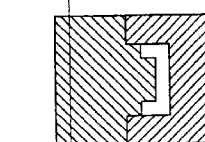

$v_{C0} + \Delta v_{C4}$

FIXED MOLD MEMBER

STANDARD LINE

[FIRST EMBODIMENT OF THE INVENTION]
HIGH-PRESSURE CLAMPING OPERATION
CHANGE OF MOLDING PRESSURE WITH TIME

PVT CHART

[FIRST EMBODIMENT OF THE INVENTION]
HIGH-PRESSURE CLAMPING OPERATION

[ FIRST EMBODIMENT OF THE INVENTION ]
LOW-PRESSURE CLAMPING OPERATION

CHANGE OF MOLDING PRESSURE WITH TIME

PVT CHART

[FIRST EMBODIMENT OF THE INVENTION]
LOW-PRESSURE CLAMPING OPERATION

[ FIRST EMBODIMENT OF THE INVENTION ]
MOVABLE MOLD MEMBER SPACING OPERATION

CHANGE OF MOLDING PRESSURE WITH TIME

PVT CHART

[FIRST EMBODIMENT OF THE INVENTION]
MOVABLE MOLD MEMBER SPACING OPERATION

CHANGE OF MOLDING PRESSURE WITH TIME

PVT CHART

[ FIRST EMBODIMENT OF THE INVENTION ]
MOVABLE MOLD MEMBER SPACING OPERATION

CHANGE OF MOLDING PRESSURE WITH TIME

PVT CHART

[ SECOND EMBODIMENT OF THE INVENTION ]
HIGH-PRESSURE CLAMPING OPERATION

CHANGE OF MOLDING PRESSURE WITH TIME

PVT CHART

[SECOND EMBODIMENT OF THE INVENTION]
LOW-PRESSURE CLAMPING OPERATION

CHANGE OF MOLDING PRESSURE WITH TIME

PVT CHART

[SECOND EMBODIMENT OF THE INVENTION]
MOVABLE MOLD MEMBER SPACING OPERATION

CHANGE OF MOLDING PRESSURE WITH TIME

PVT CHART

EXAMPLE 2

EXAMPLE 3

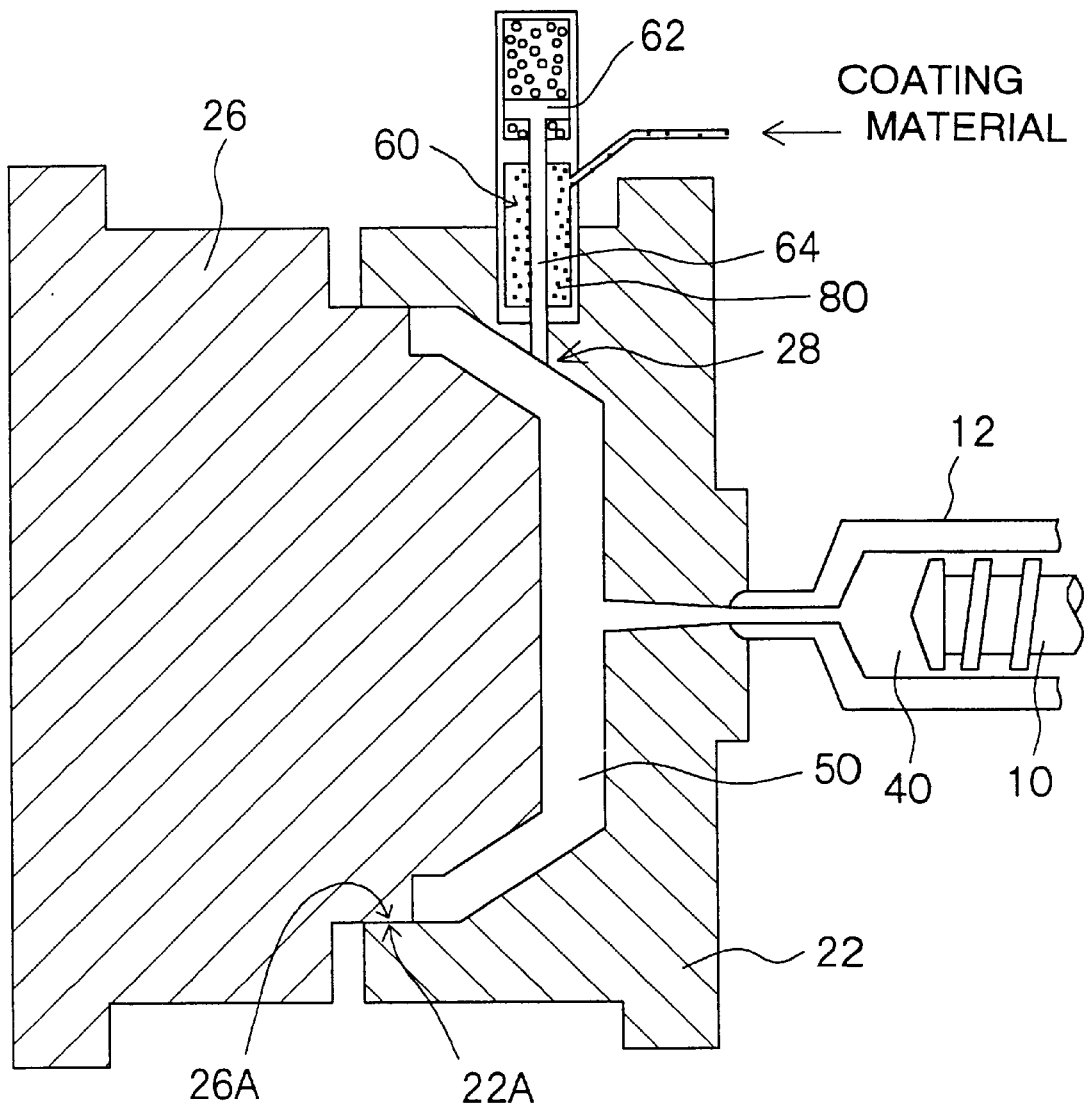

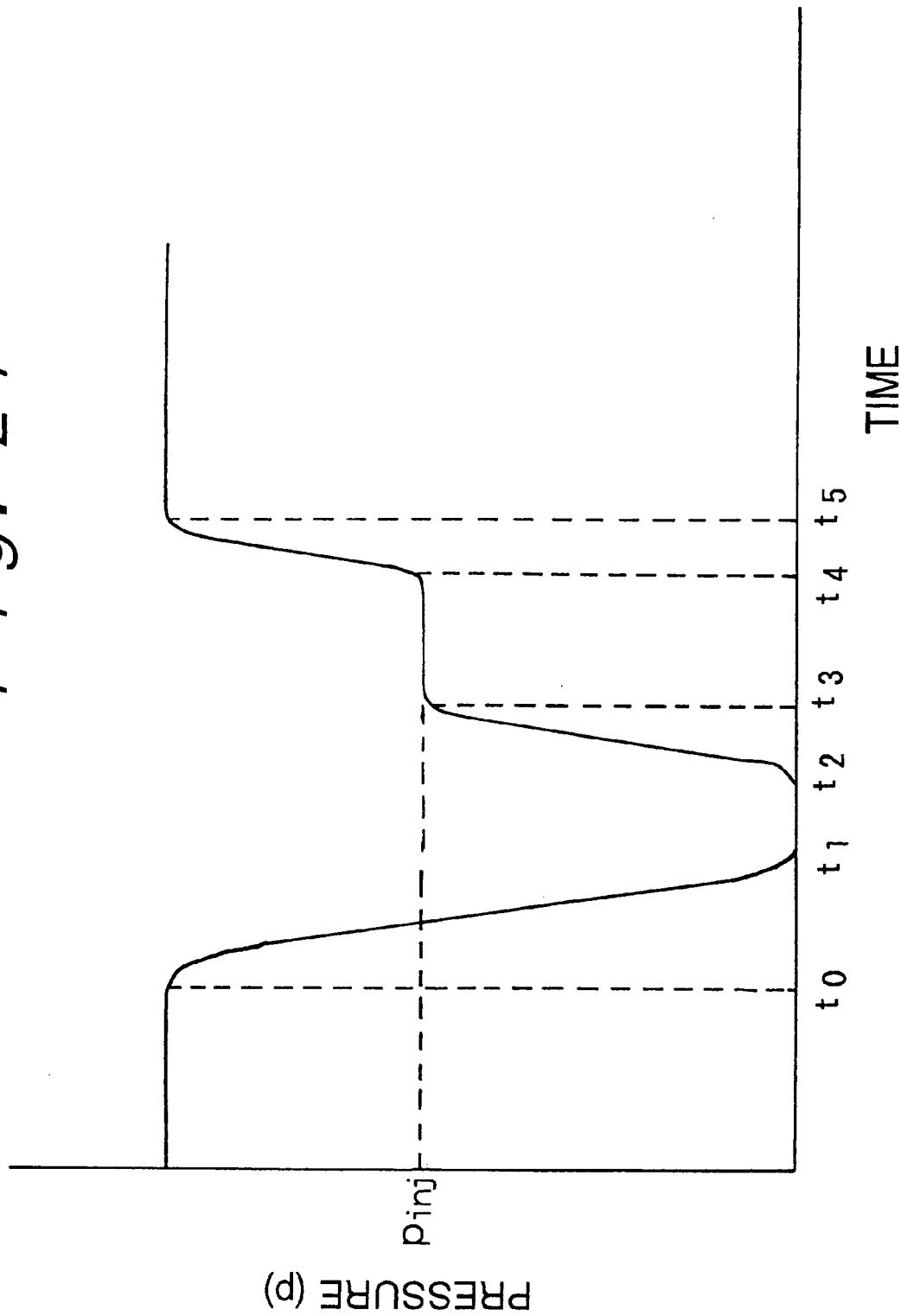

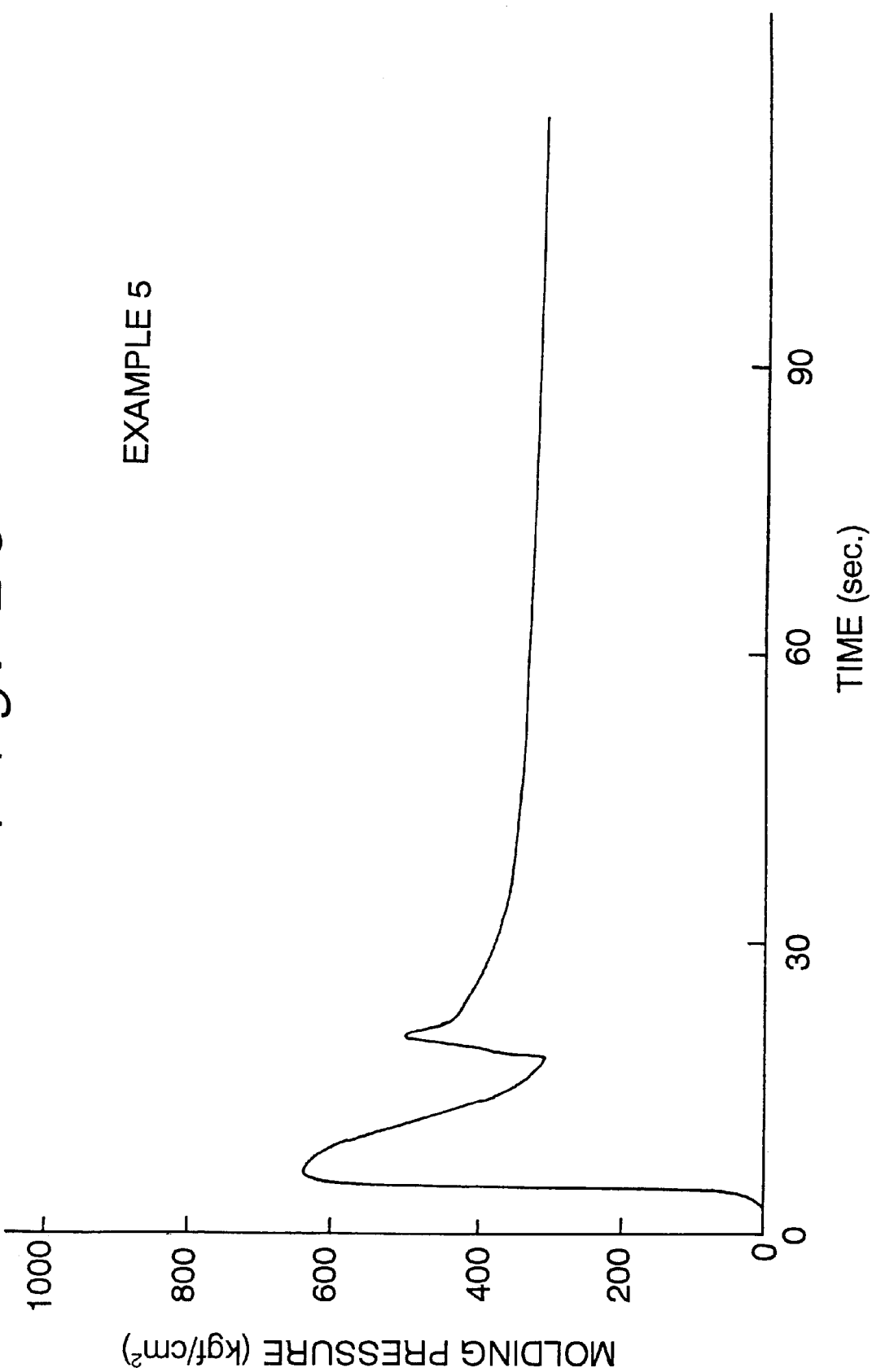
Fig. 28 EXAMPLE 5

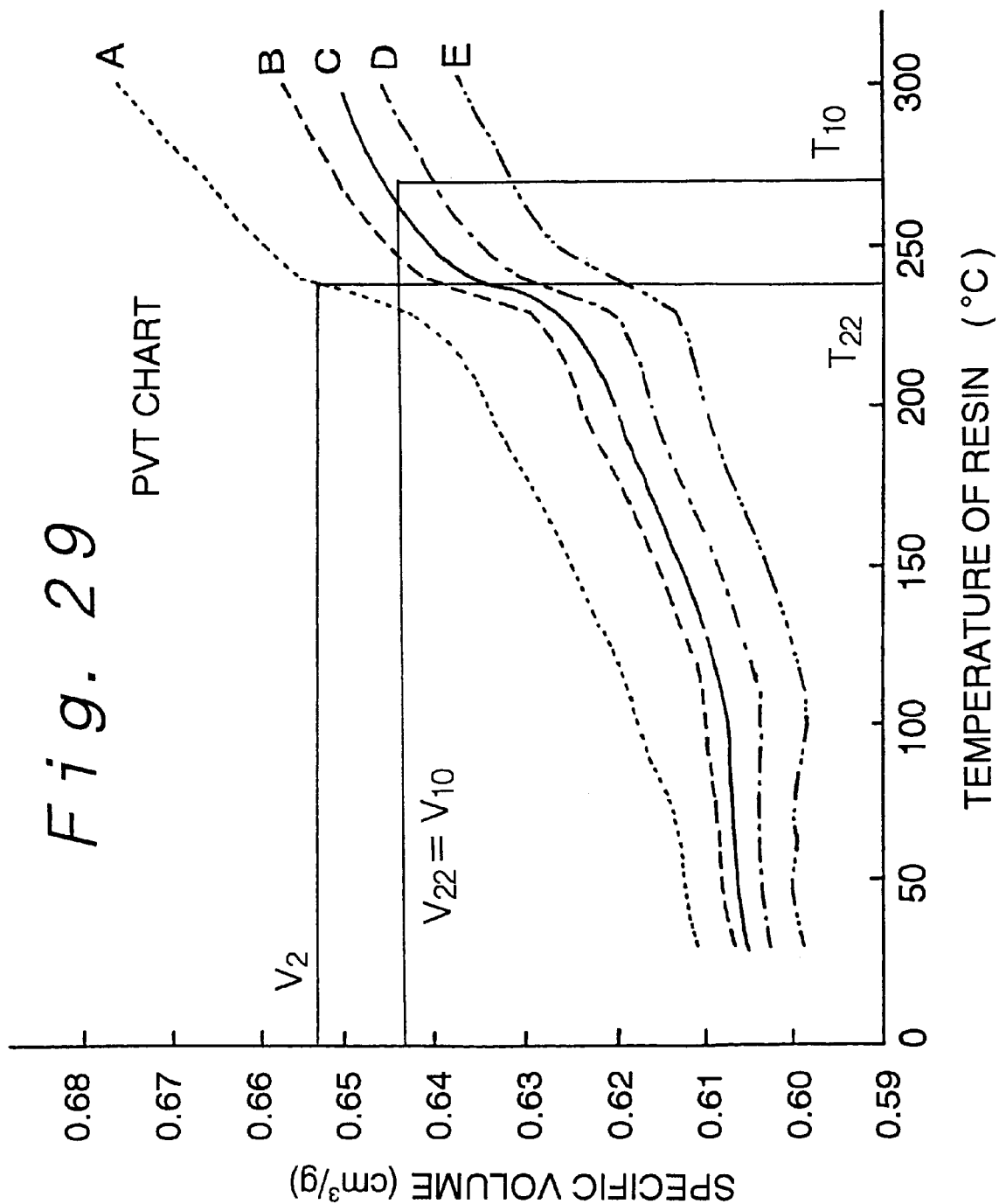

EXAMPLE 6

METHOD OF INJECTION-MOLDING THERMOPLASTIC RESINS

BACKGROUND OF THE INVENTION AND RELATED ART STATEMENT

The present invention relates to a method of injection-molding a thermoplastic resin, which permits the facile formation of a coating having various functions on the surface of an injection-molded article formed of the thermoplastic resin.

A coating is sometimes formed on the surface of an injection-molded article of a thermoplastic resin for improving the injection-molded article in surface properties. The coating refers, for example, to a coating of a coating composition, a hard-coating, an ultraviolet light-preventing coating or a non-fogging coating. Generally, after an injection-molded article is formed by an injection molding method, there is employed a separate step of forming a coating having various functions on the surface of the injection-molded article. The coating is formed, for example, by spraying a coating material on the molded article or by immersing the molded article in a coating material in a liquid state. As a result, the process for producing an end product whose surface is coated includes additional steps. The above injection-molded article, therefore, has the following problem to overcome. It is required to decrease the number of steps required up to the production of the end product, to decrease the scale of its production facilities, to decrease the processing and treating time and to decrease the production cost.

For compression-molding or injection-molding thermosetting resins such as SMC (sheet molding compound) and BMC (bulk molding compound), there are proposed some methods in which a coating is formed on a product during the molding step. For example, JP-B-55-9291 (corresponding U.S. Pat. No. 4,076,788) discloses a method in which an SMC material is fed into a space between an upper mold member and a lower mold member, these mold members are closed to compression-mold the SMC material, the resultant molded article is spaced from the upper mold member to form a space while the mold members are tightly closed, and a coating material in an amount smaller than the volume of the formed space is introduced into the space formed between the upper mold member and the molded article. In the present specification, the method of introducing a coating material in an amount smaller than the volume of a space formed between a molded article of a resin and a cavity wall will be referred to as "coating material short shot method" hereinafter.

JP-B-4-33252 (corresponding to U.S. Pat. No. 4,668,460) discloses a method in which an SMC material is fed into a space between an upper mold member and a lower mold member, these mold members are closed to compression-mold the SMC material, and a coating material is introduced into a boundary between the mold and the resultant molded article at a pressure greatly larger than the pressure generated between the mold and the molded article.

On the other hand, in the method of injection-molding a thermoplastic resin, there are proposed some methods in which a coating is formed on the surface of an injection-molded article during its molding step. For example, JP-A-5-301251 discloses a method for injecting a thermoplastic resin into a cavity formed in a mold and then introducing and filling a thermosetting coating material into a space formed of a coating surface of a molded article of the resin and the mold after the mold clamping force is decreased or while the mold clamping force is maintained. In the present specification, the method of introducing and filling a coating material in an amount equivalent to the volume of a space formed between a molded article of a resin and a mold will be referred to as "coating material full shot method" hereinafter.

Further, JP-A-5-318527 discloses a method in which a thermoplastic resin is injected and then an uncured thermosetting resin is introduced into a space formed by the contraction of the thermoplastic resin in a mold and then is cured, to form a molded article of the thermoplastic resin of which the surface is partly coated with the thermosetting resin.

The methods disclosed in JP-B-55-9291 and JPB-4-33252 are very effective for concealing the defects on a molded article surface such as pits and sink marks which are problems in the SMC compression molding. In the compression molding, the mold clamping force applied to a movable mold member is all exerted on a molded article. That is, the equation, molding pressure = (mold clamping force)/(projected area of molded article)

holds. The molding pressure can be therefore easily changed by controlling the mold clamping force, so that a space in the cavity into which a coating material is to be introduced can be uniformly and easily formed by controlling the mold clamping force.

In the method of injection-molding a thermoplastic resin, however, a series of molding steps are generally carried out without spacing a mold and in a state in which a predetermined mold clamping force is applied. The mold clamping force is exerted not directly on a molded article but on a mold. In these points, the method of injection-molding a thermoplastic resin greatly differs from the method of compression-molding a thermosetting resin. It is therefore difficult to apply the techniques disclosed in JP-B-55-9291 and JP-B-4-33252 to the method of injection-molding a thermoplastic resin.

That is, in the method of compression-molding a thermosetting resin such as SMC or the like, disclosed in JP-B-55-9291 and JP-B-4-33252, a compressive force (molding pressure) is always exerted on a molding material by a movable mold member all through the molding and processing steps. For introducing a coating material onto the molded article surface in the mold, therefore, it is required to form a space between the mold and the molding material by opening the mold and releasing the compressive force (molding pressure) caused by a movable mold member (JP-B-55-9291), or it is required to introduce a coating material at a pressure greater than the compressive force (molding pressure) caused by the movable mold member (JP-B-4-33252).

In the method of injection-molding a thermoplastic resin, generally, the mold is composed of a fixed mold member and a movable mold member. The fixed mold member is contact with the movable mold member, when the movable mold member is clamped to the fixed mold member before injecting a molten thermoplastic resin into a cavity of the mold. The molten resin is injected into the cavity from an injection cylinder to fill the cavity with the molten resin in a state in which the clamping force applied to the movable mold member is supported by the fixed mold member. The clamping force is applied to the movable mold member for preventing the movable mold member from opening a mold while or after the cavity is filled with the molten resin. That is, the clamping force itself is not a compressive force which is exerted on the molten resin injected into the cavity. In other words, the clamping force does not at all work directly to form (mold) an injection-molded article.

The above state can be expressed by the following equation.

(Molding pressure) × (projected area of molded article) =
  $(P_I - P_{loss} + P_{comp})$ × (projected area of molded article) ≤ clamping force in which $P_I$ is an injection pressure of a molten resin, $P_{loss}$ is a pressure loss at the time of injecting the molten resin, $P_{comp}$ is a compressive pressure which an excess of the filled molten resin in the cavity receives under the clamping force, and "projected area of molded article" is an area of the molded article when the molded article is projected to a plane perpendicular to the direction of the clamping force. In the present specification, the molding pressure refers to a pressure which is caused by a resin injected into the cavity and which is exerted on the cavity wall unless otherwise specified. The molding pressure can be measured on the cavity wall corresponding to any position of a molded article.

In the injection molding method, therefore, controlling the clamping force alone is not sufficient for controlling the molding pressure to a desired value. In other words, the space (gap) between the resin in the cavity and the cavity wall, into which a coating material is to be introduced, (such a space will be referred to as "the space" simply, hereinafter in some cases), cannot be uniformly or easily formed by controlling the clamping force alone.

When the technique of introducing a coating material at a pressure greater than the compressive force (molding pressure) caused by a movable mold member, disclosed in JP-B-4-33252, is applied to the technique of injection-molding a thermoplastic resin, it cannot be necessarily expected that the pressure for introducing a coating material is higher than the clamping force so that the coating material can be introduced into the boundary between a molded article and the cavity wall, due to (molding pressure)× (projected area of molded article)≦clamping force.

In the techniques disclosed in JP-A-5-301251 and JP-A-5-318527, a thermoplastic resin injected into a cavity shrinks in its cooling and solidification process, thereby forming the space. A coating material is introduced and filled in the resultant space. In other words, the coating material in an amount exceeding the volume of the space is not always introduced into the space. The above techniques are seemingly proper as a technique of forming a coating in the method of injection-molding a thermoplastic resin. However, as already described, there is the relationship of (Molding pressure) × (protected area of molded article) =
  $(P_I - P_{loss} + P_{comp})$ × (projected area of molded article) ≤ clamping force Meanwhile, for forming the space, the molding pressure is required to be 0 kgf/cm². However, even if the cooling of molten resin in the cavity to solidness proceeds to attain $P_I=P_{loss}=0$, the molding pressure cannot be brought into 0 kgf/cm² so long as the term of $P_{comp}$ remains. It is therefore not expected that the space is necessarily formed. Further, the formation of the space into which a coating material is to be introduced cannot uniformly or easily carried out by controlling the clamping force.

The molding pressure differs depending upon the form of the cavity, the kind of the molten resin used or the solidifying time (cooling time) of the injected molten resin. It therefore cannot be uniformly said that the space is reliably formed, for example, by spacing the movable mold member from the fixed mold member.

As explained above, the relation between the formation of the space and the decrease amount of the clamping force, or the relation between the formation of the space and the spacing amount of the movable mold member from the fixed mold member, depends upon the magnitude of the term of $P_{comp}$. The formation of the space therefore cannot be uniformly or easily carried out by simply controlling the clamping force alone or by determining the amount of the spacing of the movable mold member from the fixed mold member.

Generally, the introduced coating material shrinks in volume. Concerning the molten resin in the cavity, dwell pressure is being applied to the injected molten resin from the injection cylinder side of an injection molding machine to replenish the molten resin into the cavity. Concerning the coating material, generally, after it is introduced into the space, the introduced coating material and the coating material introduction device are in a "relation-broken" state. That is, when the coating material is introduced into the space, pressure is not always exerted on the coating material introduced from the coating material introduction device. As a result, there arise problems in that the gloss of the surface of the coating decreases, that the adhesive ability of the coating to the thermoplastic resin decreases and that the coating is not uniform. For avoiding these problems, the introduced coating material is required to be always pressed to the cavity wall under a predetermined pressure. However, the above JP-A-5-301251 and JP-A-5-318527 are neither disclose nor suggest anything concerning these problems and means to solve them.

OBJECT AND SUMMARY OF THE INVENTION

It is therefore an object of the present invention to provide a method of injection-molding a thermoplastic resin, in which a coating having various functions and having excellent properties can be formed on the resin surface easily and reliably in the step of injection-molding the thermoplastic resin.

The method of injection-molding a thermoplastic resin for achieving the above object, provided by the present invention, comprises the steps of (a) injecting a molten resin of a thermoplastic resin into a cavity provided in a mold composed of a fixed mold member and a movable mold member, (b) introducing a predetermined amount of a coating material into between the resin in the cavity and the cavity wall after the injection of the molten resin is completed, to allow the resin in the cavity to be compressed with the introduced coating material and/or to allow the movable mold member to move in the mold-opening direction with the introduced coating material, and (c) maintaining a molding pressure before the mold releasing at a level higher than 0 kgf/cm².

The above molding pressure refers to a pressure which is caused by the resin injected into the cavity and/or the coating material introduced and is exerted on the cavity wall. The molding pressure can be measured, for example, by providing any position of the cavity wall with a pressure sensor.

In the first preferred embodiment of the method of injection-molding a thermoplastic resin, provided by the present invention, (to be simply referred to as "first embodiment of the present invention" hereinafter), the coating material is introduced in a state in which the molding pressure P caused by the resin injected into the cavity is equivalent to 0 kgf/cm². The state in which the molding pressure is equivalent to 0 kgf/cm² means that the pressure exerted on the cavity wall or the pressure exerted on the resin in the cavity is atmospheric pressure. Specifically, the above state refers to a state in which a space is formed between the resin in the cavity and the cavity wall or a state in which no space is formed and no pressure other than atmospheric pressure is exerted on the cavity wall by the resin injected into the cavity.

In the first embodiment of the present invention, preferably, a dwelling step is included between the above steps (a) and (b), and the coating material is preferably introduced at a time when or after a dwelling period is terminated. In this case, the introduction of the coating material is initiated preferably 10 to 120 seconds after the dwelling period is terminated. When the introduction of the coating material is initiated before the termination of the dwelling period, the molten resin in the cavity may flow into a coating material introduction device. This risk can be avoided by initiating the introduction of the coating material at the time when or after the dwelling period is terminated.

The "dwelling" refers to the operation of keeping on exerting pressure on the molten resin in the cavity from the injection cylinder side of an injection molding machine through a gate portion of the mold, after the molten resin is injected. As the resin in the cavity is cooled, the resin shrinks in volume. However, the dwelling serves to replenish the molten resin into the cavity and to increase the weight of the resin in the cavity while inhibiting the excessive volume shrinkage of the resin as a whole in the cavity. This operation is called dwelling operation, and the pressure applied to the molten resin by this operation is the dwell pressure. The dwelling period (dwelling time) refers to a period (time) during which the dwelling pressure is exerted on the molten resin after a predetermined amount of the molten resin is injected. During the dwelling period, the resin in the gate portion is cooled to solidness so that the dwelling does not at all serve to increase the weight of the resin in the cavity in some cases. This phenomenon is called "gate-seal". Generally, when the dwelling pressure is low, when the dwelling period is long, or when an article to be formed by injection molding has a relatively small thickness, gate-seal is observed in many cases. On the other hand, in some cases, the resin in the gate portion is not fully cooled to solidness during the dwelling period so that no gate-seal is observed. That is, when the dwelling pressure is high, when the dwelling period is short, or when an article to be formed by injection molding has a relatively large thickness, no gate-seal is observed in many cases.

In the first embodiment of the present invention, the mold clamping force can be maintained at a predetermined constant level during a period from the initiation of the molten resin injection to the mold releasing. This operation will be referred to as "high-pressure clamping operation" for convenience hereinafter. In this case, it is preferred to use a thermoplastic resin which satisfies $V_{12} \leq V_{10}$ in which $V_{12}$ is a specific volume of the thermoplastic resin under the conditions of (pressure $P_0$, temperature $T_{12}$), $V_{10}$ is a specific volume of the thermoplastic resin under the conditions of (pressure $P_{10}$, temperature $T_{10}$), $P_{10}$ is a molding pressure at a point of time when the increase of the weight of the thermoplastic resin in the cavity caused by the dwelling operation terminates, $T_{10}$ is a temperature of the thermoplastic resin in the cavity at the above point of time, $T_{12}$ is a temperature of the thermoplastic resin in the cavity immediately before the introduction of the coating material, and $P_0$ is atmospheric pressure.

In the first embodiment of the present invention, after the dwelling step is completed, the clamping force of the mold may be decreased to a level lower than that of the clamping force in the step (a). This operation will be referred to as "low-pressure clamping operation" for convenience hereinafter. In this case, when the low-pressure clamping operation is completed, the molding pressure is 0 kgf/cm² in some cases, and the molding pressure is not 0 kgf/cm² in other cases, depending upon the kind of the thermoplastic resin used and the molding conditions. In the latter case, it is preferred to use a thermoplastic resin which satisfies $V_{12} \leq V_{11}$ in which $V_{12}$ is a specific volume of the thermoplastic resin under the conditions of (pressure $P_0$, temperature $T_{12}$), $V_{11}$ is a specific volume of the thermoplastic resin under the conditions of (pressure $P_{11}$, temperature $T_{11}$), $P_{11}$ is a molding pressure at a point of time immediately after the clamping force of a mold is decreased, $T_{11}$ is a temperature of the thermoplastic resin in the cavity at the above point of time, $T_{12}$ is a temperature of the thermoplastic resin in the cavity immediately before the introduction of the coating material, and $P_0$ is atmospheric pressure.

In the low-pressure clamping operation, when the clamping force in the above step (a) is $F_{10}$ and when the clamping force decreased to a lower level is $F_{11}$, it is preferred to satisfy $0 \leq F_{11}/F_{10} \leq 0.3$, and it is more preferred to satisfy $0 \leq F_{11}/F_{10} \leq 0.1$. When the value of $F_{11}/F_{10}$ exceeds 0.3, the compression state of the resin in the cavity, caused by the introduction of the coating material, may be nonuniform, the coating may be nonuniform in thickness, or the coating may be formed only partly on the injection-molded article, in some cases, depending upon the thermoplastic resin used and the molding conditions. Further, it is preferred to decrease the clamping force within 10 seconds before the introduction of the coating material.

The first embodiment of the present invention may further include the step of decreasing the clamping force of the mold to zero after the dwelling step is completed, and then spacing the movable mold member from the fixed mold member in a state in which the cavity is formed by the fixed mold member and the movable mold member. This operation will be referred to as "movable mold member spacing operation" for convenience hereinafter. In this case, when the movable mold member spacing operation is completed, the molding pressure is 0 kgf/cm² in some cases, and the molding pressure is not 0 kgf/cm² in other cases, depending upon the kind of the thermoplastic resin used and the molding conditions. In the latter case, it is preferred to use a thermoplastic resin which satisfies $V_{12} \leq V'_{11}$ in which $V_{12}$ is a specific volume of the thermoplastic resin under the conditions of (pressure $P_0$, temperature $T_{12}$), $V'_{11}$ is a specific volume of the thermoplastic resin under the conditions of (pressure $P'_{11}$, temperature $T'_{11}$), $P'_{11}$ is a molding pressure at the point of time immediately after the movable mold member is spaced from the fixed mold member, $T'_{11}$ is a temperature of the thermoplastic resin in the cavity at the above point of time, $T_{12}$ is a temperature of the thermoplastic resin in the cavity immediately before the introduction of the coating material, and $P_0$ is atmospheric pressure.

In the above high-pressure clamping operation, the above low-pressure clamping operation or the above movable mold member spacing operation, when the molding pressure caused by the introduction of the coating material is $p_{peak}$, it is desirable that the value of $p_{peak}$ should satisfy $0 < p_{peak} \leq 500$ kgf/cm², preferably 50 kgf/cm² $p_{peak} \leq 300$ kgf/cm². The molding pressure P caused by the resin injected into the cavity is equivalent to 0 kgf/cm² at the time when the coating material is introduced. When the value of $p_{peak}$ is 0 kgf/cm², neither the resin in the cavity is compressed by the introduced coating material, nor is the movable mold member moved in the mold-opening direction. This means that the coating material in an amount equivalent to the volume of the formed space is introduced (coating material full shot method), or that the coating material in an amount smaller than the volume of the formed space is introduced (coating material short shot method). In the above coating material full shot method or the above coating material short shot method, the imprintability of the cavity wall surface to the surface of the coating is insufficient, or the adhesive force on of the coating to the thermoplastic resin is low. On the other hand, when the value of $p_{peak}$ exceeds 500 kgf/cm², the compression state of the resin in the cavity, caused by introducing the coating material, may be nonuniform, so that the coating consequently may have a nonuniform thickness, or the coating may be only partly formed on the surface of the injection-molded article, in some cases. When the value of $p_{peak}$ is in the above range, or when the coating material having a volume greater than the volume of the formed space is introduced such that the value of $p_{peak}$ is brought into the above range, the coating having a uniform thickness can be formed on the surface of the injection-molded article, and the coating has excellent adhesive ability to the thermoplastic resin. The introduction of the coating material having a volume greater than the volume of the formed space will be referred to as "coating material overshot method" hereinafter.

In the first embodiment of the present invention, further, when the molding pressure immediately before the mold is released is p', it is desirable to satisfy $0 < p'/p_{peak} \leq 1.0$, more preferably $0.5 \leq p'/p_{peak} \leq 1.0$. When the value of $p'/p_{peak}$ is 0, the molding pressure is not maintained at a level higher than 0 kgf/cm². As a result, the imprintability of the cavity wall surface to the surface of the coating is insufficient, or the adhesive force of the coating to the thermoplastic resin is low. When the value of $p'/p_{peak}$ is in the above range, the cavity wall more reliably continues to exert its pressure on the introduced coating material and further on the coating material which is shrinking. As a result, the imprintability of the cavity wall surface to the surface of the coating is excellent and the coating has an improved glossy surface. Further, the coating has improved adhesive ability to the thermoplastic resin.

In the first embodiment of the present invention, the high-pressure clamping operation, the low-pressure clamping operation or the movable mold member spacing operation can be selected depending upon the thickness of the injection-molded article and the thickness of the coating to be formed on the injection-molded article. When the injection-molded article has a small thickness, it is preferred to select the movable mold member spacing operation. When the injection-molded article has a large thickness, it is preferred to select the high-pressure clamping operation or the low-pressure clamping operation. When it is intended to form a coating having a large thickness on the injection-molded article, it is preferred to select the low-pressure clamping operation. When it is intended to further increase the thickness of the coating, it is preferred to select the movable mold member spacing operation.

The thermoplastic resin suitable for use in the first embodiment of the present invention includes crystalline polyolefin resins such as a polyethylene (PE) resin, a polypropylene (PP) resin, a polymethylpentene resin, an ethylene-vinyl acetate copolymer and an ionomer;

crystalline commodity resins such as polyvinyl alcohol, polyvinyl butyral and polyvinylformal;

crystalline engineering plastics such as a polyamide (PA) resin, a polybutylene terephthalate (PBT) resin, a polyethylene terephthalate (PET) resin, a liquid crystalline polyester resin, a polyacetal (POM) resin, a polyphenylene sulfide (PPS) resin and a polyether ether ketone (PEEK) resin;

other crystalline resins such as a fluoro resin and acetyl cellulose;

amorphous commodity resins such as polyvinyl chloride (PVC), polyvinylidene chloride, polyvinyl acetate, an acrylonitrile-styrene copolymer (AS) resin, an acrylonitrile-butadiene-styrene copolymer (ABS) resin, an AES resin, an ASA resin, an ACS resin and a polymethyl methacrylate (PMMA) resin;

amorphous engineering plastics such as a polycarbonate (PC) resin, a modified polyphenylene ether (PPE) resin, a polyimide (PI) resin, a polyamideimide (PAI) resin, a polyarylate resin, a polysulfone resin, a polyether sulfone resin and a polyetherimide resin; and other amorphous resins such as a polystyrene (PS) resin, a high-impact polystyrene (HIPS) resin, an ionomer and a thermoplastic elastomer resin.

The above thermoplastic resins may be used alone or in combination. Further, there may be used a polymer alloy composed of at least one of the above thermoplastic resins as a main component and a thermosetting resin such as a polyurethane resin, an unsaturated polyester resin, an epoxy resin, a phenolic resin or a melamine resin as an auxiliary component, and a composite material prepared by reinforcing any one of the above materials including the polymer alloy with a reinforcement such as a fibrous filler and a scale-like filler. It is particularly preferred to use an amorphous thermoplastic resin which is not reinforced or an amorphous resin-rich polymer alloy which is not reinforced. The thermoplastic resin used in the first embodiment of the present invention is not specially limited, while it may be sometimes limited depending upon the compatibility with the coating material to be used. Whether or not the thermoplastic resin is amorphous is generally determined depending upon whether or not it shows a clear melting point (a temperature at which a sharp heat absorption is exhibited) when measured by differential scanning calorimetry (DSC). Those thermoplastic resins which do not show a clear melting point are amorphous, and those thermoplastic resins which show clear melting points are crystalline.

In the first embodiment of the present invention, the form or shape of an injection-molded article to be produced is not specially limited.

In the second preferred embodiment of the method of injection-molding a thermoplastic resin, provided by the present invention, (to be simply referred to as "second embodiment of the present invention" hereinafter), the coating material is introduced in a state in which the molding pressure P caused by the resin injected into the cavity is higher than 0 kgf/cm². Specifically, the coating material is introduced in a state where no space is formed between the resin in the cavity and the cavity wall.

In the second embodiment of the present invention, a dwelling step is included between the above steps (a) and (b), and the coating material is preferably introduced at a time when or after the dwelling period is terminated.

In the above case, preferably, the dwelling period after the injection of the molten resin into the cavity is at least 3 seconds, and the dwell pressure is at least 300 kgf/cm². When the dwell pressure is less than 300 kgf/cm² and when the dwelling period is less than 3 seconds, the molding pressure P immediately before the introduction of the coating material is sometimes liable to decrease to 0 kgf/cm². When the molding pressure decreases as described here, it is no longer possible to keep on exerting pressure on the resin in the cavity or the introduced coating material depending upon the molding condition, the thermoplastic resin and the coating material used, so that the imprintability of the cavity wall surface to the surface of the coating is insufficient, or that the coating has poor adhesive ability to the thermoplastic resin, in some cases. On the other hand, when the values of the dwelling pressure and the dwelling period are set in the above ranges, an excess of the resin is filled in the cavity, the coating material can be introduced in a state in which the molding pressure P is higher than 0 kgf/cm², and it is also made possible to keep on exerting pressure on the coating material introduced into the boundary between the resin in the cavity and the cavity wall.

When the introduction of the coating material is initiated before the dwelling period is terminated, the molten resin in the cavity may flow into a coating material introduction device. This risk can be avoided by initiating the introduction of the coating material at a point of time when, or after, the dwelling period is terminated. Further, it is preferred to initiate the introduction of the coating material within 5 seconds after the dwelling period is terminated, and in this case, the adhesive ability of the coating to the thermoplastic resin can be further improved.

In the second embodiment of the present invention, the clamping force may be maintained at a predetermined constant level during a period from the initiation of the injection of the molten resin to the mold releasing. That is, the high-pressure clamping operation can be employed.

In the second embodiment of the present invention, after the dwelling step is completed, the clamping force can be decreased to a level lower than that of the clamping force at the time of injecting the molten resin. That is, the low-pressure clamping operation can be employed. In this case, it is desirable to satisfy $0 \leq F_{21}/F_{20} \leq 0.3$, more preferably $0 \leq F_{21}/F_{20} \leq 0.1$, wherein $F_{20}$ is the clamping force in the above step (a) and $F_{21}$ is the decreased clamping force. The molding pressure caused by the resin, immediately before the introduction of the coating material, is thereby decreased, so that a uniform coating can be reliably formed on the resin surface.

In the second embodiment of the present invention, there is further included the step of decreasing the clamping force of the mold to zero after the dwelling step is completed, and then spacing the movable mold member from the fixed mold member in a state in which the cavity is formed by the fixed mold member and the movable mold member. That is, the movable mold member spacing operation can be employed. In this case, the molding pressure caused by the resin, immediately before the introduction of the coating material, is thereby also decreased, so that a uniform coating can be reliably formed on the resin surface.

In the above high-pressure clamping operation, the above low-pressure clamping operation and the above movable mold member spacing operation in the second embodiment of the present invention, it is preferred to use a thermoplastic resin which satisfies $V_2 > V_{22}$ in which $V_{22}$ is a specific volume of the thermoplastic resin under the conditions of (pressure $P_{22}$, temperature $T_{22}$), $V_2$ is a specific volume of the thermoplastic resin under the conditions of (pressure $P_0$, temperature $T_{22}$), $P_{22}$ is a molding pressure caused by the resin at a point of time immediately before the introduction of the coating material, $T_{22}$ is a temperature of the resin in the cavity at the above point of time, and $P_0$ is atmospheric pressure.

In the second embodiment of the present invention, in any one of the high-pressure clamping operation, the low-pressure clamping operation and the movable mold member spacing operation, the coating material is introduced into the boundary between the resin in the cavity and the cavity wall in a state in which the molding pressure P is higher than 0 kgf/cm². Although depending upon the thermoplastic resin used, etc., the molding pressure before the mold releasing is higher than 0 kgf/cm² in some cases due to the resin in the cavity and the coating material, the molding pressure before the mold releasing is higher than 0 kgf/cm² in some cases only due to the resin in the cavity, or the molding pressure before the mold releasing is higher than 0 kgf/cm² in some cases due to the coating material alone.

In the above high-pressure clamping operation, the above low-pressure clamping operation and the above movable mold member spacing operation, it is desirable that the molding pressure immediately before the introduction of the coating material should satisfy $0 < P \leq 500$ kgf/cm², more preferably $0 < P \leq 300$ kgf/cm². When the value of P exceeds 500 kgf/cm², the coating material is likely to flow into that portion of the molten resin which is liable to shrink, and as a result, there is liable to be a problem in that the thickness of the coating decreases or is nonuniform, or that the coating is formed on only a part of the injection-molded article. When the value of P is in the above range, the coating material can be reliably introduced into the boundary between the resin in the cavity and the cavity wall.

In the second embodiment of the present invention, further, it is desirable that the molding pressure $P_{peak}$ immediately after the introduction of the coating material should satisfy $0 < P_{peak} \leq 500$ kgf/cm², more preferably $0 < P_{peak} \leq 300$ kgf/cm². $P_{peak}$ is a molding pressure caused by the injection of the resin, or by the injection of the resin and the introduction of the coating material, and is a peak value. The value of $P_{peak}$ is determined by the molding pressure immediately before the introduction of the coating material, the flexibility of the resin in the cavity and the easiness with which the movable mold member moves. When the value of $P_{peak}$ exceeds 500 kgf/cm², the thickness of the coating may be nonuniform, or the coating may be only partly formed on the injection-molded article, in some cases. When the value of $P_{peak}$ is 0 kgf/cm², the imprintability of the cavity wall surface to the surface of the coating is insufficient, or the coating shows low adhesive ability to the thermoplastic resin.

In the second embodiment of the present invention, an actual injection molding test may be carried out for properly selecting the high-pressure clamping operation, the low-pressure clamping operation or the movable mold member spacing operation, depending on the thermoplastic resin used and a reinforced resin with or without a reinforcement.

The thermoplastic resin suitable for use in the second embodiment of the present invention includes crystalline polyolefin resins such as a polyethylene (PE) resin, a polypropylene (PP) resin, a polymethylpentene resin, an ethylene-vinyl acetate copolymer and an ionomer;

crystalline commodity resins such as polyvinyl alcohol, polyvinyl butyral and polyvinylformal;

crystalline engineering plastics such as a polyamide (PA) resin, a polybutylene terephthalate (PBT) resin, a polyethylene terephthalate (PET) resin, a liquid crystalline polyester resin, a polyacetal (POM) resin, a polyphenylene sulfide (PPS) resin and a polyether ether ketone (PEEK) resin;

other crystalline resins such as a fluoro resin and acetyl cellulose;

amorphous commodity resins such as polyvinyl chloride (PVC), polyvinylidene chloride, polyvinyl acetate, an acrylonitrile-styrene copolymer (AS) resin, an acrylonitrile-butadiene-styrene copolymer (ABS) resin, an AES resin, an ASA resin, an ACS resin and a polymethyl methacrylate (PMMA) resin;

amorphous engineering plastics such as a polycarbonate (PC) resin, a modified polyphenylene ether (PPE) resin, a polyimide (PI) resin, a polyamideimide (PAI) resin, a polyarylate resin, a polysulfone resin, a polyether sulfone resin and a polyetherimide resin; and other amorphous resins such as a polystyrene (PS) resin, a high-impact polystyrene (HIPS) resin, an ionomer and a thermoplastic elastomer resin.

The above thermoplastic resins may be used alone or in combination. Further, there may be used a polymer alloy composed of at least one of the above thermoplastic resins as a main component and a thermosetting resin such as a polyurethane resin, an unsaturated polyester resin, an epoxy resin, a phenolic resin or a melamine resin as an auxiliary component, and a composite material prepared by reinforcing any one of the above materials including the polymer alloy with a reinforcement such as a fibrous filler or a scale-like filler. It is particularly preferred to use a crystalline thermoplastic resin or a crystalline resin-rich polymer alloy. The thermoplastic resin used in the second embodiment of the present invention is not specially limited, while it may be sometimes limited depending upon the compatibility with the coating material to be used.

The form or shape of the injection-molded article produced in the second embodiment of the present invention is not specially limited, while it is preferred to apply the injection-molding method of the second embodiment of the present invention to the production of a molded article which is formed of a crystalline thermoplastic resin or a crystalline resin-rich polymer alloy and has a thickness of at least 3 mm. When an injection-molded article having a thickness of 3 mm or more is produced, the molten resin injected into the cavity shrinks in the thickness direction of the injection-molded article to a great extent. As a result, a space is easily formed between the resin in the cavity and the cavity wall. When the coating material is introduced after the above space is formed, the solidification of the resin surface has considerably proceeded, and the adhesive force between the coating and the injection-molded article is liable to decrease.

The coating material that can be used in the injection-molding method of the present invention includes oxidation-polymerizable coating materials such as alkyd resin-containing, epoxy resin ester-containing and fatty acid-modified urethane resin-containing coating materials; multi-package coating compositions such as epoxy resin-containing, polyurethane-containing and unsaturated polyester-containing coating compositions; thermosetting coating materials such as alkyd resin-containing, epoxy resin-containing, polyurethane-containing and vinyl resin-containing coating materials; an epoxy acrylate oligomer, a urethane acrylate oligomer, a polyester acrylate oligomer; radical-polymerizable coating compositions containing any one of the above oligomers and an ethylenically unsaturated monomer; a functional coating composition prepared by incorporating a special additive such as a metal powder, a special pigment or an ultraviolet absorber into any one of the above coating materials or coating compositions; a fluorocarbon resin-containing lacquer, a silicone resin-containing lacquer; and a hard-coating agent such as a silane-containing hard-coating agent.

In the injection-molding method of the present invention, a predetermined amount of the coating material is introduced into between the resin in the cavity and the cavity wall such that the resin in the cavity is compressed with the introduced coating material and/or that the movable mold member moves in the mold-opening direction. The thickness of the coating formed on the surface of the resin in the cavity can be accurately controlled by introducing a predetermined amount of the coating material. Further, the above predetermined amount of the coating material is an amount sufficient for compressing the resin in the cavity and/or for moving the movable mold member in the mold-opening direction. In other words, the above predetermined amount of the coating material is an amount greater than the volume of a space even if the space has been formed between the resin in the cavity and the cavity wall. That is, the coating material is excessively filled in the space (coating material overshot method). The state in which the coating material is introduced, i.e., whether or not the coating material is introduced with compressing the surface of the resin in the cavity, whether or not the coating material is introduced with spacing the movable mold member from the fixed mold member to some extent, or whether or not the coating material is introduced with having these two functions, depends upon the pressure for introducing the coating material, the clamping force and the flexibility of the resin.

Generally, the introduced coating material shrinks in volume. In the injection molding method of the present invention, however, the coating material is sometimes excessively filled in, and the molding pressure before the mold releasing is maintained at a level higher than 0 kgf/cm$^2$. That is, the cavity wall always exerts a pressure on the introduced coating material. As a result, there can be reliably avoided problems in that the gloss of the coating decreases, that the coating has decreased adhesion to the thermoplastic resin and that the coating is nonuniform. When a space has been formed between the resin in the cavity and the cavity wall before the introduction of the coating material, the coating material is excessively filled in the space so that the molding pressure before the mold releasing can be maintained at a level higher than 0 kgf/cm$^2$. On the other hand, when the coating material is introduced in a state in which the molding pressure P caused by the resin injected into the cavity is higher than 0 kgf/cm$^2$, the molding pressure before the mold releasing is maintained at a level higher than 0 kgf/cm$^2$ owing to both the coating material and the resin in the cavity or owing to the coating material alone.

Generally, when the thermoplastic resin is an amorphous resin or amorphous resin alloy which is not reinforced, even after resin near the cavity wall begins to undergo solidifying, resin far from the cavity wall is in a molten state, and there is not clear boundary between a solidified resin portion and a resin in a molten state. When the coating material is introduced in the absence of a space (gap) between the resin in the cavity and the cavity wall while the resin is in the above state, the resin in the cavity is compressed by the coating material, which results in a nonuniform compression state. The introduced coating material is therefore liable to have a nonuniform thickness.

For the above case, the first embodiment of the present invention is employed in which the coating material is introduced into a space between the resin in the cavity and the cavity wall, whereby the resultant coating of the coating material has a uniform thickness. The space between the resin in the cavity and the cavity wall can be formed by using a thermoplastic resin which satisfies $V_{12} \leq V_{10}$ (in high-pressure clamping operation), $V_{12} \leq V_{11}$ (in low-pressure clamping operation) or $V_{12} \leq V'_{11}$ (in movable mold member spacing operation).

When the molten resin injected into the cavity has been cooled and solidified, the first two terms of $$P_f - P_{loss} + P_{comp}$$

are 0 kgf/cm². Further, in the first embodiment of the present invention, the value of $P_{comp}$ can be reliably brought into 0 kgf/cm² by using a thermoplastic resin which satisfies $V_{12} \leq V_{10}$ (in high-pressure clamping operation), $V_{12} \leq V_{11}$ (in low-pressure clamping operation) or $V_{12} \leq V'_{11}$ (in movable mold member spacing operation). That is, the molding pressure P can be brought into 0 kgf/cm². Therefore, a space (gap) is reliably formed between the injection-molded article surface and the cavity wall, and as a result, the coating material can be reliably introduced into the space (gap).

In the second embodiment of the present invention, the coating material is introduced into the boundary between the resin in the cavity and the cavity wall before the molding pressure caused by the resin injected into the cavity has not completely decreased, i.e., in a state in which the molding pressure P is higher than 0 kgf/cm². Unlike the technique disclosed in JP-A-5-301251 and JP-A-5-318527, no space (or gap) is formed between the cavity wall and the thermoplastic resin which has been injected into the cavity and has begun to be cooled and solidified. In this state, the coating material is introduced, so that a pressure is reliably being exerted on the coating material which has been introduced and further undergoes shrinking. As a result, the imprintability of the cavity wall surface to the surface of the coating is excellent, and the coating has an improved glossy surface. Further, the coating has improved adhesive ability to the thermoplastic resin.

Further, when a thermoplastic resin which satisfies $V_2 > V_{22}$ is used, the term of $P_{comp}$ remains even if the molten resin injected into the cavity is cooled and solidified, so that the molding pressure P immediately before the introduction of the coating material is reliably brought into a state of P>0. As a result, no space is formed between the resin in the cavity and the cavity wall, and the coating material can be reliably introduced into the boundary between the resin in the cavity and the cavity wall.

The molding pressure $p_{peak}$ or $P_{peak}$ immediately after the introduction of the coating material is preferably over 0 kgf/cm² and not more than 500 kgf/cm². The molding pressure depends upon the molding pressure immediately before the introduction of the coating material, the flexibility of the resin in the cavity and the easiness with which the movable mold member moves. The first embodiment of the present invention or the second embodiment of the present invention can be properly selected, and at the same time, the clamping operation (high-pressure clamping operation, low-pressure clamping operation or movable mold member spacing operation) can be properly selected, so that the molding pressure $p_{peak}$ or $P_{peak}$ immediately after the introduction of the coating material is brought into the above range. An optimum combination can be determined depending upon the kind of the thermoplastic resin used, the flexibility of the resin in the cavity immediately before the introduction of the coating material, the amount of the coating material to be introduced (thickness of the coating to be formed on the surface of an injection-molded article) and the thickness and form of the injection-molded article. For example, when the thermoplastic resin is an amorphous resin or amorphous resin alloy which is not reinforced, it is preferred to employ the first embodiment of the present invention. When the thermoplastic resin is a crystalline thermoplastic resin or a crystalline resin-rich polymer alloy, and when an injection-molded article having a thickness of 3 mm or more is produced, it is preferred to employ the second embodiment of the present invention. In these cases, the clamping operation is properly selected such that $p_{peak}$ or $P_{peak}$ is brought into the predetermined range depending upon the amount of the coating material to be introduced.

Changes in the volume of the cavity, the volume of a resin in the cavity and the volume of the coating material in the first and second embodiments of the present invention will be outlined hereinafter. Symbols used hereinafter have the following definitions. In suffixes to a character "v", "C" indicates a volume related to the cavity, "R" indicates a volume related to a molten resin or resin, and "F" indicates a volume related to a coating material or a coating. Further, the figure "0" basically indicates a value of a standard volume, "1" indicates a value of a volume after the low-pressure clamping operation or the movable mold member spacing operation, "2", indicates a value of a volume immediately before the introduction of the coating material, "3" indicates a value of a volume immediately after the introduction of the coating material, "4" indicates a value of a volume immediately before the mold releasing, and "5" indicates a value of a volume after the mold releasing. The increment of the volume of the cavity is based on the volume ($v_{C0}$) of the cavity immediately before the injection of a molten resin. FIG. 1 schematically shows changes in the volumes of the cavity, the molten resin or resin and the coating material or coating. In FIG. 1, the change in the volume of the cavity is shown by left end positions of the movable mold member relative to the standard line. In two-digit suffixes to characters "V" and "P", numeral "1" in the position of unit 10 shows the first embodiment of the present invention, and numeral "2" in the position of unit 10 shows the second embodiment of the present invention. Further, numeral "0" in the position of unit 1 shows a value at a point of time when the weight increase of the resin in the cavity is completed, numeral "1" in the position of unit 1 shows a value after the low-pressure clamping operation or the movable mold member spacing operation, numeral "2" in the position of unit 1 shows a value immediately before the introduction of the coating material, and numeral "4" in the position of unit 1 shows a value immediately before the mold releasing.

$v_{C0}$: a cavity volume immediately before the injection of molten resin (standard value of cavity volume).

$\Delta v_{C0}$: an increment of the cavity volume at a point of time when the weight increase of resin in the cavity, caused by dwelling operation, is completed when the movable mold member is moved in the mold-opening direction by the injection of molten resin (0 in some cases depending upon the mold and the injection conditions).

$\Delta v_{C1}$: an increment of the cavity volume when the movable mold member is moved in the mold-opening direction by the low-pressure clamping operation or movable mold member spacing operation.

$\Delta v_{C2}$: an increment of the cavity volume immediately before the introduction of coating material (0 in some cases depending upon the mold and the injection conditions, and 0 in the high-pressure clamping operation in the first embodiment of the present invention).

$\Delta v_{C3}$: an increment of the cavity volume immediately after the introduction of the coating material when the movable mold member is moved in the mold-opening direction by introducing the coating material (0 in some cases depending upon a thermoplastic resin used, the conditions for the injection of the thermoplastic resin and the conditions for the introduction of the coating material).

$\Delta v_{C4}$: an increment of the cavity volume immediately before the mold releasing.

$v_{R0}$: a volume of the molten resin present in the cavity at a point of time when the weight increase of the resin in the cavity, caused by dwelling operation, is completed.

$v_{R2}$: a volume of the resin in the cavity immediately before the introduction of the coating material (standard value of the resin volume).

$v'_{R5}$: a volume of the injection-molded article immediately after mold releasing on the assumption that the mold releasing operation is carried out immediately before the introduction of coating material.

$\Delta v_{R3}$: an absolute value of the volume change of the resin in the cavity compressed by the coating material immediately after the introduction of the coating material, based on $v_{R2}$ (0 in some cases depending upon a thermoplastic resin used, the conditions for injecting the thermoplastic resin and the conditions for introducing the coating material).

$v_{R4}$: a volume of the resin in the cavity immediately before the mold releasing.

$v_{R5}$: a volume of the injection-molded article immediately after the mold releasing.

$v_{F0}$: a volume of the coating material introduced.

$v_{F4}$: a volume of the coating in the cavity immediately before the mold releasing.

$v_{F5}$: a volume of the coating formed on the surface of the injection-molded article immediately after the mold releasing.

$V_{space}$: a volume of the space formed between the resin in the cavity and the cavity wall immediately before the introduction of the coating material in the first embodiment of the present invention.

The volume $v_{R0}$ of a molten resin in the cavity at a point of time when the injection is completed equals $v_{C0}+\Delta v_{C0}$.

First, the first embodiment of the present invention will be explained below. In the first embodiment of the present invention, a space is formed between the resin in the cavity and the cavity wall immediately before the coating material is introduced, and the following relationship is satisfied.

$$v_{R2} \leq v_{C0} + \Delta v_{C2}$$

Therefore;

$$v_{space} = v_{C0} + \Delta v_{C2} - v_{R2} \geq 0$$

In the high-pressure clamping operation, the value of $\Delta v_{C2}$ is 0.

Further, when it is assumed that the mold releasing operation is carried out immediately before the introduction of the coating material, the volume $v'_{R5}$ of an injection-molded article immediately after the mold releasing is;

$$v'_{R5} = v_{R2}$$

The above equation means that no pressure is exerted on the resin in the cavity immediately before the introduction of the coating material or that no pressure is caused by the resin in the cavity immediately before the introduction of the coating material. In other words, it means that the molding pressure is 0 kgf/cm$^2$.

The coating material is introduced into between the resin in the cavity and the cavity wall in such a predetermined amount that the resin in the cavity is compressed and/or the movable mold member is moved in the mold-opening direction by the introduced coating material. The predetermined amount (volume: $v_{F0}$) of the coating material is therefore required to satisfy the following relationship.

$$v_{F0} > v_{space}$$

That is, it is required to introduce the coating material in an "overshot" method. More specifically, the coating material is introduced in such an amount that satisfies the following relationship.

$v_{F0} = v_{space}$ + (an increment of cavity volume caused by
the movement of the movable mold member in
the mold-opening direction by introducing the coating material) +
(a decrement of the resin volume caused by
the compression of the resin in the cavity
by introducing the coating material)

That is;

$$v_{F0} = (v_{C0} + \Delta v_{C2} - v_{R2}) + (\Delta v_{C3} - \Delta v_{C2}) + \Delta v_{R3}$$
$$= v_{C0} + \Delta v_{C3} + \Delta v_{R3} - v_{R2}$$

The above $v_{F0}$ subsequently satisfies the following relationship.

$$v_{F0} = (v_{C0} + \Delta v_{C3}) - (v_{R2} - \Delta v_{R3})$$
= (the cavity volume immediately after the introduction of the
coating material) – (the resin volume immediately after
the introduction of the coating material)

Whether or not $\Delta v_{C3}$ and $\Delta v_{R3}$ have significant values depends upon the pressure for introducing of the coating material, the clamping force, the flexibility of the resin, and the type of the clamping operation. To put it strictly, the volume of the coating material immediately after the introduction is smaller than its volume immediately before its introduction to some extent because of its compressibility. Since, however, the amount of its volume change is very small, the amount of its volume change is not taken into consideration in the above explanation.

The resin in the cavity is cooled to solidness, so that the volume of the resin finally changes from $v_{R2}$ to $v_{R4}$ through $(v_{R2}-\Delta v_{R3})$. On the other hand, the introduced coating material is cured, so that its volume finally changes from $v_{F0}$ to $v_{F4}$. With these volume change in the resin and the coating material, the increment $\Delta v_{C3}$ of the cavity volume caused by the introduction of the coating material changes as well, and changes to $\Delta v_{C4}$ immediately before the mold releasing. However, the molding pressure can be maintained such that the molding pressure before the mold releasing is higher than 0 kgf/cm$^2$, by introducing the coating material into between the resin in the cavity and the cavity wall in such a predetermined amount (volume: $v_{F0}$) that satisfies the following relationship.

(the cavity volume immediately before the mold releasing) =
(the volumes of the resin and the coating
immediately before the mold releasing) <
(the volumes of the resin and the coating
immediately after the mold releasing)

That is;

$$v_{C0} + \Delta v_{C4} = v_{R4} + v_{F4} < v_{R5} + v_{F5}$$

In the high-pressure clamping operation, there is used a thermoplastic resin which satisfies $V_{12} \leq V_{10}$. A change in the specific volume in the high-pressure clamping operation will be explained below with reference to a PVT chart. FIG. 2A schematically shows a change of the molding pressure with time in the high-pressure clamping operation. FIG. 2B schematically shows a PVT chart of a thermoplastic resin. The molding pressure at a point of time when the weight increase of the resin in the cavity, caused by the dwelling operation, is completed is $P_{10}$, and the temperature of the resin in the cavity at the above point of time is $T_{10}$. In this case, the temperature of the resin in the cavity decreases with the passage of time from the above point of time. If the volume of the cavity during this period is assumed to be constant (actually, it slightly decreases from $v_{C0}+\Delta v_{C0}$ to $v_{C0}+\Delta v_{C2}$, while the cavity volume is considered constant in the explanation of the PVT chart), the molding pressure caused by the resin in the cavity decreases while the specific volume of the resin is constant ($V_{10}$).

When the molding pressure caused by the resin in the cavity decreases to 0 kgf/cm², the specific volume decreases along a curve of $P_0$=atmospheric pressure in the PVT chart shown in FIG. 2B. The specific volume of the thermoplastic resin under the conditions (pressure $P_0$, temperature $T_{12}$) is $V_{12}$. Therefore, a space having a volume ($v_{space}=v_{C0}-v_{R2}$) equivalent to $k_1(V_{10}-V_{12})$ can be formed between the resin in the cavity and the cavity wall, wherein $k_1$ is a constant. In FIG. 3, no space is formed, while the resin injected into the cavity is exerting no pressure on the cavity wall.

In the high-pressure clamping operation, the value of $\Delta v_{C2}$ is 0, and a thermoplastic resin which satisfies $V_{12} \leq V_{10}$ is used, so that the relationships of $$v_{space} = v_{C0} + \Delta v_{C2} - v_{R2}$$
$$= v_{C0} - v_{R2} \geq 0$$

and $$v'_{R5} = v_{R2}$$

are reliably attained, whereby the molding pressure immediately before the introduction of the coating material can be reliably brought into 0 kgf/cm².

In the low-pressure clamping operation, a thermoplastic resin which satisfies $V_{12} \leq V_{11}$ is used. A PVT chart in the low-pressure clamping operation will be explained below with reference to FIGS. 4A and 4B and FIGS. 5A and 5B.

FIGS. 4A and 4B schematically show a change of the molding pressure with time and a PVT chart of a thermoplastic resin when the molding pressure before the initiation of the low-pressure clamping operation is 0 kgf/cm². The change in the specific volume in this case is the same as that explained with regard to FIG. 2B, and its detailed explanation is omitted.

On the other hand, FIGS. 5A and 5B schematically show a change of the molding pressure with time and a PVT chart of a thermoplastic resin when the molding pressure before the initiation of the low-pressure clamping operation is not 0 kgf/cm². The molding pressure at a point of time when the weight increase of the resin in the cavity, caused by the dwelling operation, is completed is $P_{10}$, and the temperature of the resin in the cavity at the above point of time is $T_{10}$. In this case, the temperature of the resin in the cavity decreases with the passage of time from the above point of time. If the volume of the cavity during this period is assumed to be constant, the molding pressure caused by the resin in the cavity decreases while the specific volume of the resin is constant ($V_{10}$). When the clamping force of the mold is decreased, the volume of the cavity increases by $\Delta V_{C1}$.

Although depending upon the size and structure of the mold, when the clamping force of the mold is decreased, the distance (thickness) of the cavity in the mold opening-closing direction increases by about 0.2 mm in some cases.

The clamping force is decreased, and the volume of the cavity increases by $\Delta v_{C1}$. As a result, the specific volume changes to $V_{11}$, and the molding pressure changes to $P_{11}$. The temperature of the resin in the cavity at this point of time is $T_{11}$. As the temperature of the resin in the cavity decreases with the passage of time, the molding pressure caused by the resin in the cavity decreases while the specific volume of the resin remains constant ($V_{11}$). When the molding pressure caused by the resin in the cavity decreases to 0 kgf/cm², the specific volume decreases along a curve of $P_0$=atmospheric pressure in the PVT chart shown in FIG. 5B. The specific volume of the thermoplastic resin under the conditions (pressure $P_0$, temperature $T_{12}$) is $V_{12}$. Therefore, a space having a volume ($v_{space}=v_{C0}+\Delta v_{C2}-v_{R2}$) equivalent to $k_2(V_{11}-V_{12})$ can be formed between the resin in the cavity and the cavity wall, wherein $k_2$ is a constant.

In the low-pressure clamping operation, a thermoplastic resin which satisfies $V_{12} \leq V_{11}$ is used, so that the value of an increment $\Delta v_{C1}$ of the cavity volume when the movable mold member is moved in the mold-opening direction is significant, and that, unlike the case of the high-pressure clamping operation, the increment $\Delta v_{C2}$ of the cavity volume immediately before the introduction of the coating material can be significant. Therefore, a space having a volume of $$v_{space}=v_{C0}+\Delta v_{C2}-v_{R2} \geq 0$$

and $$v'_{R5}=v_{R2}$$

can be easily formed, and, therefore, the molding pressure immediately before the introduction of the coating material can be more reliably brought into 0 kgf/cm². Further, in $$v_{F0}=v_{C0}+\Delta v_{C3}+\Delta v_{R3}-v_{R2},$$

the value of $\Delta v_{C3}$ can be a great value as compared with that in the high-pressure clamping operation. Therefore, a coating having a large thickness can be reliably uniformly formed on the resin surface as compared with the case of the high-pressure clamping operation.

In the movable mold member spacing operation, a thermoplastic resin which satisfies $V_{12} \leq V'_{11}$ is used. The molding pressure and PVT charts in the movable mold member spacing operation will be explained with reference to FIGS. 6A and 6B, FIGS. 7A and 7B and FIGS. 8A and 8B.

FIGS. 6A and 6B schematically show a change of the molding pressure with time and a PVT chart of a thermoplastic resin when the molding pressure before the initiation of the movable mold member spacing operation is 0 kgf/cm². The change in the specific volume in this case is the same as that explained with regard to FIG. 2B, and its detailed explanation is omitted.

FIGS. 7A and 7B schematically show a change of the molding pressure with time and a PVT chart of a thermoplastic resin when the molding pressure is 0 kgf/cm² immediately after the clamping force is brought into 0 by initiating the movable mold member spacing operation. In this case, immediately after the clamping force of the mold is reduced to 0 kgf, the cavity volume increases by $\Delta v'_{C1}$ ($<\Delta v_{C1}$), and as a result, the specific volume changes to $V'_{11}$ and the molding pressure changes to $P'_{11}$, while this molding pressure $P'_{11}$ equals 0 kgf /cm² (i.e., atmospheric pressure).

Further, by spacing the movable mold member from the fixed mold member, the cavity volume further increases, and as a result, it increases by $\Delta v_{C1}$. Since, however, the molding pressure caused by the resin in the cavity has been already brought into atmospheric pressure, this operation no longer appears as a corresponding change in the PVT chart. The specific volume therefore decreases along a curve of $P_0$=atmospheric pressure in the PVT chart shown in FIG. 7B, and a space ($v_{space}=v_{C0}+\Delta v_{C2}-v_{R2}$) equivalent to $k_3(V'_{11}-V_{12})$ can be formed between the resin in the cavity and the cavity wall, wherein $k_3$ is a constant.

FIGS. 8A and 8B schematically show a change of the molding pressure with time and a PVT chart of a thermoplastic resin when the molding pressure is not 0 kgf/cm² immediately after the movable mold member spacing operation is completed. The molding pressure at a point of time when the weight increase of the resin in the cavity, caused by the dwelling operation, is completed is $P_{10}$, and the temperature of the resin in the cavity at this point of time is $T_{10}$. In this case, the temperature of the resin in the cavity decreases with the passage of time from the above point of time. The cavity volume during the above period can be considered constant, and the molding pressure caused by the resin in the cavity decreases while the specific volume of the resin remains constant ($V_{10}$). When the clamping force is reduced to 0 kgf, and further, when the movable mold member is spaced from the fixed mold member, the cavity volume increases by $\Delta v_{C1}$. Although depending upon the size and structure of the mold, immediately after the clamping force is decreased to zero, the distance (thickness) of the cavity in the mold opening-closing direction increases by about 0.2 mm. And, further, at a point of time when the movable mold spacing operation is completed, the movable mold member may be spaced about 0.1 mm from the fixed mold member in some cases. In this case, the amount of movement of the movable mold member from the fixed mold member is finally about 0.3 mm.

Immediately after the movable mold member spacing operation is completed, the volume of the cavity increases by $\Delta v_{C1}$. As a result, the specific volume changes to $V'_{11}$, and the molding pressure changes to $P'_{11}$. The temperature of the resin in the cavity at this point of time is $T'_{11}$. As the temperature of the resin in the cavity decreases with the passage of time, the molding pressure caused by the resin in the cavity decreases while the specific volume of the resin remains constant ($V'_{11}$). When the molding pressure caused by the resin in the cavity decreases to 0 kgf/cm², the specific volume decreases along a curve of $P_0$=atmospheric pressure in the PVT chart shown in FIG. 8B. The specific volume of the thermoplastic resin under the conditions (pressure $P_0$, temperature $T_{12}$) is $V_{12}$. Therefore, a space having a volume ($v_{space}=v_{C0}+\Delta V_{c2}-v_{R2}$) equivalent to $k_3(v'_{11}-V_{12})$ can be formed between the resin in the cavity and the cavity wall, wherein $k_3$ is a constant.

In the movable mold member spacing operation, a thermoplastic resin which satisfies $V_{12} \leq V'_{11}$ is also used, so that the value of an increment $\Delta v_{C1}$ of the cavity volume, when the movable mold member is moved in the mold-opening direction, is greater than that in the low-pressure clamping operation. Therefore, the increment $\Delta v_{C2}$ of the cavity volume immediately before the introduction of the coating material can be greater than that in the low-pressure clamping operation. Therefore, a space having a volume of $$v_{space}=v_{C0}+\Delta v_{C2}-v_{R2} \geq 0$$

and $$v'_{R5}=v_{R2}$$

can be easily formed, and, therefore, the molding pressure immediately before the introduction of the coating material can be more reliably brought into 0 kgf/cm². Further, in $$v_{F0}=v_{C0}+\Delta v_{C3}+\Delta v_{R3}-R_{R2},$$

the value of $\Delta v_{C3}$ can be a great value as compared with that in the low-pressure clamping operation. Therefore, a coating having a large thickness can be reliably uniformly formed on the resin surface as compared with the case of the high-pressure clamping operation or the low-pressure clamping operation.

The second embodiment of the present invention will be explained hereinafter.

In the second embodiment of the present invention, the coating material is introduced in a state in which the molding pressure caused by the resin injected into the cavity is higher than 0 kgf/cm². That is, when the coating material is introduced, the resin in the cavity is exerting a pressure on the cavity wall, and therefore, the relationship of $$v_{R2} > v_{C0}$$

more specifically, $$v_{C0}+\Delta v_{C2}=v_{R2}<v'_{R5}$$

is satisfied. When the coating material is introduced, no space is formed between the resin in the cavity and the cavity wall. In this case, $\Delta v_{C2}>0$. Further, due to the relationship of $v_{R2}<v'_{R5}$, the molding pressure is caused by the resin (volume : $v_{R2}$) in the cavity immediately before the introduction of the coating material. In other words, the molding pressure P is greater than 0 kgf/cm². The coating material is introduced into the boundary between the resin in the cavity and the cavity wall in such a predetermined amount that the resin in the cavity is compressed by the introduced coating material and/or that the movable mold member is moved in the mold-opening direction. The predetermined amount (volume: $v_{F0}$) of the coating material is therefore required to satisfy the following relationship.

$$\begin{aligned}v_{F0} = &\text{(an increment of the cavity volume caused by} \\ &\text{the movement of the movable mold member in the} \\ &\text{mold-opening direction by introducing the coating material)} + \\ &\text{(a decrement of the resin volume caused by} \\ &\text{the compression of the resin in the cavity by} \\ &\text{introducing the coating material)}\end{aligned}$$

That is;

$$v_{F0}=\Delta v_{C3}-\Delta v_{C2}+\Delta v_{R3}$$

The above $v_{F0}$ subsequently satisfies the following relationship.

$$\begin{aligned}v_{F0} &= (v_{C0}+\Delta v_{C2}-v_{R2})+\Delta v_{C3}-\Delta v_{C2}+\Delta v_{R3} \\ &= (v_{C0}+\Delta v_{C3})-(v_{R2}-\Delta v_{R3}) \\ &= \text{(the cavity volume immediately after the introduction} \\ &\quad \text{of the coating material)} - \text{(the resin volume immediately} \\ &\quad \text{after the introduction of the coating material)}\end{aligned}$$

Whether or not $\Delta v_{C3}$ and $\Delta v_{R3}$ have significant values depends upon the pressure for introducing the coating material, the clamping force, the flexibility of the resin, and the type of the clamping operation as already explained. To put it strictly, the volume of the coating material immediately after the introduction is smaller than its volume immediately before its introduction to some extent because of its compressibility as already explained. Since, however, the amount of its volume change is very small, the amount of its volume change is not taken into consideration in the above explanation.

The resin in the cavity is cooled to solidness, so that the volume of the resin finally changes from $v_{R2}$ to $v_{R4}$ through $(v_{R2}-\Delta v_{R3})$. On the other hand, the introduced coating material cures, so that its volume finally changes from $v_{F0}$ to $v_{F4}$. With these volume change in the resin and the coating material, the increment $\Delta v_{C3}$ of the cavity volume caused by the introduction of the coating material changes as well, and changes to $\Delta v_{C4}$ immediately before the mold releasing. However, the molding pressure can be maintained such that the molding pressure before the mold releasing is higher than 0 kgf/cm², by introducing the coating material into the boundary between the resin in the cavity and the cavity wall in such a predetermined amount (volume: $v_{F0}$) that satisfies the following relationship.

(the cavity volume immediately before the mold releasing) =
(the volume of the resin and the coating immediately before the mold releasing) <
(the volume of the resin and the coating immediately after the mold releasing)

That is;

$$v_{C0}+\Delta v_{C4}=v_{R4}+v_{F4}<v_{R5}+v_{F5}$$

In the high-pressure clamping operation, there is used a thermoplastic resin which satisfies $V_2>V_{22}$. FIG. 9A schematically shows a change of the molding pressure with time in the high-pressure clamping operation. FIG. 9B schematically shows a PVT chart of a thermoplastic resin. The molding pressure at a point of time when the weight increase of the resin in the cavity, caused by the dwelling operation, is completed is $P_{20}$, and the temperature of the resin in the cavity at the above point of time is $T_{20}$. In this case, the temperature of the resin in the cavity decreases with the passage of time from the above point of time. If the volume of the cavity during this period is assumed to be constant, the molding pressure caused by the resin in the cavity decreases while the specific volume of the resin remains constant $(V_{20})$.

When the resin in the cavity immediately before the introduction of the coating material has a temperature of $T_{22}$, the specific volume is $V_{20}=V_{22}$. In the high-pressure clamping operation, a thermoplastic resin which satisfies $V_2>V_{22}$ is used, so that the molding pressure P immediately before the introduction of the coating material is always a value over 0 kgf/cm².

As described above, in the high-pressure clamping operation, a thermoplastic resin which satisfies $V_2>V_{22}$ is used, so that $$v_{C0}+\Delta v_{C2}=v_{R2}<v'_{R5}$$

is satisfied. The molding pressure can therefore be maintained in such a state that the molding pressure immediately before the introduction of the coating material is higher than 0 kgf/cm².

In the low-pressure clamping operation, a thermoplastic resin which satisfies $V_2>V_{22}$ is used as well. FIG. 10A schematically shows a change of the molding pressure with time in the low-pressure clamping operation. FIG. 10B schematically shows a PVT chart of a thermoplastic resin. The molding pressure at a point of time when the weight increase of the resin in the cavity, caused by the dwelling operation, is completed is $P_{20}$, and the temperature of the resin in the cavity at the above point of time is $T_{20}$. In this case, the temperature of the resin in the cavity decreases with the passage of time from the above point of time. If the volume of the cavity during this period is assumed to be constant, the molding pressure caused by the resin in the cavity decreases while the specific volume of the resin remains constant $(V_{20})$.

When the clamping force of the mold is decreased, the cavity volume increases by $\Delta v_{C1}$. Although depending upon the size and structure of the mold, when the clamping force of the mold is decreased, the distance (thickness) of the cavity in the mold opening-closing direction increases by about 0.2 mm in some cases. As the result of a decrease in the clamping force of the mold and an increase of the cavity volume by $\Delta v_{C1}$, the specific volume changes to $V_{21}$, and the molding pressure changes to $P_{21}$. The temperature of the resin in the cavity at this point of time is $T_{21}$. As the temperature of the resin in the cavity decreases with the passage of time, the molding pressure caused by the resin in the cavity decreases while the specific volume of the resin remains constant $(V_{21})$. And, the molding pressure caused by the resin immediately before the introduction of the coating material is $P_{22}$, the temperature of the resin in the cavity is $T_{22}$, and the specific volume of the thermoplastic resin under the conditions (pressure $P_{22}$, temperature $T_{22}$) is $V_{22}$ $(=V_{21})$. Since, however, the thermoplastic resin used satisfies $V_2>V_{22}$, the molding pressure immediately before the introduction of the coating material is necessarily over 0 kgf/cm².

As described above, in the low-pressure clamping operation, a thermoplastic resin which satisfies $V_2>V_{22}$ is also used, so that $$v_{C0}+\Delta v_{C2}=v_{R2}<v'_{R5}$$

can be satisfied. The molding pressure can therefore be reliably maintained in such a state that the molding pressure immediately before the introduction of the coating material is higher than 0 kgf/cm².

In the movable mold member spacing operation, a thermoplastic resin which satisfies $V_2>V_{22}$ is used as well. FIG. 11A schematically shows a change of the molding pressure with time in the movable mold member releasing operation. FIG. 11B schematically shows a PVT chart of a thermoplastic resin. The molding pressure at a point of time when the weight increase of the resin in the cavity, caused by the dwelling operation, is completed is $P_{20}$, and the temperature of the resin in the cavity at the above point of time is $T_{20}$. In this case, the temperature of the resin in the cavity decreases with the passage of time from the above point of time. If the volume of the cavity during this period is assumed to be constant, the molding pressure caused by the resin in the cavity decreases while the specific volume of the resin remains constant $(V_{20})$.

After the movable mold member spacing operation is completed, the cavity volume increases by $\Delta v_{C1}$. Although depending upon the size and structure of the mold, immediately after the clamping force is decreased to zero, the distance (thickness) of the cavity in the mold opening-closing direction increases by about 0.2 mm. And, further, at a point of time when the movable mold spacing operation is completed, the movable mold member may be spaced about 0.1 mm from the fixed mold member in some cases. In this case, the amount of movement of the movable mold member from the fixed mold member is finally about 0.3 mm. The cavity volume is increased by $\Delta v_{C1}$ by the movable mold member spacing operation, the specific volume changes to $V_{21}$, and the molding pressure changes to $P_{21}$. The temperature of the resin in the cavity at this point of time is $T_{21}$. As the temperature of the resin in the cavity decreases with the passage of time, the molding pressure caused by the resin in the cavity decreases while the specific volume of the resin remains constant ($V_{21}$). And, the molding pressure caused by the resin immediately before the introduction of the coating material is $P_{22}$, the temperature of the resin in the cavity at this point of time is $T_{22}$, and the specific volume of the thermoplastic resin under the conditions (pressure $P_{22}$, temperature $T_{22}$) is $V_{22}$ (=$V_{21}$). Since, however, the thermoplastic resin used satisfies $V_2 > V_{22}$, the molding pressure immediately before the introduction of the coating material is necessarily over 0 kgf/cm$^2$.

As described above, in the movable mold member spacing operation, a thermoplastic resin which satisfies $V_2 > V_{22}$ is also used, so that $$v_{C0} + \Delta v_{C2} = v_{R2} < v'_{R5}$$

can be satisfied. The molding pressure can therefore be reliably maintained in such a state that the molding pressure immediately before the introduction of the coating material is higher than 0 kgf/cm$^2$.

In the high-pressure clamping operation, the low-pressure clamping operation or the movable mold member spacing operation in the second embodiment of the present invention, there is a case where $v_{R4} < v_{C0} + \Delta v_{C4}$ depending upon thermoplastic resins used. Even in this case, the molding pressure can be maintained such that the molding pressure before the mold releasing is higher than 0 kgf/cm$^2$, by introducing the coating material into between the resin in the cavity and the cavity wall in such a predetermined amount (volume: $v_{F0}$) that satisfies the following relationship.

$$v_{C0} + \Delta v_{C4} = v_{R4} + v_{F4} < v_{R5} + v_{F5}$$

Further, if there is used a thermoplastic resin with which the molding pressure before the mold releasing, caused by the resin in the cavity, is higher than 0 kgf/cm$^2$, the relationship of $$v_{C0} + \Delta v_{C4} = v_{R4} + v_{F4} < v_{R5} + v_{F5}$$

can be necessarily satisfied, so that the molding pressure can be reliably maintained such that the molding pressure immediately before the introduction of the coating material and immediately before the mold releasing is higher than 0 kgf/cm$^2$.

In the injection-molding method of the present invention, differing from the methods of injection-molding a thermoplastic resin, disclosed in the above-explained JP-A-5-301251 and JP-A-5-318527, a predetermined amount of the coating material is introduced into between the resin in the cavity and the cavity wall such that the resin in the cavity is compressed by the introduced coating material and/or that the movable mold member is moved in the mold-opening direction by the introduced coating material. That is, the predetermined amount of the coating material is that which is greater than the volume of a space even if the space is formed between the resin in the cavity and the cavity wall before the introduction of the coating material. That is, the coating material overshot method is employed. And, the molding pressure is maintained such that the molding pressure before the mold releasing is higher than 0 kgf/cm$^2$. Therefore, a pressure is being externally exerted on the introduced coating material (by the cavity wall). As a result, it is reliably made possible to avoid problems in that the gloss of the surface of the coating decreases, that the coating has decreased adhesive force to the thermoplastic resin or that the coating is nonuniform. Other effects and advantages of the present invention will be apparent from the following description.

BRIEF DESCRIPTION OF THE DRAWINGS

The method of injection-molding a thermoplastic resin, provided by the present invention, will be explained hereinafter with reference to Examples and drawings, while the present invention shall not be limited to these Examples.

FIG. 1 schematically shows the state of a change of a cavity, a molten resin or resin and a coating material or coating.

FIG. 23 is a schematic view mainly of a mold portion of an injection molding machine suitable for use in the method of injection-molding a thermoplastic resin in Example 4.

FIG. 27 schematically shows a state of the hydraulic pressure for introducing a coating material in Example 5.

FIG. 28 schematically shows a change of a molding pressure with time in Example 5.

FIG. 29 is a PVT chart of a thermoplastic resin used in Example 5.

DESCRIPTION OF THE PREFERRED EMBODIMENTS

EXAMPLE 1

Figure 2A:
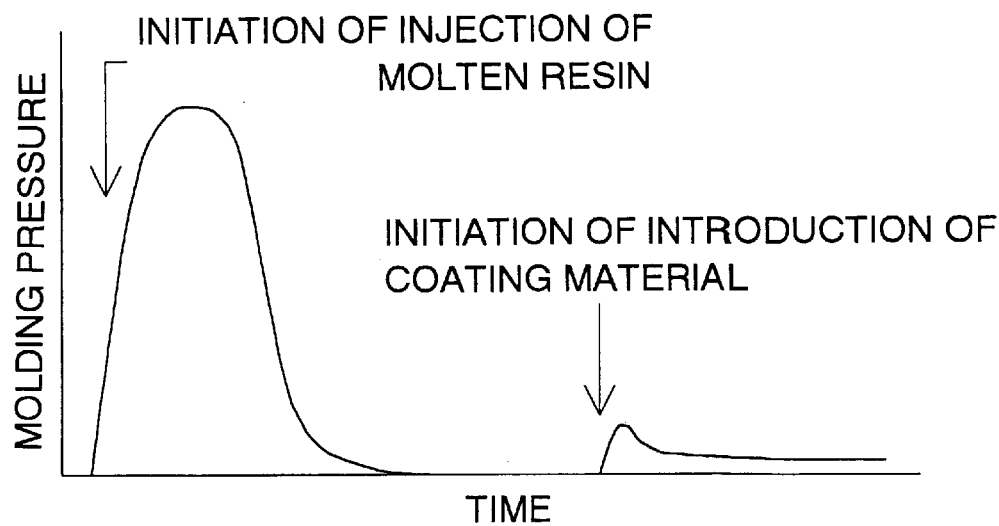
FIGS. 2A and 2B are concerned with the first embodiment of the present invention, and schematically show a change of the molding pressure with time and a PVT chart in the high-pressure clamping operation.
Figure 2B:
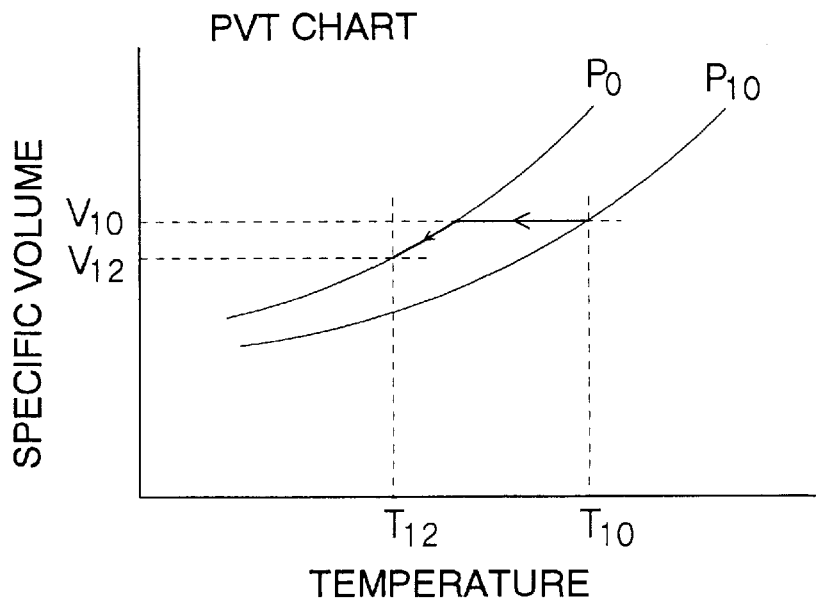
Figure 3:
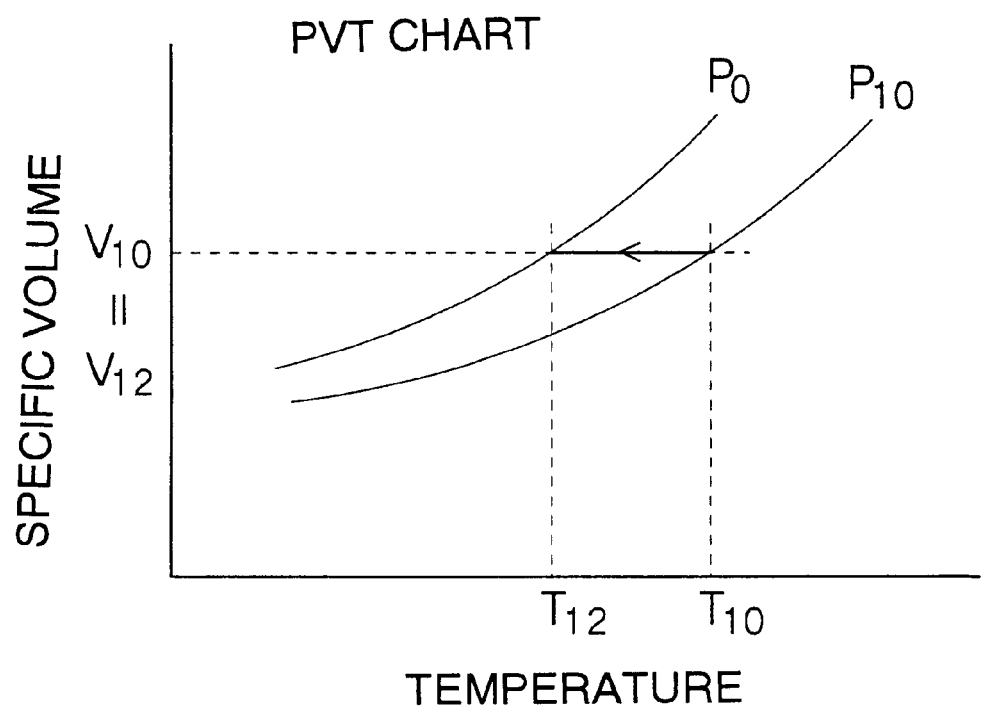
FIG. 3 is concerned with the first embodiment of the present invention, and schematically shows a PVT chart in the high-pressure clamping operation.
Figure 4A:
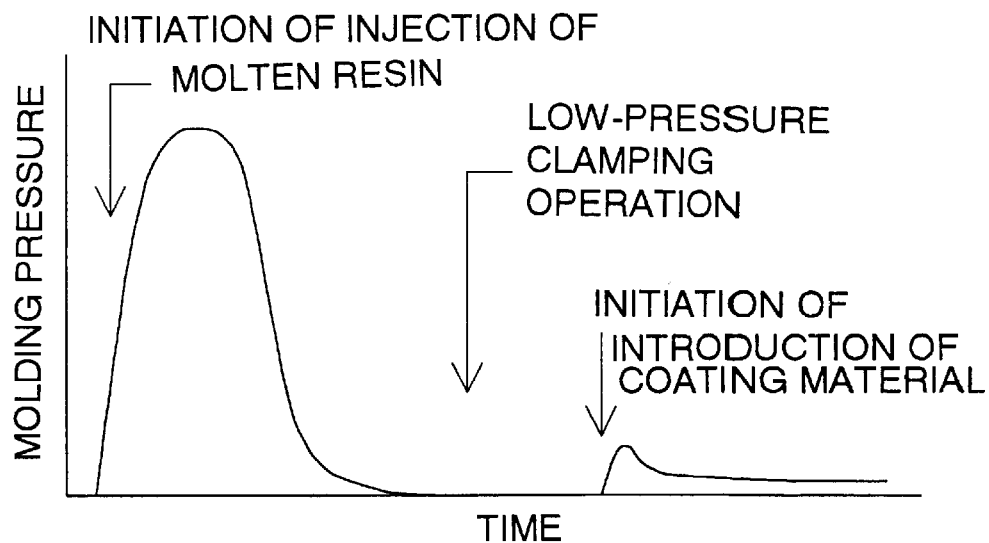
FIGS. 4A and 4B are concerned with the first embodiment of the present invention, and schematically show a change of the molding pressure with time and a PVT chart in the low-pressure clamping operation.
Figure 4B:
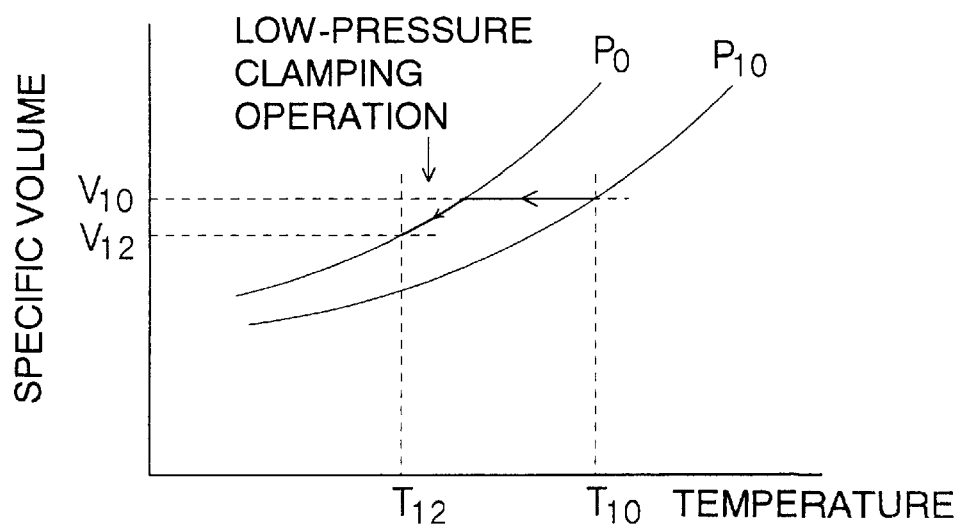
Figure 5A:
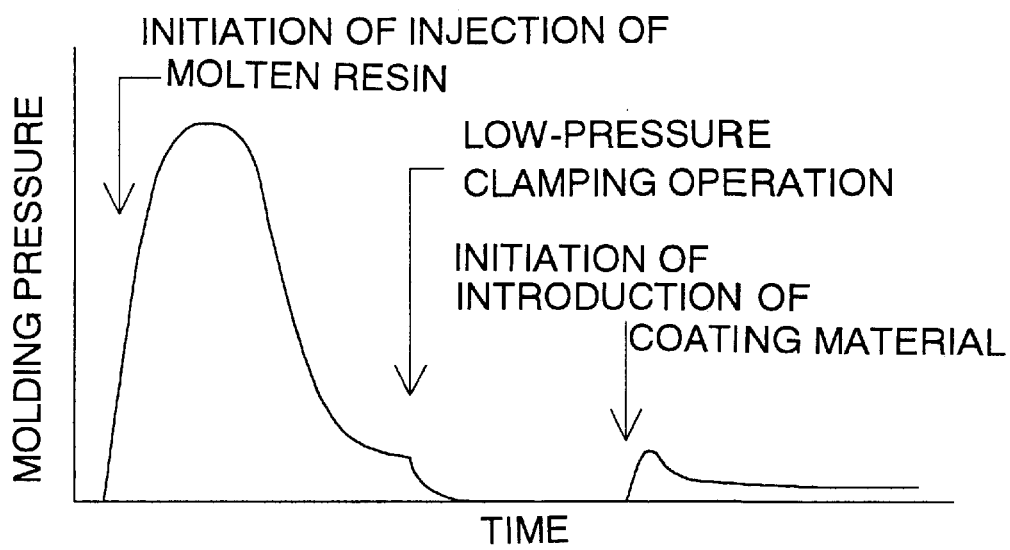
FIGS. 5A and 5B are concerned with the first embodiment of the present invention, and schematically show a change of the molding pressure with time and a PVT chart in the low-pressure clamping operation.
Figure 5B:
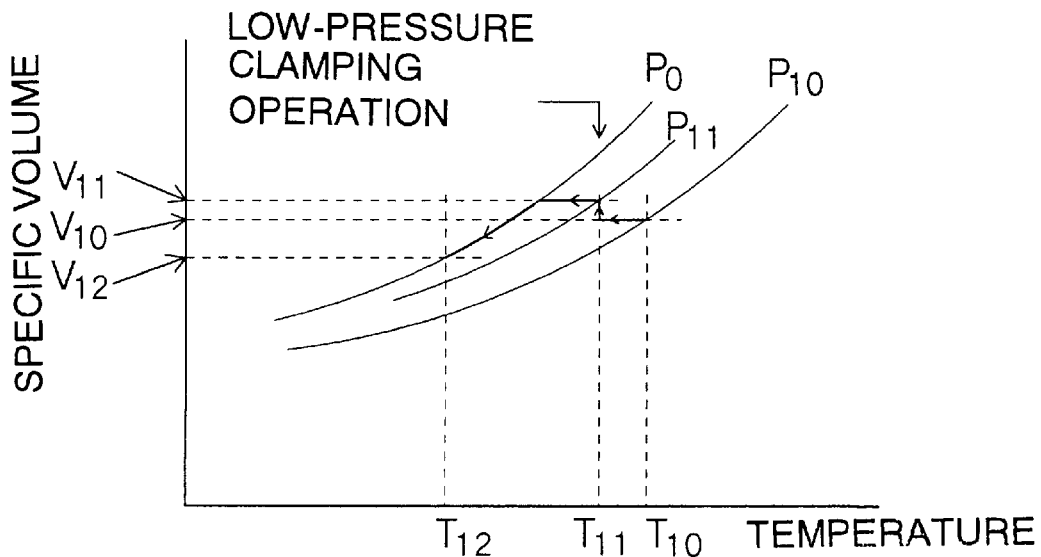
Figure 6A:
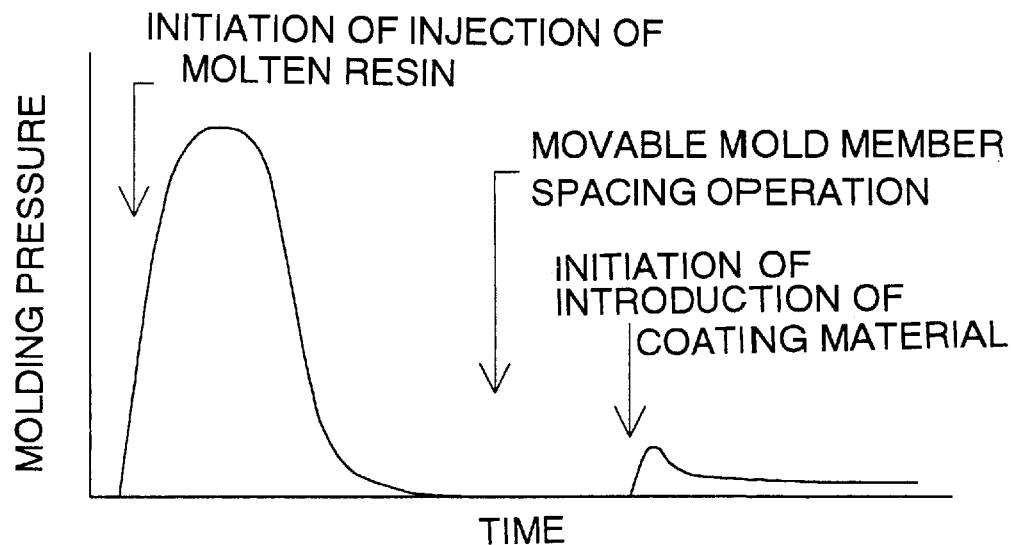
FIGS. 6A and 6B are concerned with the first embodiment of the present invention, and schematically show a change of the molding pressure with time and a PVT chart in the movable mold member spacing operation.
Figure 6B:
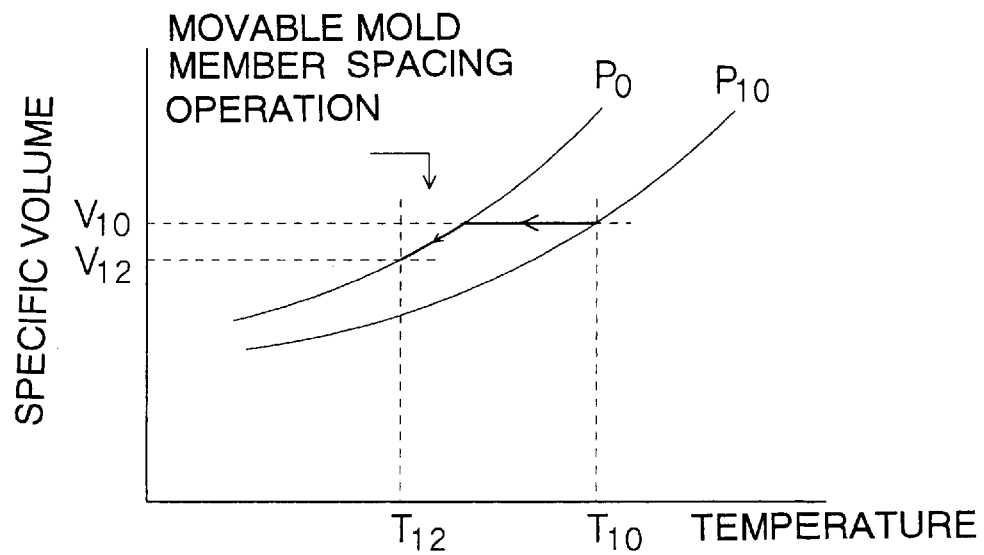
Figure 7A:
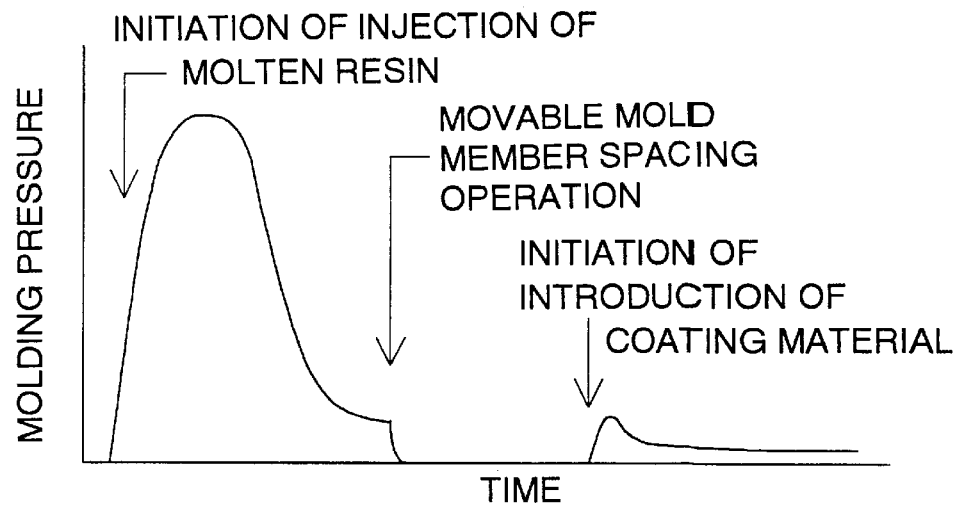
FIGS. 7A and 7B are concerned with the first embodiment of the present invention, and schematically show a change of the molding pressure with time and a PVT chart in the movable mold member spacing operation.
Figure 7B:
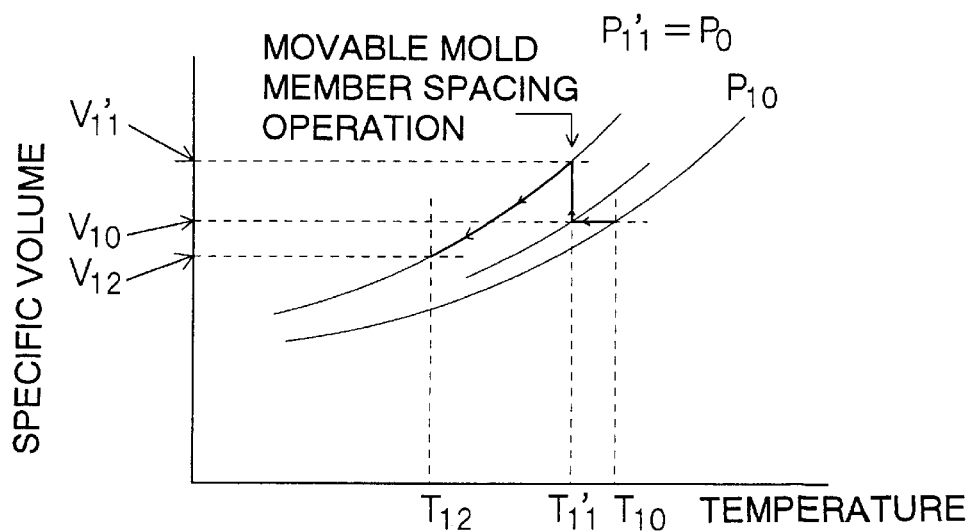
Figure 8A:
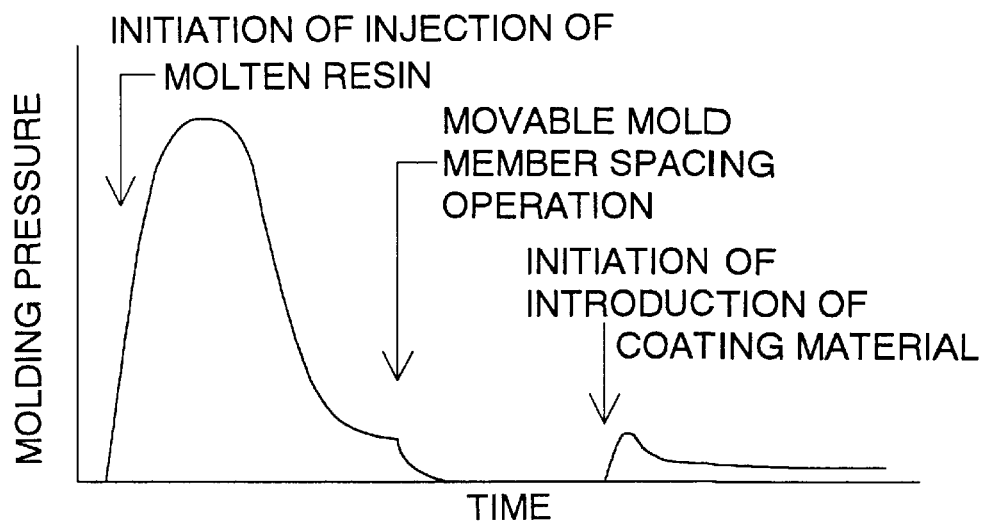
FIGS. 8A and 8B are concerned with the first embodiment of the present invention, and schematically show a change of the molding pressure with time and a PVT chart in the movable mold member spacing operation.
Figure 8B:
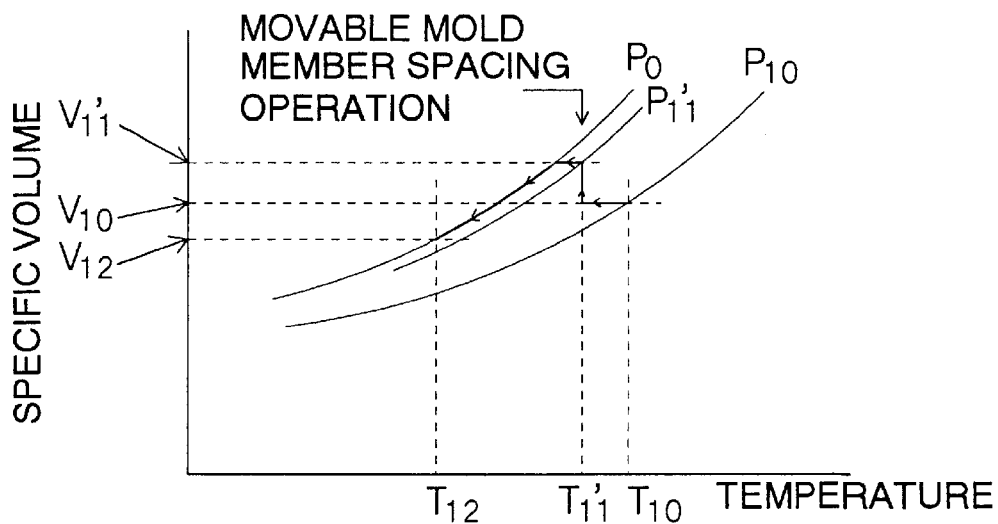
Figure 9A:
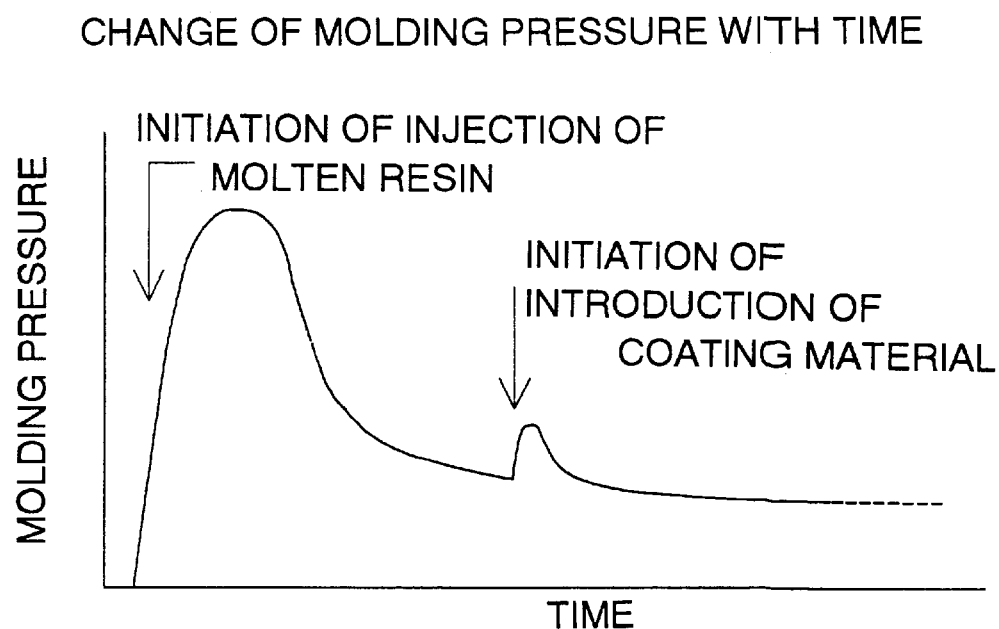
FIGS. 9A and 9B are concerned with the second embodiment of the present invention, and schematically show a change of the molding pressure with time and a PVT chart in the high-pressure clamping operation.
Figure 9B:
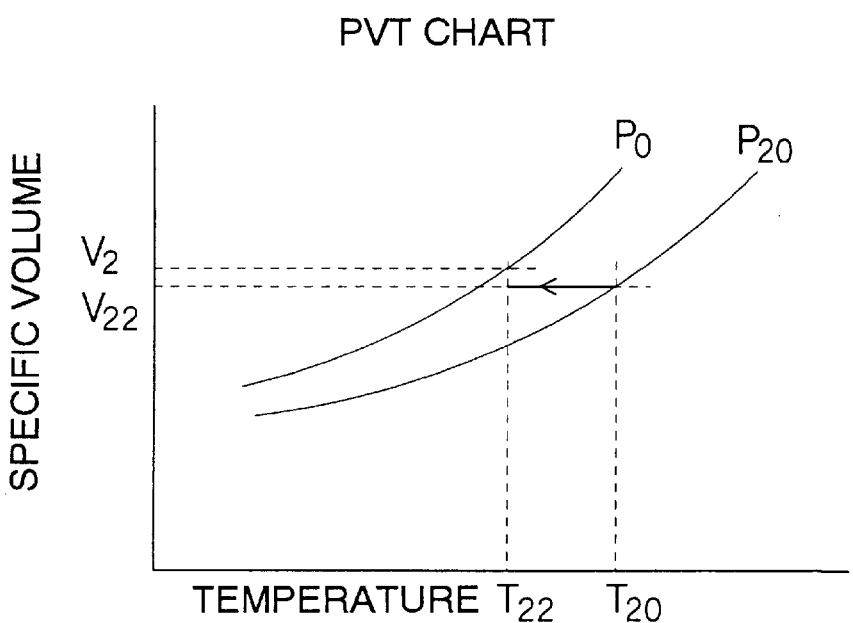
Figure 10A:
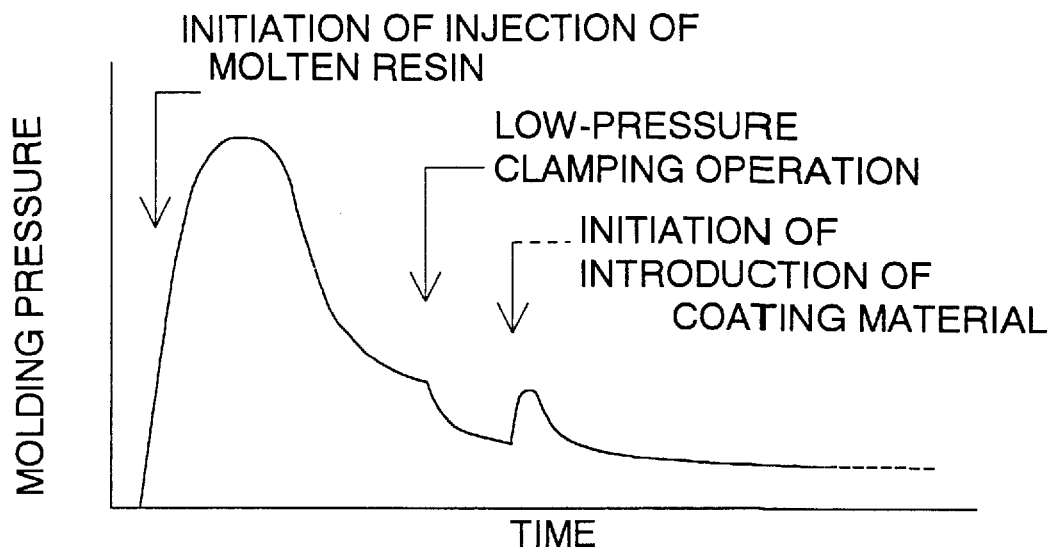
FIGS. 10A and 10B are concerned with the second embodiment of the present invention, and schematically show a change of the molding pressure with time and a PVT chart in the low-pressure clamping operation.
Figure 10B:
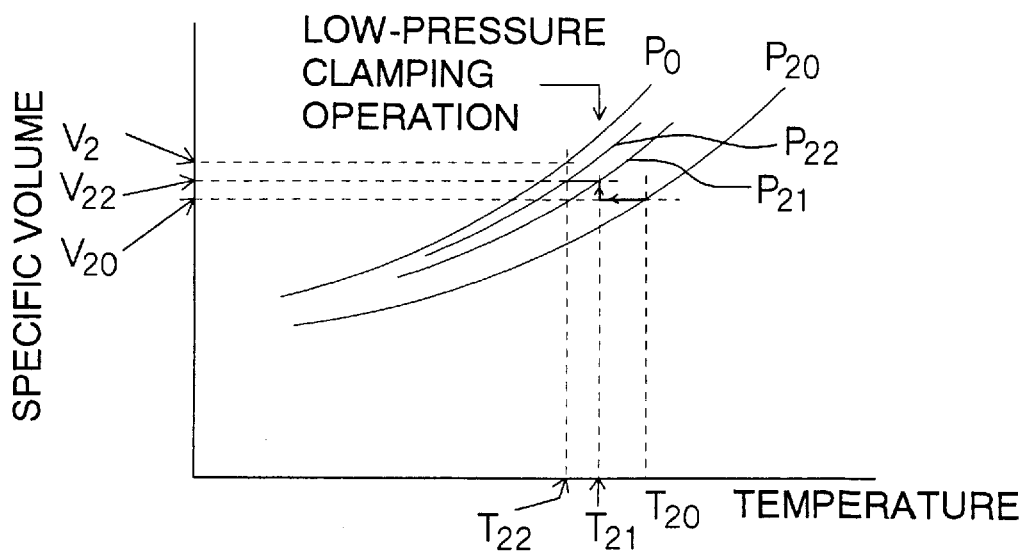
Figure 11A:
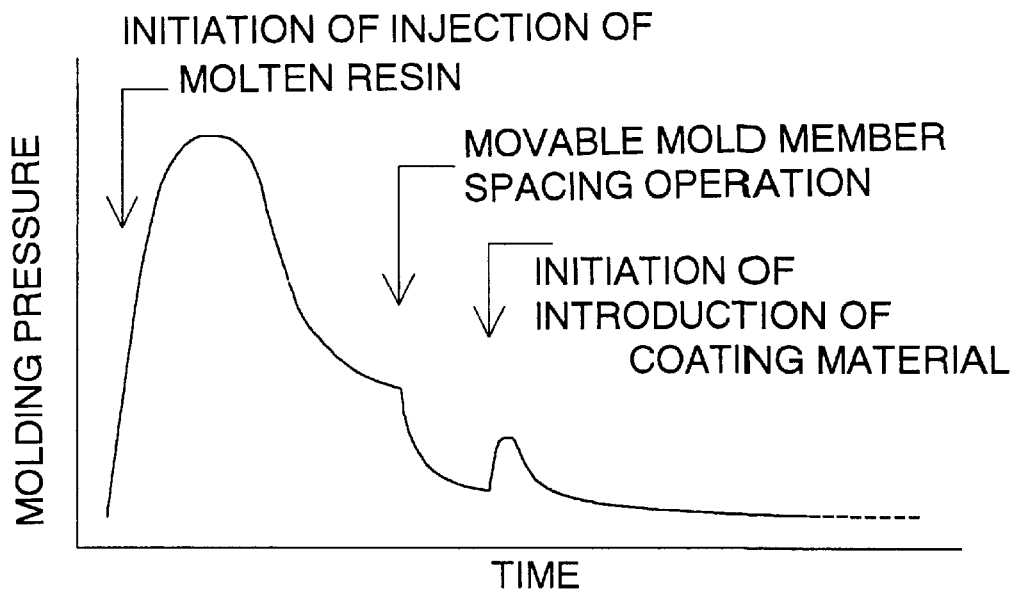
FIGS. 11A and 11B are concerned with the second embodiment of the present invention, and schematically show a change of the molding pressure with time and a PVT chart in the movable mold member spacing operation.
Figure 11B:
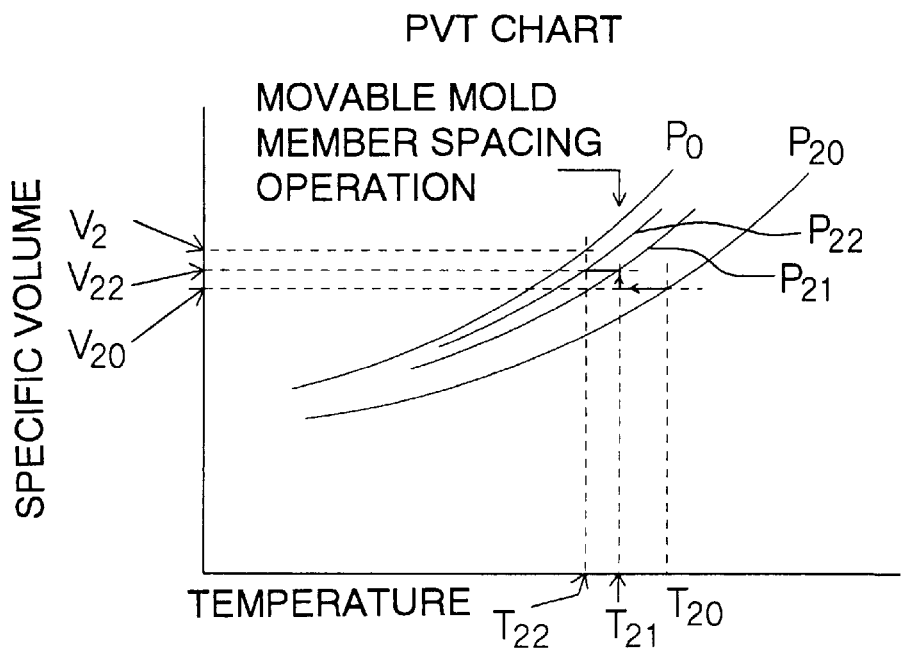
Figure 12:
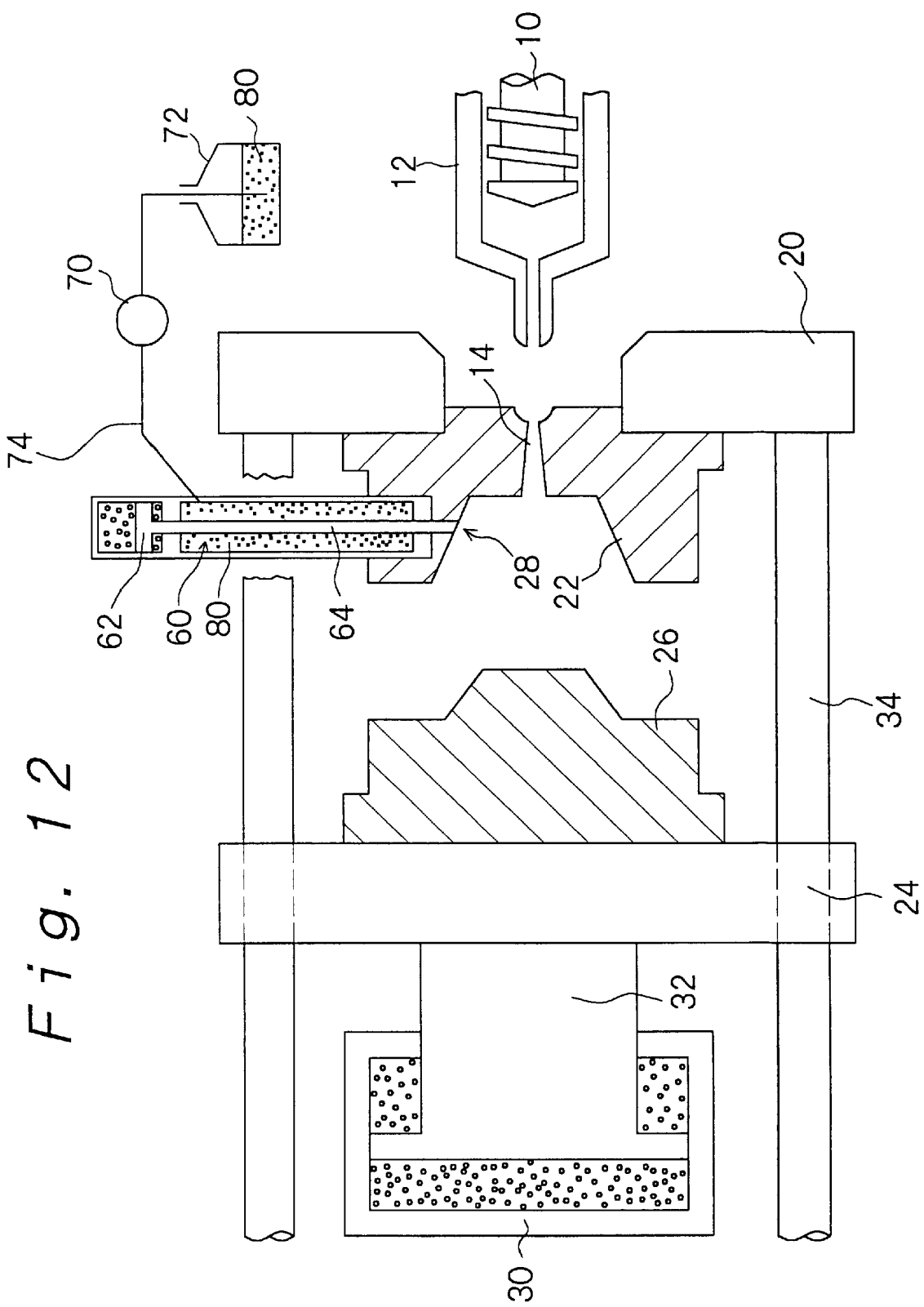
FIG. 12 is a schematic view of an injection molding apparatus suitable for the method of injection-molding a thermoplastic resin, provided by the present invention.

First, the injection molding apparatus suitable for use in the method of injection-molding a thermoplastic resin, provided by the present invention, will be outlined below with reference to FIG. 12. The injection molding apparatus is composed of an injection cylinder 12 having a resin-feeding screw 10 inside, a fixed platen 20, a movable platen 24, tie bars 34, a clamping hydraulic cylinder 30 and a hydraulic piston 32. The movable platen 24 is actuated with the hydraulic piston 32 in the clamping hydraulic cylinder 30 to move in parallel on the tie bars 34.

A mold is composed of a fixed mold member 22 and a movable mold member 26. The fixed mold member 22 is attached to the fixed platen 20, and the movable mold member 26 is attached to the movable platen 24. The fixed mold member 22 is provided with a coating material introduction portion 28. The movable platen 24 is moved toward a right-hand side on FIG. 12 so that the movable mold member 26 is engaged with the fixed mold member 22, and the mold is clamped to form a cavity 50. The clamping force is controlled with the clamping hydraulic cylinder 30. The movable platen 24 is moved toward a left-hand side on FIG. 12 so that the movable mold member 26 is disengaged from the fixed mold member 22 to release the mold.

A coating material introduction device is composed of a coating material feed portion 60, a hydraulic cylinder 62 and a shut-off pin 64 attached to the hydraulic cylinder 62. The coating material introduction portion 28 is opened or closed depending upon the position of the shut-off pin 64. In FIG. 12, the coating material introduction portion 28 is closed with the shut-off pin 64. A coating material 80 is delivered to the coating material feed portion 60 from a coating material tank 72 through a pressure tubing 74 with a pump 70. Further, when the shut-off pin 64 is moved back with the hydraulic cylinder 62, the coating material 80 flows in the coating material introduction portion 28, and when the shut-off pin 64 is moved forward, the coating material 80 is introduced into between a resin in the cavity and the cavity wall through the coating material introduction portion 28. In this manner, a predetermined amount of the coating material accurately measured can be introduced.

In the above coating material introduction system, the coating material introduction mechanism composed of the coating material feed portion 60, the hydraulic cylinder 62, the shut-off pin 64, etc., works as coating material measuring and introduction mechanisms, while the coating material introduction system shall not be limited to the above mechanism. For example, it may be divided into a measuring and introduction mechanisms and a shut-off pin opening and closing mechanism by providing a measuring and introduction cylinder somewhere on the pressure tubing 74. The injection molding apparatus to be explained in Examples hereinafter may have the same system.

Example 1 is concerned with the first embodiment of the present invention. That is, the coating material is introduced in a state in which the molding pressure P caused by a resin injected into the cavity is equivalent to 0 kgf/cm². In other words, a space is formed between the resin in the cavity and the cavity wall, and the coating material is introduced into the space. Example 1 uses an amorphous resin alloy material which is not reinforced, as a thermoplastic resin.

In Example 1, the dwelling operation is carried out after the molten resin is injected into the cavity. Before the coating material is introduced, the clamping force is decreased so that it is lower than the clamping force at the time of injecting the molten resin. That is, the low-pressure clamping operation is employed. More specifically, the clamping force $F_{10}$ at the time of injecting the molten resin was set around 100 tons, and the decreased clamping force $F_{11}$ was around 5 tons. That is, $F_{11}/F_{10}$ nearly equals 0.05.

In Example 1, the molten resin 40 in the cavity 50 shrinks in volume when it is cooled to solidness, whereby the coating material can be introduced in a state in which the molding pressure P caused by the resin injected into the cavity (molding pressure caused by the resin) is equivalent to 0 kgf/cm². In other words, a space (gap) 52 is reliably formed between the resin 40A in the cavity 50 and the wall of the cavity 50 (cavity wall) shown in FIG. 13B. That is, the value of $P_{comp}$ can be reliably made to be 0 kgf/cm². Further, the space 52 having a volume larger than that in the high-pressure clamping operation can be formed by decreasing the clamping force. And, the coating material 80 measured in an amount larger than the volume of the space 52 to a little extent can be reliably and uniformly introduced into the space 52 (in a coating material overshot method).

There was used a thermoplastic resin which satisfied $V_{12} \leq V_{11}$ in which $V_{12}$ is a specific volume of the thermoplastic resin under the conditions of (pressure $P_0$, temperature $T_{12}$), $V_{11}$ is a specific volume of the thermoplastic resin under the conditions of (pressure $P_{11}$, temperature $T_{11}$), $P_{11}$ is a molding pressure immediately after the clamping force of the mold is decreased, $T_{11}$ is a temperature of the thermoplastic resin in the cavity at the above point of time, $T_{12}$ is a temperature of the thermoplastic resin in the cavity immediately before the introduction of the coating material, and $P_0$ is atmospheric pressure.

Figure 18:
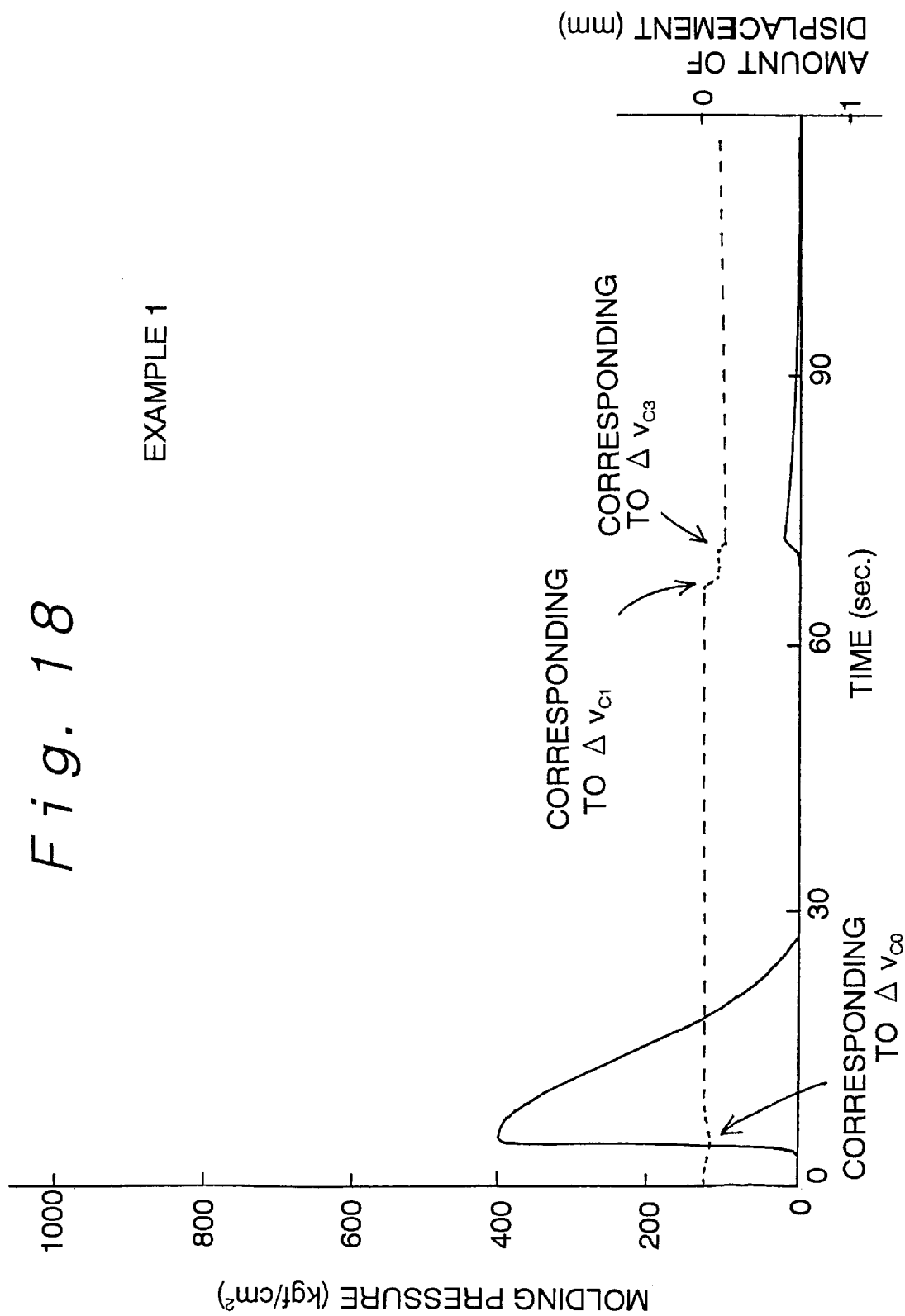
FIG. 18 shows a change of a molding pressure with time caused by a resin, a change of a molding pressure with time caused by a coating material, and a displacement of a movable mold member from a fixed mold member in Example 1.

The method of injection-molding a thermoplastic resin in Example 1 will be explained in detail below with reference to FIGS. 13 to 16, in which the fixed platen 20, the clamping hydraulic cylinder 30, the hydraulic piston 32 and the tie bars 34 are omitted. FIG. 18 shows a change of the molding pressure with time, caused by the resin, a change of the molding pressure with time, caused by the coating material (to be also referred to as the molding pressure caused by the coating material hereinafter), and a displacement of the movable mold member from the fixed mold member in Example 1.

In Examples hereinafter, molten resins were injection-molded with an IS100 injection molding machine (supplied by Toshiba Machine Co., Ltd.) with clamping the mold at a clamping force of about 100 tons. The cavity had the form for producing a nearly box-shaped form having a length of about 100 mm, a width of about 30 mm, a depth of about 10 mm and a thickness of 2 mm. The form of the cavity shall not be limited to this box form, and the cavity may have any form as required. A gate portion 14 was structured as a direct gate. The mold may have a socket and spigot structure (a telescopic structure) in which the cavity is maintained even if the fixed mold member 22 and the movable mold member 26 are spaced to some extent, while illustrating the socket and spigot structure is omitted in the above Figures. The socket and spigot structure will be explained later with reference to FIG. 23.

Example 1 used the following materials.

Molding thermoplastic resin: polycarbonate/polyethylene terephthalate alloy resin (Iupilon MB2112, supplied by Mitsubishi Engineering-Plastics Corp.)

Coating to be formed: a coating composition

Materials for Composition:

|  | parts by weight |
| --- | --- |
| Urethane acrylate oligomer: | 12 |
| Epoxy acrylate oligomer: | 20 |
| Tripropylene glycol diacrylate: | 20 |
| Zinc stearate: | 0.5 |
| 8% Cobalt octylate: | 0.5 |

-continued

|  | parts by weight |
| --- | --- |
| Titanium oxide: | 10 |
| Talc: | 15 |
| Calcium carbonate: | 20 |
| t-Butyl peroxybenzoate: | 2 |

The injection-moldling conditions were as follows.

| Mold temperature: | 130° C. |
| --- | --- |
| Molten resin temperature: | 290° C. |
| Injection pressure: | 800 kgf/cm²-G |

The above mold temperature is a temperature on the cavity surface of the cavity 50, the above molten resin temperature is a temperature of a molten resin in the injection cylinder 12, and the injection pressure is a value of a pressure exerted on the thermoplastic resin feed screw 10. These terms are used in these senses in Examples hereinafter.

Figure 13A:
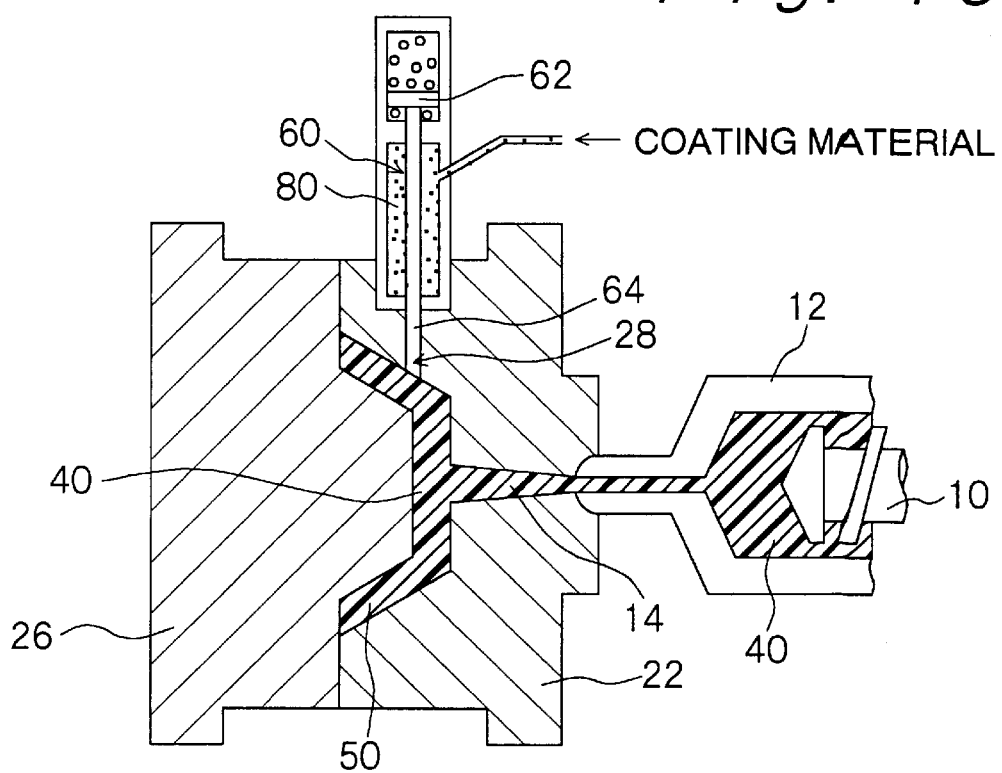
FIGS. 13A and 13B are schematic views of a part of a mold, etc., showing an injection state of a molten resin and a state before the introduction of a coating material, in the method of injection-molding a thermoplastic resin in Example 1.

As shown in FIG. 13A, a molten resin 40 of the thermoplastic resin was injected into the cavity 50 from the injection cylinder 12 through the gate portion 14 to fill the cavity 50 with the molten resin 40. The cavity 50 was formed by clamping the fixed mold member 22 and the movable mold member 26 at high pressure (at $F_{10}$=about 100 tons in Example 1). In this case, the hydraulic cylinder 62 for the coating material introduction device was in a forward position to close the coating material introduction portion 28 with the tip of the shut-off pin 64. The coating material feed portion 60 and the cavity 50 were thereby not communicated with each other, so that the coating material 80 did not flow into the cavity 50 and that the molten resin 40 did not flow into the coating material feed portion 60.

Immediately after the injection of the molten resin was completed, a pressure was applied to the resin 40A in the cavity 50 with a thermoplastic resin feeding screw 10. The operation of applying a pressure to the resin 40A in the cavity 50 is the dwelling operation hereinafter, and this pressure is a dwelling pressure. The conditions for the dwelling operation were as follows.

| Dwelling pressure: | 500 kgf/cm²-G |
| --- | --- |
| Dwelling time (period): | 10 seconds |

The value of the dwelling pressure is the value of the pressure exerted on the thermoplastic resin feeding screw 10, and the dwelling time was nearly equivalent to a gate-seal time. The dwelling operation is carried out for preventing the occurrence of a sink mark and voids on an injection-molded article and for improving the imprintability of the cavity wall surface of the cavity 50 to the injection-molded article.

After the dwelling operation was completed, the clamping force was decreased by operating the clamping hydraulic cylinder 30. The conditions for decreasing the clamping force were as follows.

Clamping force after decreased ($F_{11}$): about 5 tons.
Time at which the decreasing was initiated: 50 seconds after the dwelling operation was completed.

Figure 13B:
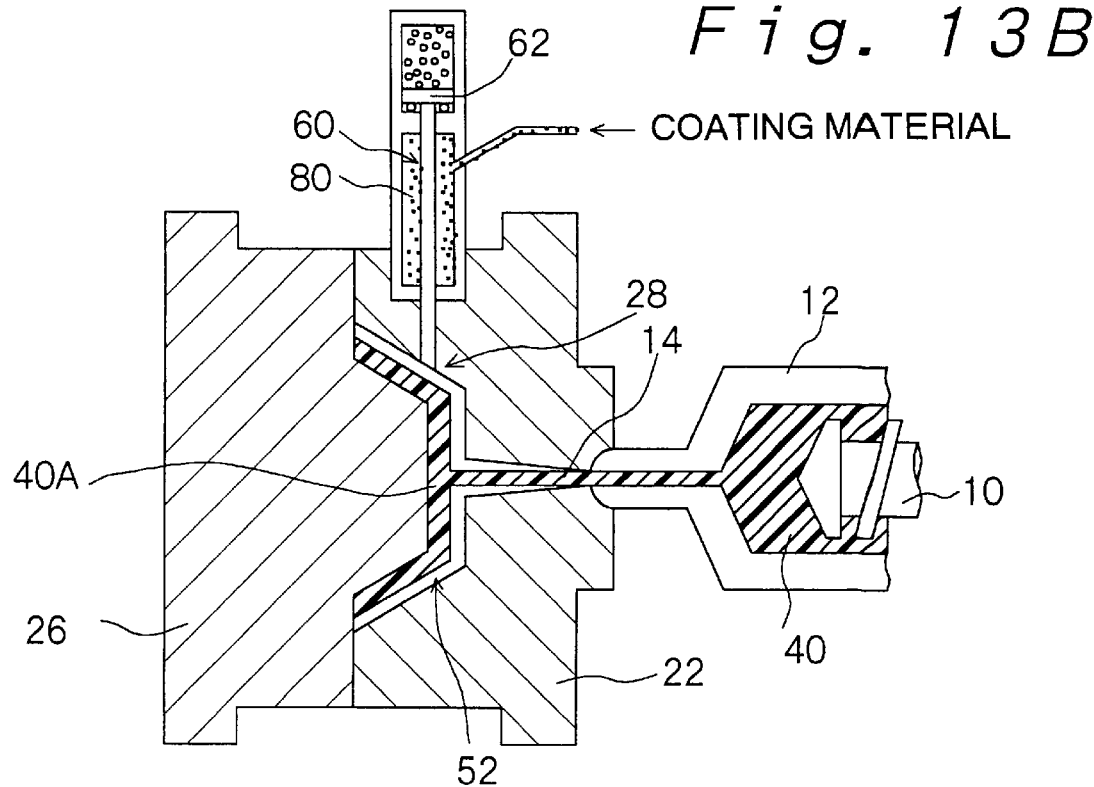

The molding thermoplastic resin used in Example 1 had a large volume shrinkage percentage ($V_{12} \leq V_{11}$). As a result, the molding pressure caused by the resin was decreased to 0 kgf/cm², so that formed was a large space 52 sufficient for forming a coating between the resin 40A in the cavity 50 and the cavity wall of the cavity 50. FIG. 13B schematically shows this state. The volume $v_{space}$ of the space 52 immediately before the introduction of the coating material was $$v_{space} = v_{C0} + \Delta v_{C2} - v_{R2}.$$

In other words, in (molding pressure) × (projected area of molded article) =
$(P_I - P_{loss} + P_{comp}) \times$ (projected area of molded article), all of $P_I$, $P_{loss}$ and $P_{comp}$ were brought into 0 kgf/cm². In this case, the resin 40A shrank generally toward the movable mold member 26 side, and for this reason and due to the decrease in the clamping force, the space 52 was formed between the cavity wall on the fixed mold member 22 side and the resin 40A.

Thereafter, the hydraulic cylinder 62 of the coating material introduction device was moved backward to move back the tip of the shut-off pin 64, so that the coating material introduction portion 28 was opened. As a result, the coating material feed portion 60 and the space 52 were communicated with each other. Further, the coating material 80 was fed to the coating material feed portion 60 through the pump 70. The coating material was thereby filled in the coating material introduction portion 28, while the thickness of the space 52 was much smaller than that of the flow path of the coating material introduction portion 28, and the coating material had no sufficiently low viscosity. At this point of time, therefore, the coating material 80 did not sufficiently fill in the space 52 (see FIG. 14A).

Then, the hydraulic cylinder 62 of the coating material introduction device was moved forward to move forward the tip of the shut-off pin 64. FIG. 14B shows a state immediately before the introduction of the coating material. The tip of the shut-off pin 64 was further moved forward, so that the coating material 80 was introduced into the space 52 between the resin 40A in the cavity 50 and the cavity wall (see FIG. 15A). The introduction of the coating material was initiated 54 seconds after the dwelling period was terminated. In this case, the coating material 80 was introduced while it compressed the resin 40A in the cavity 50, while it spaced the movable mold member 26 from the fixed mold member 22 to some extent or while it worked in both ways. That is, the coating material was introduced in such a predetermined amount that satisfies the following relationship.

$$v_{F0} = v_{C0} + \Delta v_{C3} + \Delta v_{R3} - v_{R2}$$

Specifically, the coating material was introduced in an amount of 0.47 cm³. The state in which the coating material 80 is introduced into the space (gap) 52 between the resin 40A in the cavity 50 and the cavity wall depends upon the pressure for introducing the coating material, the clamping force and the flexibility of the resin 40A. Further, since the low-pressure clamping operation was carried out, the value of $\Delta v_{C3}$ could be made to be greater, and a thick coating could be uniformly formed on the surface of an injection-molded article.

The conditions for introducing the coating material were as follows.

Pressure for introducing the coating material ($P_{inj}$): about 15 kgf/cm²–G

Molding pressure immediately before the introduction of the coating material (P): 0 kgf/cm²

Peak pressure of the molding pressure immediately after the introduction of the coating material ($p_{peak}$): 15 kgf/cm²

Figure 17:
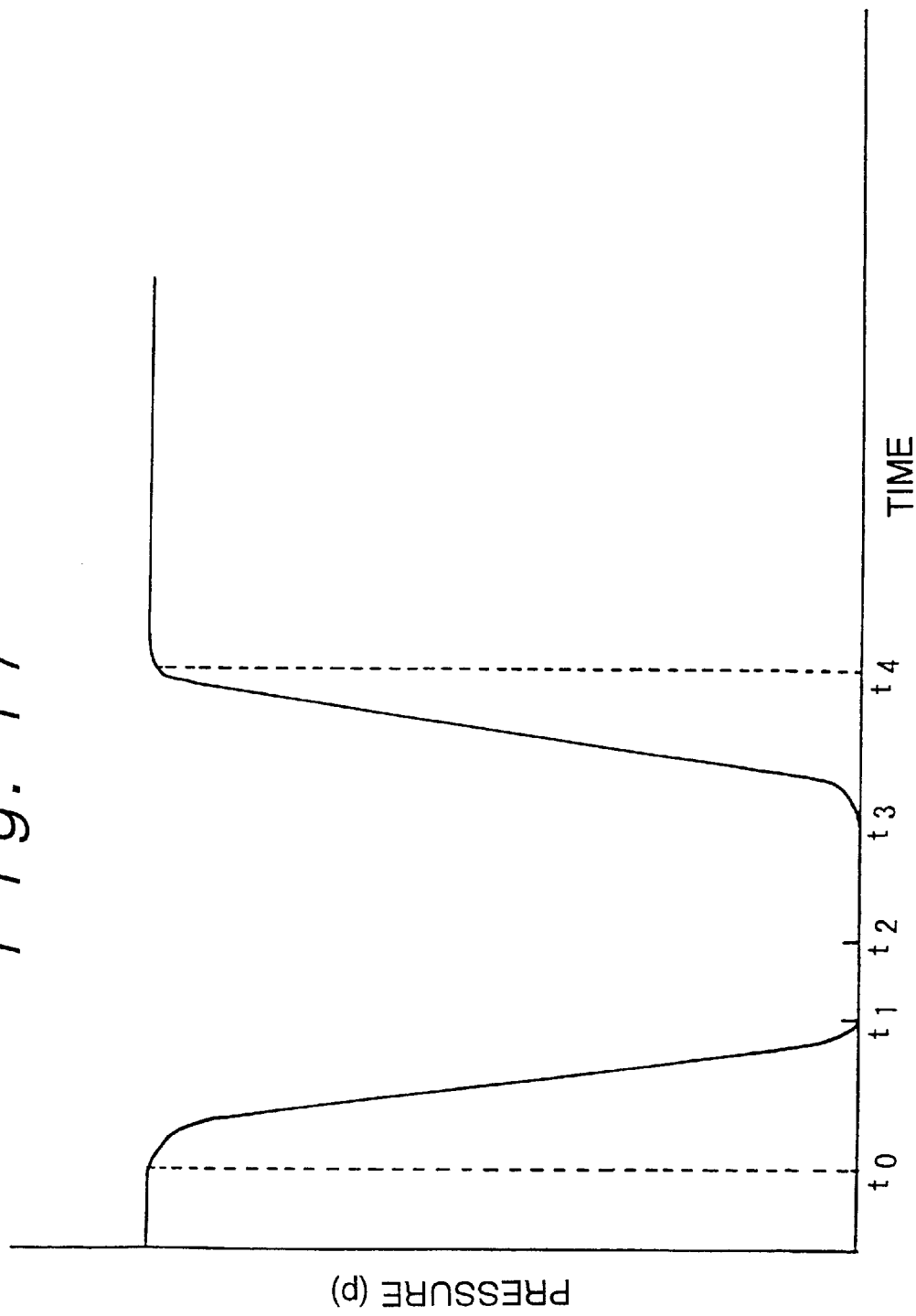
FIG. 17 schematically shows a change of the hydraulic pressure for introducing a coating material.

FIG. 17 schematically shows a change of hydraulic pressure exerted on the shut-off pin 64 during the introduction of the coating material. In the state (time $t_0$) shown in FIG. 13B, a high pressure was applied to the shut-off pin 64 with the hydraulic cylinder 62 so that the shut-off pin 64 was not moved back by the injection pressure of the molten resin. Then, the pressure to be exerted on the shut-off pin 64 was reduced to 0 kgf/cm²–G, and further, a pressure was exerted on the shut-off pin 64 in the backward direction, whereby the shut-off pin 64 was moved back as shown in FIG. 14A (time $t_1$–$t_2$).

Figure 14A:
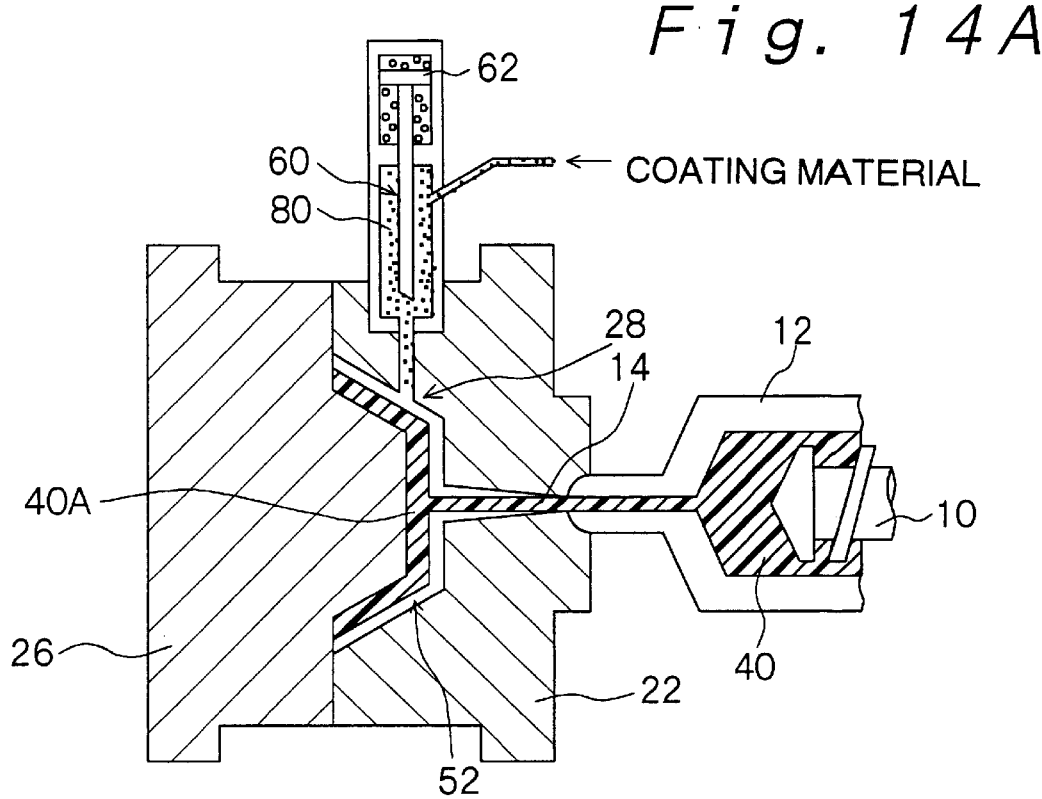
FIGS. 14A and 14B are schematic views of a part of a mold, etc., showing a state immediately before the introduction of a coating material, and a state in which the introduction of the coating material is initiated, in the method of injection-molding a thermoplastic resin in Example 1.
Figure 14B:
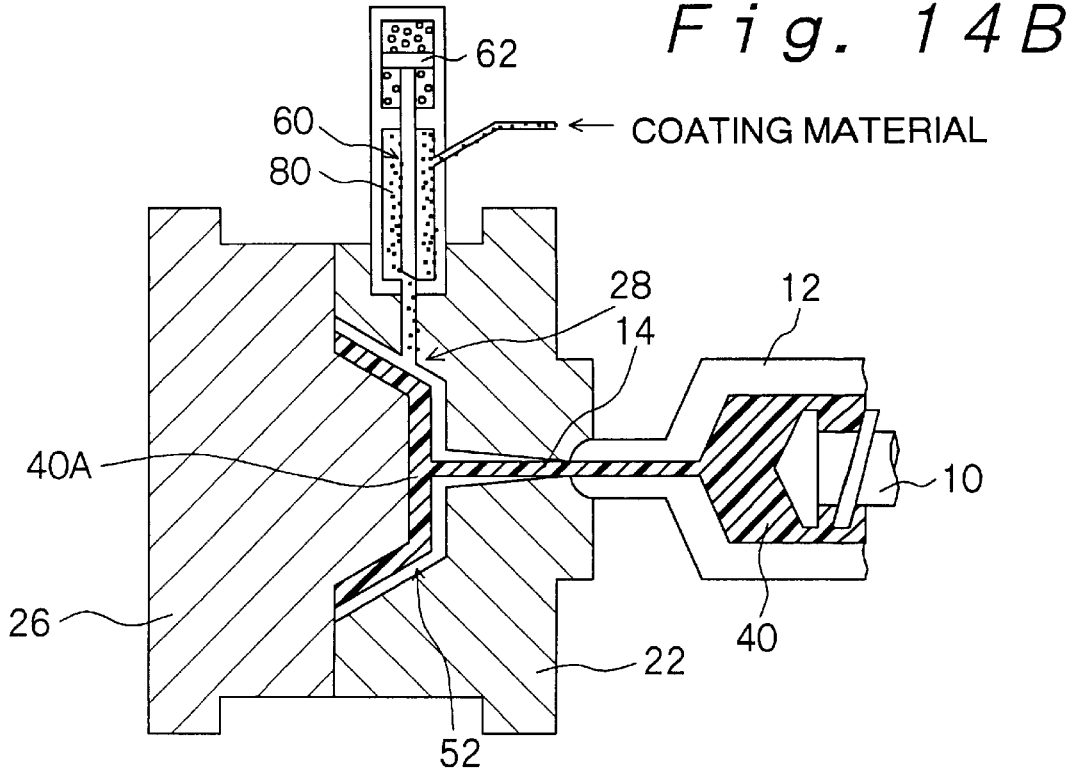
Figure 15A:
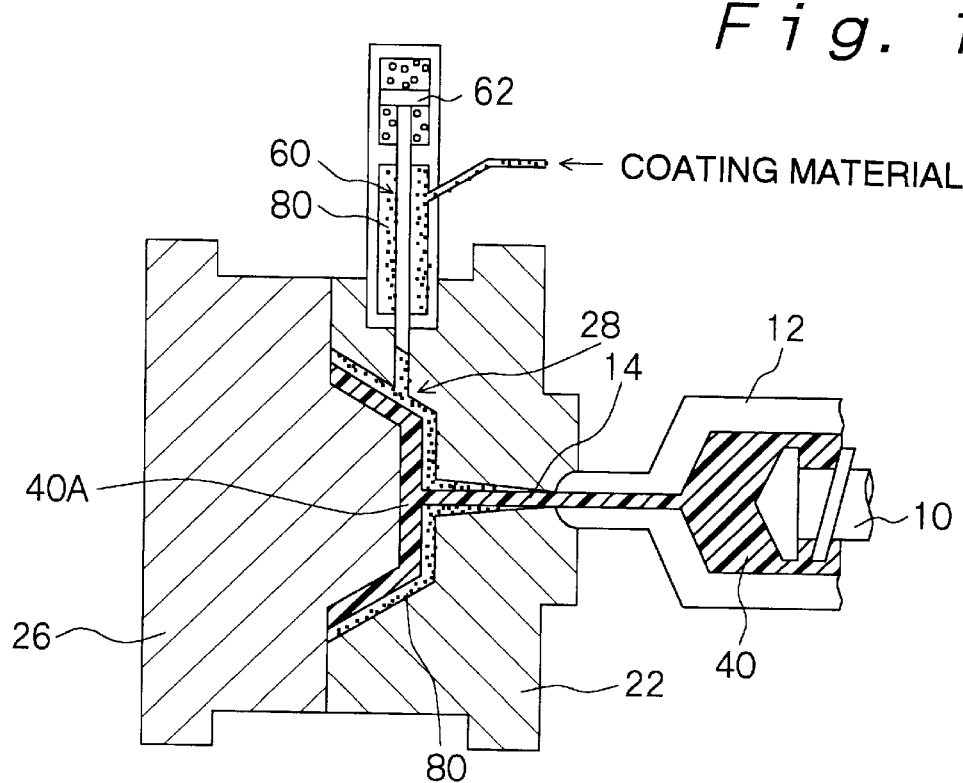
FIGS. 15A and 15B are schematic views of a part of a mold, etc., showing a state in which a coating material is being introduced and a state in which the introduction of the coating material is completed, in the method of injection-molding a thermoplastic resin in Example 1.
Figure 15B:
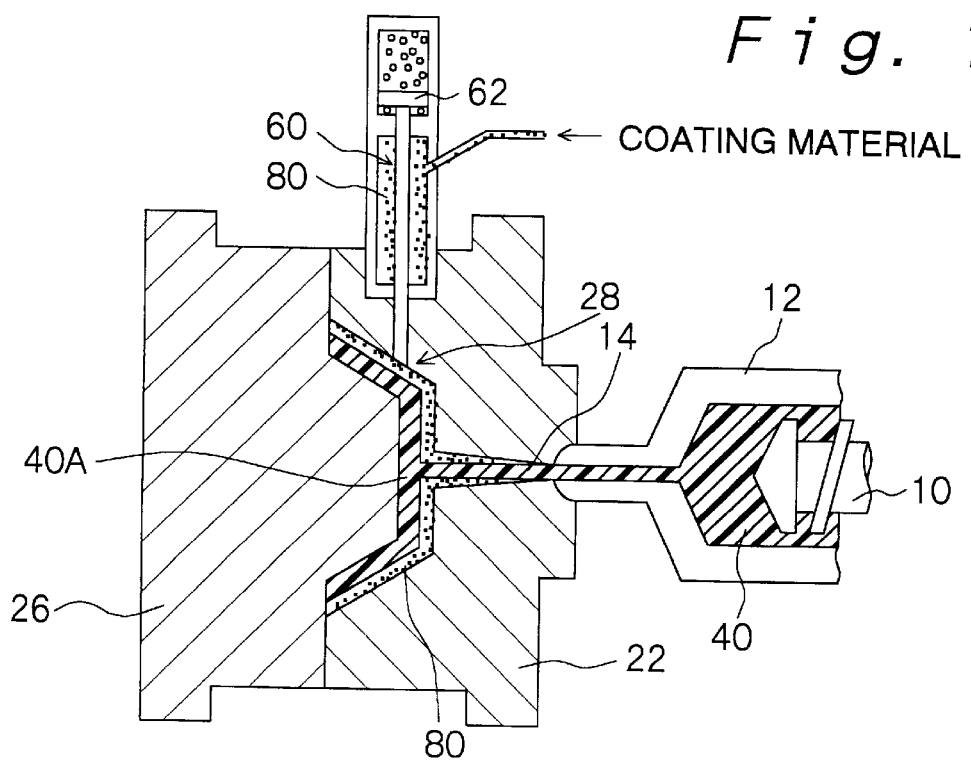

In the state (time $t_2$) shown in FIG. 14A, the shut-off pin 64 started to move forward, and at time $t_3$, the shut-off pin 64 arrived at a state shown in FIG. 14B. Then, the introduction of the coating material was initiated. The pressure ($p_{inj}$) for introducing the coating material equaled the total of the molding pressure P and the flow resistance value of the coating material. When the movement of the shut-off pin 64 forward proceeded considerably, and as the coating material in an amount equivalent to the volume of the space was introduced, it was difficult to introduce the coating material (see FIG. 15A). The method, in which the introduction of the coating material is terminated in this sate, corresponds to the coating material full shot method. As the introduction of the coating material continued, the pressure to be applied to the shut-off pin 64, required for further introducing the coating material, increased. At a time $t_4$ in FIG. 17, the shut-off pin 64 arrived at its forward end, and the coating material introduction portion 28 was closed with the tip of the shut-off pin 64 (see FIG. 15B). In this manner, the coating material in an amount larger than the volume of the space 52 was introduced into the space 52 (coating material overshot method). In Example 1, the pressure for introducing the coating material ($p_{inj}$) was not confirmed on the basis of a change in the hydraulic pressure exerted on the shut-off pin 64. The introduction of the coating material finished, and the coating material feed portion 60 and the cavity 50 ware no longer communicated with each other. The hydraulic cylinder 62 worked on to exert a pressure on the shut-off pin 64 so that the shut-off pin 64 was not moved back. At a point of time when the introduction of the coating material was completed, there was the molding pressure caused by the coating material.

After the introduction of the coating material id completed, the clamping force may be maintained at a decreased level, or it may be increased to such an extent that the formed coating is not damaged.

Figure 16:
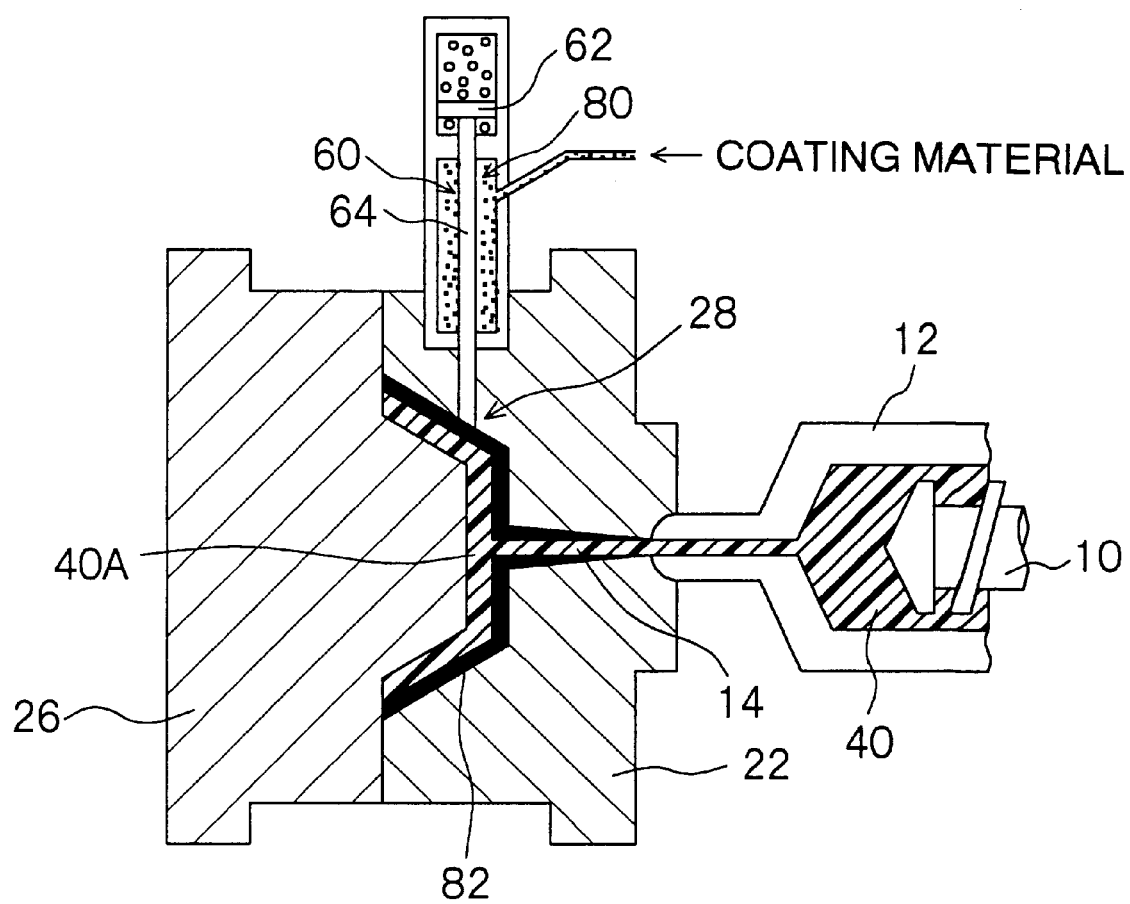
FIG. 16 is a schematic view of a part of a mold, etc., showing a state in which the formation of a coating is completed in the method of injection-molding a thermoplastic resin in Example 1.

Then, the coating material 80 was cured completely or to such an extent that the mold releasing operation was not hindered, to form a coating 82 on the surface of the resin 40A in the cavity 50 (see FIG. 16). The curing was carried out for 120 seconds. This period of time was also for cooling and solidifying the injection-molded resin. Then, the clamping force which was exerted so far was removed by moving the clamping hydraulic cylinder 30 backward, to carry out the mold releasing. Finally, the injection-molded article was taken out of the mold.

In the above manner, there was obtained an injection-molded article having a coating 82 of the coating composition on nearly the entire surface thereof. The coating 82 had an average thickness of 80 μm in the bottom portion of the box-shaped injection-molded article.

In FIG. 18, a solid line shows a change of the molding pressure with time, caused by the resin, and a change of the molding pressure with time, caused by the coating material, in Example 1. Further, a dotted line shows a displacement of the movable mold member from the fixed mold member.

In Example 1, the peak pressure $p_{peak}$ of the molding pressure caused by the coating material was 15 kgf/cm², and the molding pressure p' caused by the coating material immediately before the mold releasing was 5 kgf/cm². It is because the volume of the coating 82, in spite of its shrinkage in volume, was greater than the volume of the space 52 that the molding pressure p' immediately before the mold releasing was maintained at a high level, not 0 kgf/cm². That is, by introducing a predetermined amount (volume: $v_{F0}$) of the coating material into the space 52 between the resin in the cavity and the cavity wall such that the relationship of $$v_{C0} + \Delta v_{C4} = v_{R4} + v_{F4} < v_{R5} + v_{F5}$$

is satisfied, the molding pressure can be maintained in such a state that the molding pressure before the mold releasing is higher than 0 kgf/cm².

By maintaining the molding pressure p' immediately before the mold releasing, caused by the coating material, at a high level over 0 kgf/cm², the coating is always pressed with the cavity wall. As a result, the coating formed on the injection-molded article surface can have high uniformity, gloss and adhesive ability. In FIG. 18, the molding pressure when the resin in the cavity is fully cooled to solidness appears to be 0 kgf/cm² due to the contraction scale of the axis of ordinates, while there is actually a molding pressure over 0 kgf/cm².

When the molten resin is injected into the cavity, the distance (thickness) of the cavity in the mold opening-closing direction increases by some extent as shown in FIG. 18. This displacement is equivalent to $\Delta v_{C0}$. After the injection of the molten resin is completed, the displacement of the movable mold member from the fixed mold member is 0 mm. When the low-pressure clamping operation is carried out, the distance (thickness) of the cavity in the mold opening-closing direction increases by some extent. This displacement is equivalent to $\Delta v_{C1}$. The distance (thickness) of the cavity in the mold opening-closing direction further increases by some extent by introducing the coating material. This displacement is equivalent to $\Delta v_{C3}$. After the coating material is introduced, the displacement comes near to 0 mm due to the contraction of the coating material in volume. Since, however, the molding pressure caused by the coating material is not 0 kgf/cm², the displacement is not at all 0 mm.

Figure 19:
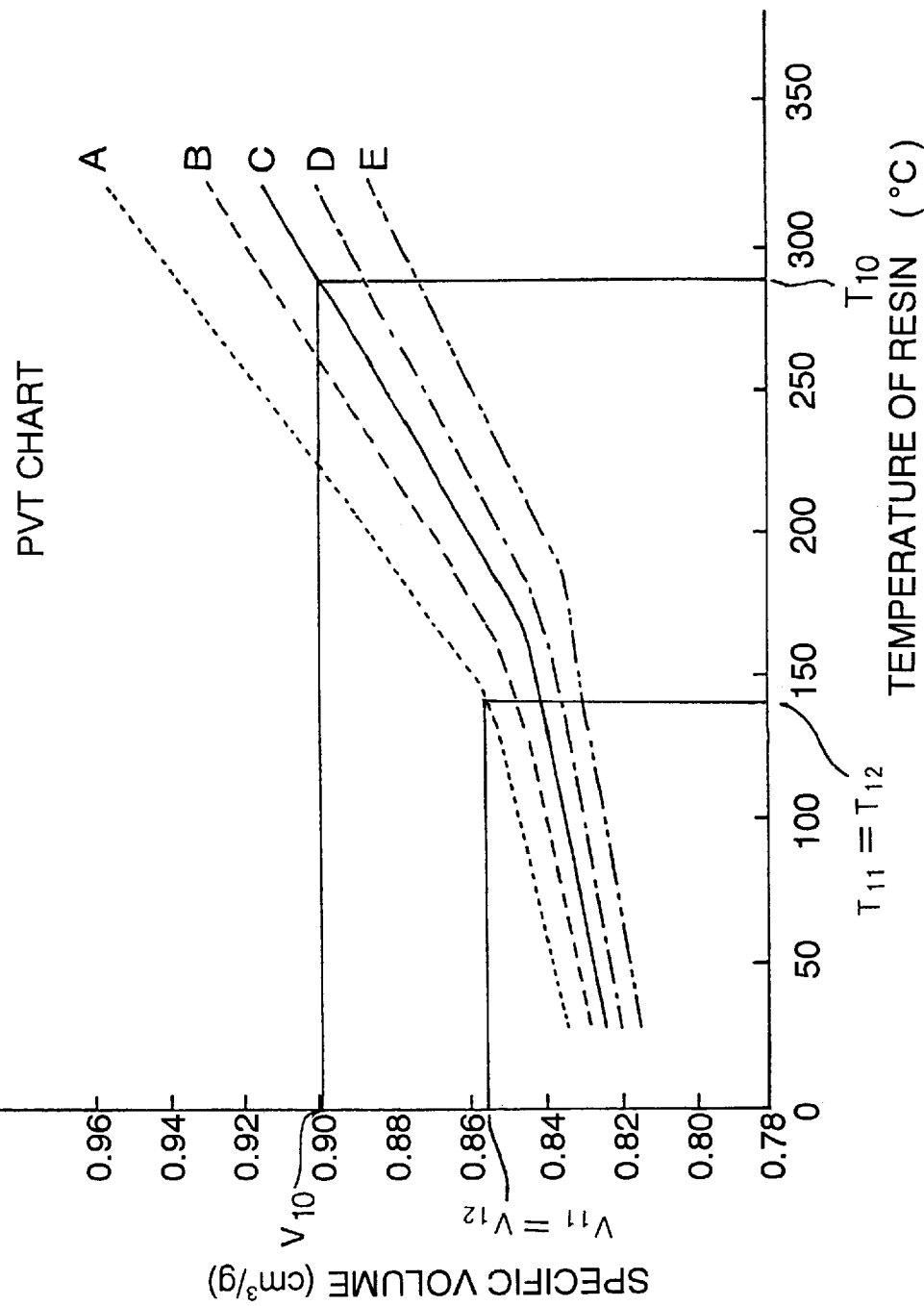
FIG. 19 is a PVT chart of a thermoplastic resin used in Example 1.

FIG. 19 shows a PVT chart of the thermoplastic resin used in Example 1 (polycarbonate/polyethylene terephthalate alloy resin, Iupilon MB2112). In FIG. 19, A shows a relationship between the resin temperature and the specific volume at a pressure of 1 kgf/cm² (atmospheric pressure), B shows the same relationship at a pressure of 300 f/cm², C shows the same relationship at a pressure of 500 kgf/cm², D shows the same relationship at a pressure of 700 kgf/cm², and E shows the same relationship at a pressure of 1000 kgf/cm².

The dwelling pressure (equivalent to $P_{10}$) of the molten resin into the cavity was about 500 kgf/cm²-G, and the temperature (equivalent to $T_{10}$) of the resin was 290° C. The specific volume $V_{10}$ of the thermoplastic resin under the conditions (pressure $P_{10}$=500 kgf/cm², temperature $T_{10}$= 290° C.) was about 0.9 cm³/g. On the other hand, since the molding pressure immediately before the clamping force was reduced was already equivalent to atmospheric pressure, the molding pressure $P_{11}$ immediately after the clamping force was decreased was also 0 kgf/cm², and the temperature $T_{11}$ of the resin in the cavity at this point of time was 140° C. Therefore, the specific volume $V_{11}$ of the thermoplastic resin under the conditions (pressure $P_{11}$, temperature $T_{11}$) was about 0.86 cm³/g. Further, the temperature $T_{12}$ of the resin immediately before the introduction of the coating material was 140° C., and the specific volume $V_{12}$ of the thermoplastic resin under the conditions (pressure $P_0$, temperature $T_{12}$) was about 0.86 cm³/g. Therefore, $V_{12} \leq V_{11}$ was satisfied.

That is, the resin in the cavity was cooled from the temperature $T_{10}$ (290° C.) to a certain temperature (about 220° C. in FIG. 19) while the resin had the constant specific volume $V_{10}$. Then, as shown in FIG. 19, the resin in the cavity was decreased in its specific volume along a line A from about 220° C. to about 140° C. At a point of time when the temperature was about 140° C. ($T_{11}$), the low-pressure clamping operation was carried out, and the volume of the cavity increased by $\Delta v_{C1}$, while the molding pressure caused by the resin in the cavity was already equivalent to atmospheric pressure $P_0$, so that no change appears on the PVT chart. Further, since only a short period of time (4 seconds) passed from the low-pressure clamping operation to the introduction of the coating material, the resin temperature $T_{12}$ immediately before the introduction of the coating material was almost equivalent to $T_{11}$. As a result, a volume change equivalent to $k_2(V_{11}-V_{12})$ and an increment $\Delta v_{C1}$ of the cavity volume caused by the low-pressure clamping operation corresponded to the space 52 to be formed between the cavity wall and the resin in the cavity. As described above, a thermoplastic resin which satisfies $V_{12} \leq V_{11}$ was used, and the low-pressure clamping operation was carried out, whereby a space could be reliably formed between the cavity wall and the resin in the cavity.

EXAMPLE 2

An injection-molded article was produced basically at the same steps as those in Example 1. Example 2 differs from Example 1 in conditions such as the conditions for cooling a resin and the conditions for introducing a coating material. That is, in Example 2, a molten resin was injected into the cavity 50, then, the dwelling operation was carried out, the resin was cooled for a predetermined period of time, the clamping force was decreased, and then a coating material was introduced.

The molding thermoplastic resin and the coating material used in Example 2 were the same as those used in Example 1. Further, the injection molding conditions and the dwelling operation conditions were the same as those in Example 1 or as follows.

| Injection molding conditions | |
|---|---|
| Mold temperature: | 130° C. |
| Temperature of molten resin: | 290° C. |
| Injection pressure: | 800 kgf/cm²-G |
| Dwelling operation conditions | |
| Dwelling pressure: | 500 kgf/cm²-G |
| Dwelling time: | 10 seconds |

In Example 2, the resin was cooled for 20 seconds after the dwelling operation was terminated. Then, the clamping force was decreased to about 5 tons, and 0.3 cm³ of the coating material was introduced. The conditions for forming the coating, the conditions for cooling after the introduction of the coating material and the conditions for curing the coating were as follows.

Conditions for forming the coating
  Initiation of the introduction of the coating material: 24 seconds after the dwelling period was terminated.

Pressure ($p_{inj}$) for introducing the coating material: about 20 kgf/cm²-G

Molding pressure (P) before the introduction of the coating material: 0 kgf/cm²

Peak pressure ($p_{peak}$) of the molding pressure immediately after the introduction of the coating material: 20 kgf/cm²

Conditions for curing the coating

Curing time: 120 seconds

The above curing time is also a time during which the injected resin was cooled and solidified.

The clamping force may be maintained at a decreased level, or it may be increased to such an extent that the formed coating is not damaged.

In the above manner, there was obtained an injection-molded article having the coating 82 of a coating composition on nearly the entire surface thereof. Since the period of time from the completion of the injection of the molten resin to the introduction of the coating material was shorted than that in Example 1, the decrease ratio of the specific volume was smaller than that in Example 1, and the formed space 52 was smaller than the space formed in Example 1. The peak pressure for introducing the coating material was therefore a little higher than that in Example 1, although the amount (volume) of the coating material was smaller than that in Example 1. The coating 82 had an average thickness of 50 μm in the bottom portion of the box-shaped injection-molded article.

Figure 20:
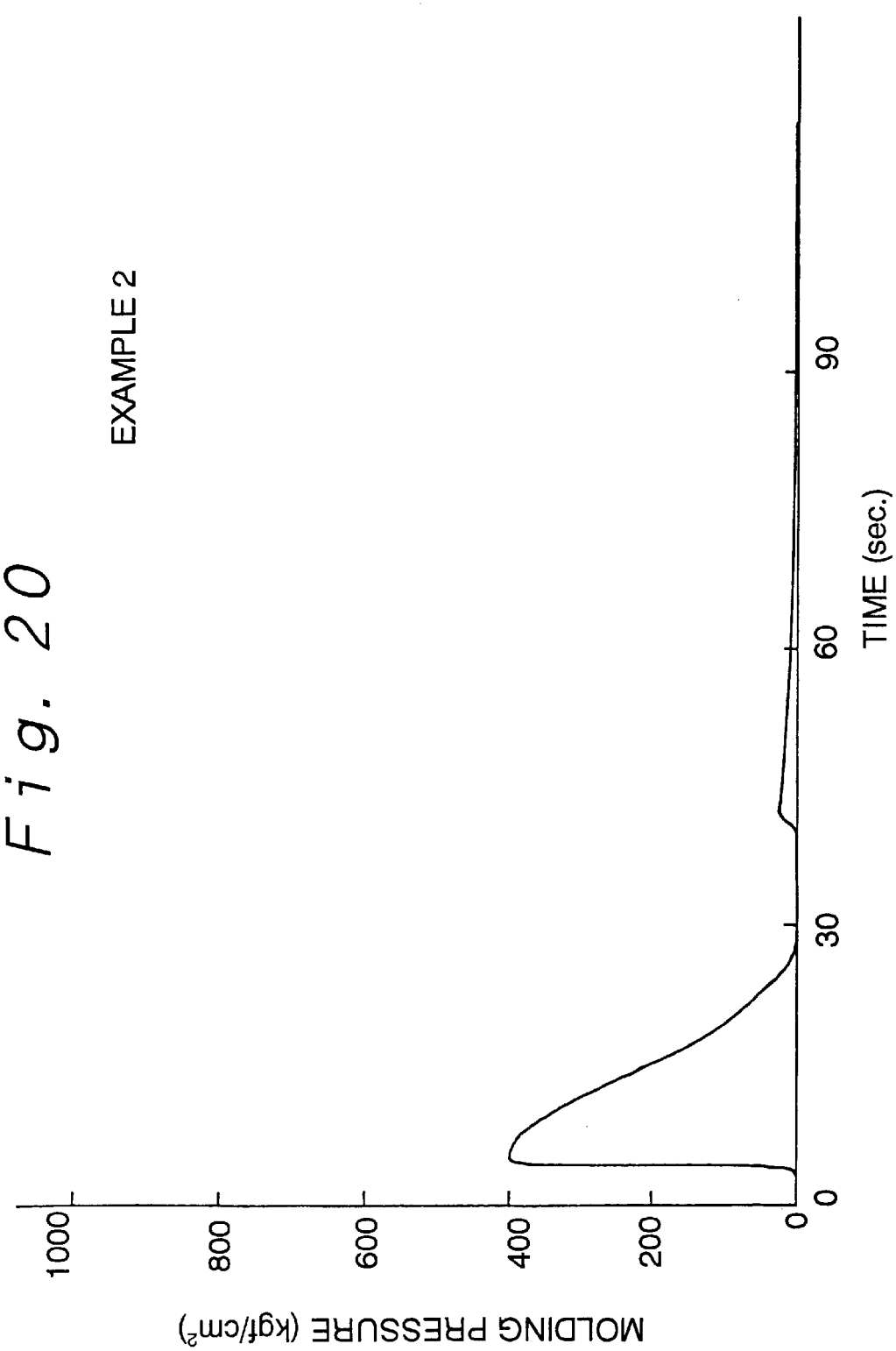
FIG. 20 shows a change of a molding pressure with time caused by a resin, and a change of a molding pressure with time caused by a coating material, in Example 2.

FIG. 20 shows a change of the molding pressure with time caused by the resin and a change of the molding pressure with time caused by the coating material in Example 2. In FIG. 20, the molding pressure when the resin in the cavity is fully cooled to solidness appears to be 0 kgf/cm² due to the contraction scale of the axis of ordinates, while there is actually a molding pressure over 0 kgf/cm². Specifically, in Example 2, the peak pressure $p_{peak}$ of the molding pressure caused by the coating material was 20 kgf/cm², and the molding pressure p' immediately before the mold releasing, caused by the coating material, was 5 kgf/cm².

EXAMPLE 3

Example 3 is also concerned with the first embodiment of the present invention. In Example 3, the clamping force of the mold was maintained at a constant level from the initiation of the injection of the molten resin to the mold releasing. That is, Example 3 used the high-pressure clamping operation. More specifically, the clamping force of the mold was maintained at about 100 tons from the initiation of the injection of the molten resin to the mold releasing. The form and size of the cavity are the same as those of Example 1.

In Example 3, due to the volume contraction of a resin caused by the cooling of the resin in the cavity immediately before the introduction of a coating material, the molding pressure P caused by the resin injected into the cavity was decreased to 0 kgf/cm². Example 3 used a thermoplastic resin which satisfied $V_{12} \leq V_{10}$ in which $V_{12}$ is a specific volume of the thermoplastic resin under the conditions of (pressure $P_0$, temperature $T_{12}$), $V_{10}$ is a specific volume of the thermoplastic resin under the conditions of (pressure $P_{10}$, temperature $T_{10}$), $P_{10}$ is a molding pressure at a point of time when the weight increase of the resin in the cavity by the dwelling operation is completed, $T_{10}$ is a temperature of the thermoplastic resin in the cavity at the above point of time, $T_{12}$ is a temperature of the thermoplastic resin in the cavity immediately before the introduction of the coating material, and $P_0$ is atmospheric pressure. As a result, $$v_{space} = v_{C0} - v_{R2} \geq 0$$

was satisfied, and a space 52 was reliably formed between the resin 40A in the cavity 50 and the cavity wall. That is, the value of $P_{comp}$ was reliably brought into 0 kgf/cm², and the molding pressure caused by the resin in the cavity was decreased to 0 kgf/cm².

In Example 3, the following material was used as a molding thermoplastic resin. Further, the injection-molding conditions and the dwelling operation conditions were set as follows. The coating material was the same as those in Example 1. Further, the same injection-molding apparatus as that shown in FIG. 12 was used.

Molding thermoplastic resin: Polyamide MXD6 (Reny 1022, supplied by Mitsubishi Engineering-Plastics Corp.)

| Injection-molding conditions | |
|---|---|
| Mold temperature: | 130° C. |
| Temperature of molten resin: | 270° C. |
| Injection pressure: | 700 kg°f/cm² |
| Dwelling operation conditions | |
| Dwelling pressure: | 500 kgf/cm²-G |
| Dwelling time: | 2.5 seconds |

In Example 3, the above dwelling pressure was ordinary, while the above dwelling time was shorter than an ordinary dwelling time. The dwelling operation is generally carried out for about 9 seconds, which period of time is equivalent to a gate-seal time. The weight increase of the molten resin by the dwelling operation was smaller than the weight increase of a molten resin by an ordinary dwelling operation. As a result, the value of $v_{R2}$ was smaller than that obtained by an ordinary dwelling operation, so that a space 52 was more easily formed between the resin 40A in the cavity 50 and the cavity wall.

In Example 3, the dwelling operation was carried out, and then the injected resin was cooled and solidified for 50 seconds. Then, the coating material was introduced while the clamping force was maintained at 100 tons. The conditions for forming the coating, the conditions for cooling the coating material and the conditions for curing the coating were as follows.

Conditions for forming the coating

Initiation of the introduction of the coating material: 50 seconds after the dwelling period was terminated.

Pressure ($P_{inj}$) for introducing the coating material: about 150 kgf/cm²-G

Peak pressure ($p_{peak}$) of the molding pressure immediately after the introduction of the coating material: 150 kgf/cm²

Molding pressure (P) before the introduction of the coating material: 0 kgf/cm²

Amount of the coating material: 0.55 cm³

Conditions for curing the coating

Curing time: 120 seconds

The above curing time is also a time during which the injected resin was cooled and solidified.

The molding pressure p' immediately before the mold releasing was 40 kgf/cm². This is because a predetermined amount (volume: $v_{F0}$) of the coating material was introduced into the space between the resin in the cavity and the cavity wall such that the relationship of $$v_{C0} + \Delta v_{C4} = v_{R4} + v_{F4} < v_{R5} + v_{F5}$$

was satisfied.

Figure 21:
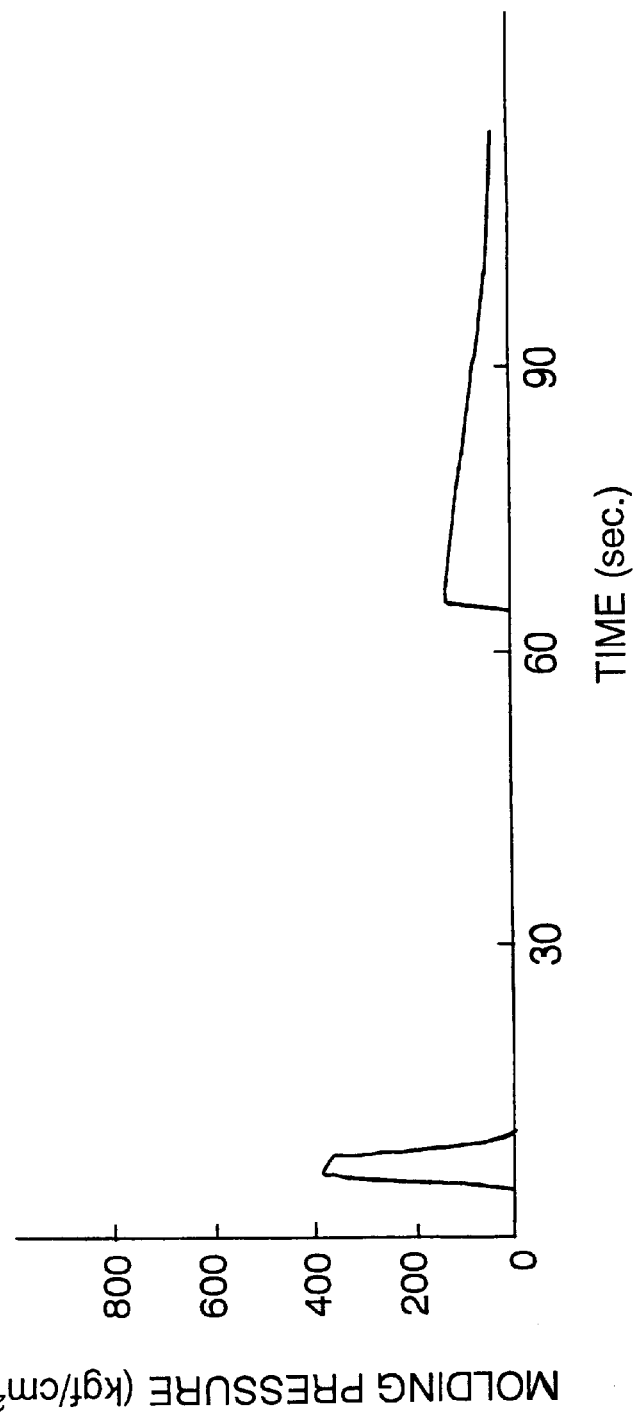
FIG. 21 shows a change of a molding pressure with time caused by a resin, and a change of a molding pressure with time caused by a coating material, in Example 3.

FIG. 21 shows a change of the molding pressure with time caused by the resin and a change of the molding pressure with time caused by the coating material in Example 3. The position of the movable mold member relative to the fixed mold member was nearly constant from the injection of the molten resin to the mold releasing.

Figure 22:
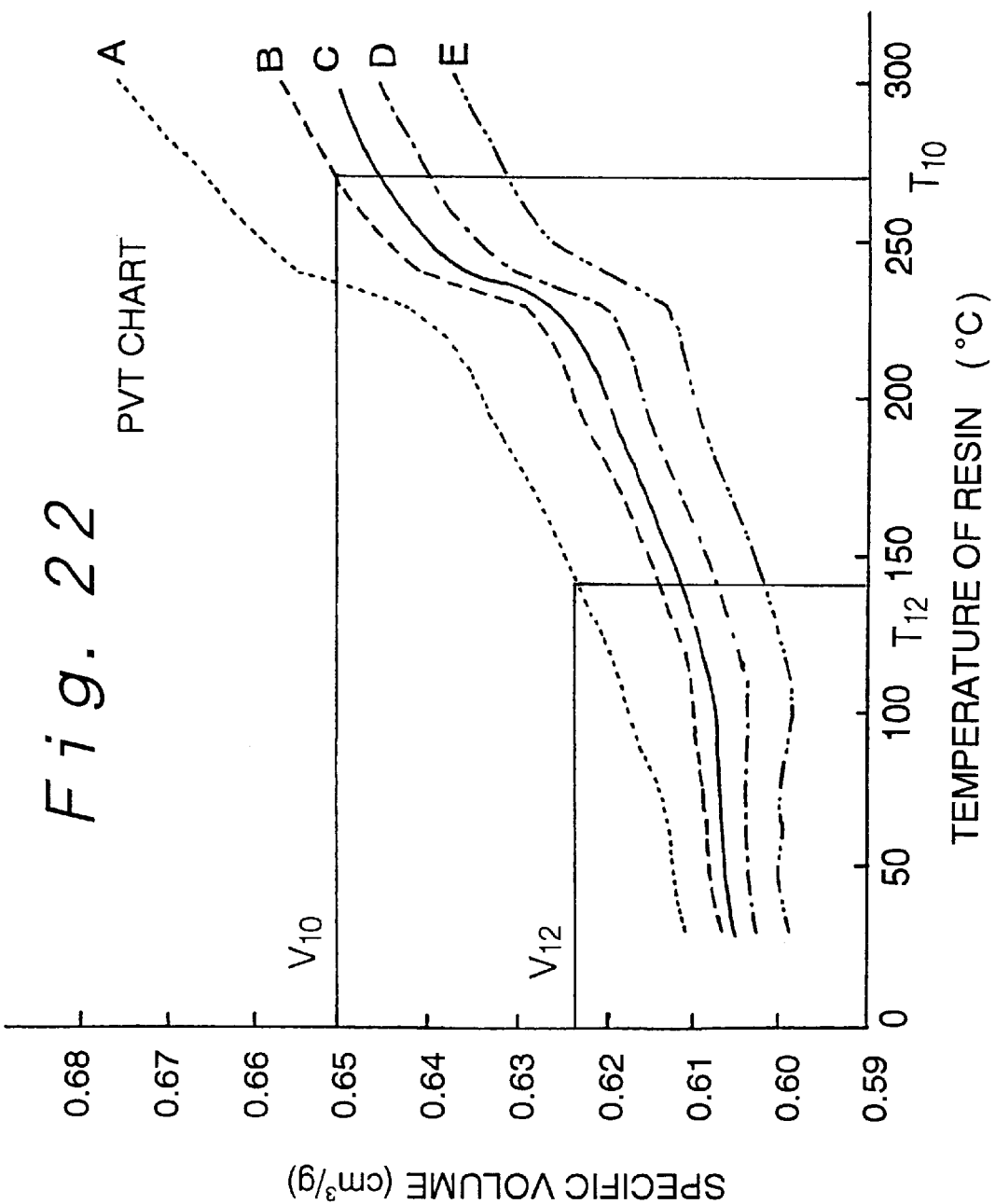
FIG. 22 is a PVT chart of a thermoplastic resin used in Example 3.

FIG. 22 shows a PVT chart of the thermoplastic resin used in Example 3. In FIG. 22, A shows a relationship between the resin temperature and the specific volume at a pressure of 1 kgf/cm² (atmospheric pressure), B shows the same relationship at a pressure of 510 kgf/cm², C shows the same relationship at a pressure of 700 kgf/cm², D shows the same relationship at a pressure of 1020 kgf/cm², and E shows the same relationship at a pressure of 1530 kgf/cm². The dwelling pressure (equivalent to $P_{10}$) was 500 kgf/cm²-G, and the temperature (equivalent to $T_{10}$) of the resin in the cavity at the dwelling step was 270° C. As is clear in FIG. 22, therefore, the specific volume $V_1$ of the thermoplastic resin under the conditions (pressure $P_{10}$=500 kgf/cm², temperature $T_{10}$=270° C.) was about 0.65 cm³/g. The resin in the cavity was cooled from the temperature $T_{10}$ (270° C.) to a certain temperature (about 235° C. in FIG. 22) while the resin had constant specific volume $V_{10}$. Then, in FIG. 22, the resin in the cavity changed along a line A from about 235° C. to about 140° C. such that the specific volume decreased. At a point of time when the temperature was about 140° C. ($T_{11}$), the coating material was introduced. The molding pressure caused by the resin immediately before the introduction of the coating material was 0 kgf/cm², and the temperature $T_{12}$ of the resin in the cavity immediately before the introduction of the coating material was about 140° C. Therefore, the specific volume $V_{12}$ of the thermoplastic resin under the conditions (pressure $P_0$=atmospheric pressure, temperature $T_{12}$=140° C.) was 0.623 cm³/g. That is, $V_{12} \leq V_{10}$ was satisfied.

Example 3 used the thermoplastic resin which satisfied the relationship of $V_{12} \leq V_{10}$ in the high-pressure clamping operation, and further, by decreasing the dwelling time, the space 52 (volume: $v_{space} = v_{C0} - v_{R2}$) was formed between the resin 40A in the cavity 50 and the cavity wall. There was obtained an injection-molded article having a coating 82 of the coating composition having an average thickness of 100 μm on nearly the entire surface thereof.

EXAMPLE 4

Example 4 is also concerned with the first embodiment of the present invention. Example 4 includes the steps of decreasing the clamping force to zero after the completion of the injection of a molten resin into the cavity 50 and before the introduction of a coating material and then spacing the movable mold member 26 from the fixed mold member 22 in a state in which the cavity 50 is formed by the fixed mold member 22 and the movable mold member 26. The injection molding apparatus suitable for use in the method of injection-molding a thermoplastic resin in Example 4 will be outlined with reference to FIG. 23.

The mold of the injection molding apparatus suitable for use in Example 4 is also composed of a fixed mold member 22 and a movable mold member 26. The fixed mold member 22 and the movable mold member 26 are so structured that the movable mold member 26 can be spaced from the fixed mold member 22 in a state in which a cavity 50 is formed by the fixed mold member 22 and the movable mold member 26. That is, they are so structured that the volume of the cavity 50 can be increased by spacing the movable mold member 26 from the fixed mold member 22.

More specifically, as schematically shown in FIG. 23, the movable mold member 26 and the fixed mold member 22 have contact portions (parting surfaces) 26A and 22A, and the contact portions 26A and 22A have a such a socket and spigot structure (a telescopic structure) that the closed cavity 50 can be formed even if the movable mold member 26 is spaced from the fixed mold member 22 to some extent. FIG. 23 shows a state of the mold in which the movable mold member 26 is spaced from the fixed mold member 22 and the closed cavity 50 is formed. Other structures of the injection molding apparatus are the same as those in Example 1, and their explanations are omitted. Further, FIG. 23 omits the illustration of a fixed platen 20, a clamping hydraulic cylinder 30, a hydraulic piston 32 and tie bars 34. The form and size of the cavity are the same as those of Example 1.

In Example 4, the clamping force at the time of injecting a molten resin was set at about 100 tons, and before the introduction of a coating material, the clamping force was removed (0 ton) by actuating the clamping hydraulic cylinder 30. As a result, the distance (thickness) of the cavity in the mold opening-closing direction increased by about 0.2 mm. Further, the thickness (distance) of the cavity 50 in the mold opening-closing direction was increased by spacing the movable mold member 26 from the fixed mold member 22. The spacing between the fixed mold member 22 and the movable mold member 26 was 0.1 mm. That is, the thickness (distance) of the cavity 50 in the mold opening-closing direction was finally 0.3 mm larger than the thickness (distance) at the time of injecting the molten resin.

Example 4 used a thermoplastic resin which satisfied $V_{12} \leq V'_{11}$ in which $V_{12}$ is a specific volume of the thermoplastic resin under the conditions of (pressure $P_0$, temperature $T_{12}$), $V'_{11}$ is a specific volume of the thermoplastic resin under the conditions of (pressure $P'_{11}$, temperature $T'_{11}$), $P'_{11}$ is a molding pressure immediately after the movable mold member is spaced from the fixed mold member, $T'_{11}$ is a temperature of the thermoplastic resin in the cavity at the above point of time, $T_{12}$ is a temperature of the thermoplastic resin in the cavity immediately before the introduction of the coating material, and $P_0$ is atmospheric pressure.

Example 4 used the same molding thermoplastic resin and the same coating material as those used in Example 1. The injection molding conditions and the dwelling operation conditions were as follows.

| | |
|---|---|
| Mold temperature: | 130° C. |
| Temperature of molten resin: | 290° C. |
| Injection pressure: | 800 kgf/cm²-G |
| Dwelling operation conditions | |
| Dwelling pressure: | 500 kgf/cm²-G |
| Dwelling time: | 10 seconds |

In Example 4, after 50 seconds passed after the dwelling operation was terminated, the clamping force was brought into 0 ton by actuating the clamping hydraulic cylinder 30, and further, the movable mold member 26 was spaced from the fixed mold member 22 in a state in which the cavity 50 was formed by the fixed mold member 22 and the movable mold member 26. After 54 seconds passed after the dwelling operation was terminated, a coating material 80 was introduced into the space 52. Immediately before the introduction of the coating material, the space 52 had a following volume.

$$v_{space} = v_{C0} + \Delta v_{C1} - v_{R2}$$

The conditions for forming the coating, the conditions for cooling the coating material and the conditions for curing the coating were as follows.

Conditions for forming the coating

Initiation of the introduction of the coating material: 54 seconds after the dwelling period was terminated.

Peak pressure ($p_{peak}$) of the molding pressure immediately after the introduction of the coating material: 20 kgf/cm$^2$ Amount of the introduced coating material: 1.7 cm$^3$ Molding pressure (P) before the introduction of the coating material: 0 kgf/cm$^2$ Conditions for curing the coating Curing time: 120 seconds The above curing time is also a time during which the injected resin was cooled and solidified.

The molding pressure p' immediately before the mold releasing was 5 kgf/cm$^2$. This is because a predetermined amount (volume: $v_{F0}$) of the coating material was introduced into the space between the resin in the cavity and the cavity wall such that the relationship of $$v_{C0} + \Delta v_{C4} = v_{R4} + v_{F4} < v_{R5} + v_{F5}$$

was satisfied. The dwelling pressure (equivalent to $P_{10}$) was 500 kgf/cm$^2$-G, and the temperature (equivalent to $T_{10}$) of the resin in the cavity at the dwelling step was 290° C. Therefore, the specific volume $V_{10}$ of the thermoplastic resin under the conditions (pressure $P_{10}$=500 kgf/cm$^2$, temperature $T_{10}$=290° C.) was about 0.90 cm$^3$/g. On the other hand, the molding pressure $P'_{11}$ was already 0 kgf/cm$^2$ before the movable mold member was spaced from the fixed mold member, and it was 0 kgf/cm$^2$ immediately after the movable mold member was spaced from the fixed mold member. The temperature $T'_{11}$ of the resin in the cavity immediately after the movable mold member was spaced from the fixed mold member was 140° C. Further, the temperature $T_{12}$ of the resin in the cavity immediately before the introduction of the coating material was also about 140° C. Therefore, the specific volume $V'_{11}$ of the thermoplastic resin under the conditions (pressure $P'_{11}$=0 kgf/cm$^2$, temperature $T'_{11}$=140° C.) was about 0.86 cm$^3$/g, and the specific volume $V_{12}$ of the thermoplastic resin under the conditions (pressure $P_0$=atmospheric pressure, temperature $T_{12}$=140° C.) was also about 0.86 cm$^3$/g. That is, $V_{12} \leq V'_{11}$ was satisfied.

In Example 4, the thermoplastic resin used satisfied the relationship of $V_{12} \leq V'_{11}$, and further, the movable mold member spacing operation was carried out, whereby the space 52 (volume: $v_{space} = v_{C0} + \Delta v_{C1} - v_{R2}$) was more reliably formed between the resin 40 in the cavity 50 and the cavity wall, and there was obtained an injection-molded article having a coating 82 of the coating composition formed nearly on the entire surface thereof. The coating 82 had an average thickness of 260 μm in the bottom portion of the box-shaped injection-molded article.

EXAMPLE 5

Example 5 is concerned with the second embodiment of the present invention. That is, in Example 5, a coating material 80 is introduced in a state in which the molding pressure P caused by a resin 40A injected into the cavity 50 is higher than 0 kgf/cm$^2$. In the method of injection-molding a thermoplastic resin in Example 5, the molten resin 40 is injected into the cavity 50 in a state in which the mold is closed and the clamping force is maintained, and then the coating material 80 is introduced into the boundary 54 between the resin 40A in the cavity 50 and the cavity wall without forming any space (gap) between the resin 40A in the cavity 50 and the cavity wall. That is, in Example 5, there is employed the high-pressure clamping operation, in which the clamping force is maintained at a constant level from the initiation of the injection of the molten resin to the mold releasing. The injection molding apparatus suitable for use in Example 5 is the same as that used in Example 1, and its explanation is omitted. The cavity had a form for producing a nearly box-shaped form having a length of about 100 mm, a width of about 30 mm, a depth of about 10 mm and a thickness of 4 mm. The form of the cavity shall not be limited thereto, and may be any form as required.

Example 5 used a thermoplastic resin which satisfied $V_2 > V_{22}$ in which $V_2$ is a specific volume of the thermoplastic resin under the conditions of (pressure $P_0$, temperature $T_{22}$), $V_{22}$ is a specific volume of the thermoplastic resin under the conditions of (pressure $P_{22}$, temperature $T_{22}$), $P_{22}$ is a molding pressure immediately before the introduction of the coating material, caused by the resin, $T_{22}$ is a temperature of the thermoplastic resin in the cavity at the above point of time, and $P_0$ is atmospheric pressure.

The method of injection-molding a thermoplastic resin in Example 5 will be explained in detail below with reference to FIGS. 24 to 26.

Example 5 used the same molding thermoplastic resin as that used in Example 3 and the same coating material as that used in Example 1.

The injection molding conditions were as follows.

| | |
|---|---|
| Mold temperature: | 130° C. |
| Temperature of molten resin: | 270° C. |
| Injection pressure: | 700 kgf/cm$^2$-G |

Figure 24A:
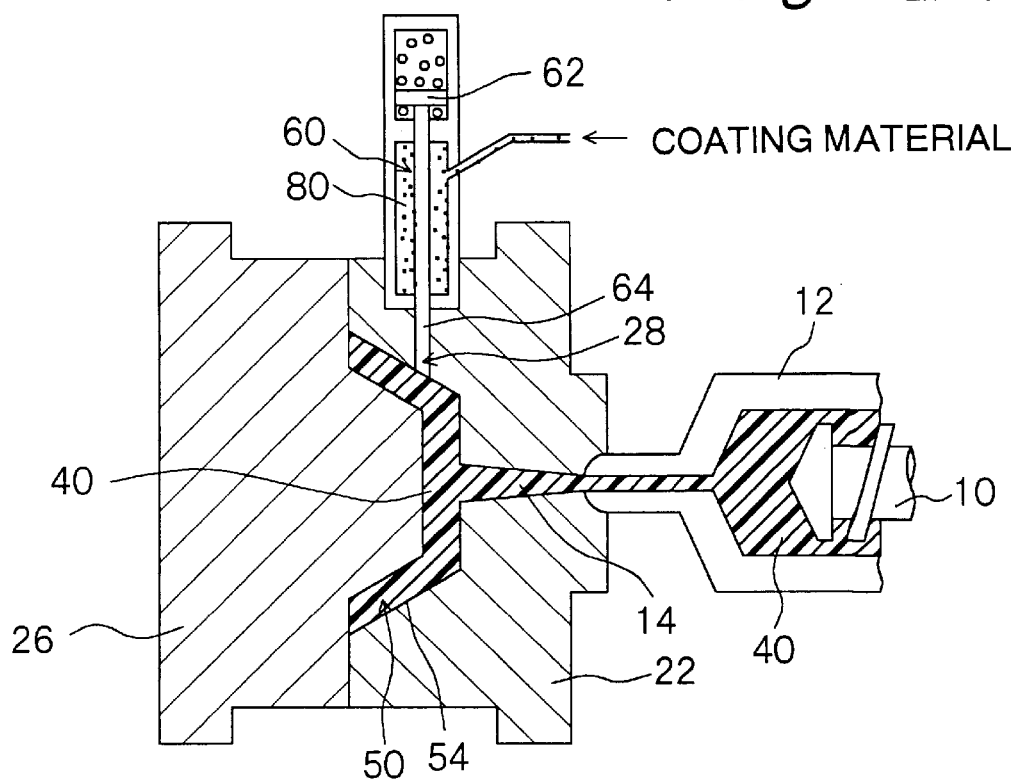
FIGS. 24A and 24B are schematic views of a part of a mold, etc., showing an injection state of a molten resin and a state before the introduction of a coating material, in the method of injection-molding a thermoplastic resin in Example 5.

First, as shown in FIG. 24A, the molten resin 40 of the thermoplastic resin was injected into the cavity 50 from an injection cylinder 12 through a gate portion 14 to fill the cavity 50 with the molten resin. The cavity 50 was formed by clamping the fixed mold member 22 and the movable mold member 26 together under high pressure (about 100 tons in Example 5). In this case, the hydraulic cylinder 62 of the coating material introduction device was placed in a forward position whereby the coating material introduction portion 28 was closed with the tip of the shut-off pin 64. As a result, the coating material feed portion 60 and the cavity 50 were not communicated with each other, and the coating material 80 did not flow into the cavity 50.

Immediately after the injection of the molten resin was completed, the dwelling operation was carried out under the following conditions. These dwelling operation conditions were ordinary, and the dwelling time was nearly equivalent to a gate-seal time.

| | |
|---|---|
| Dwelling pressure: | 800 kgf/cm$^3$-G |
| Dwelling time (period): | 9 seconds |

Figure 24B:
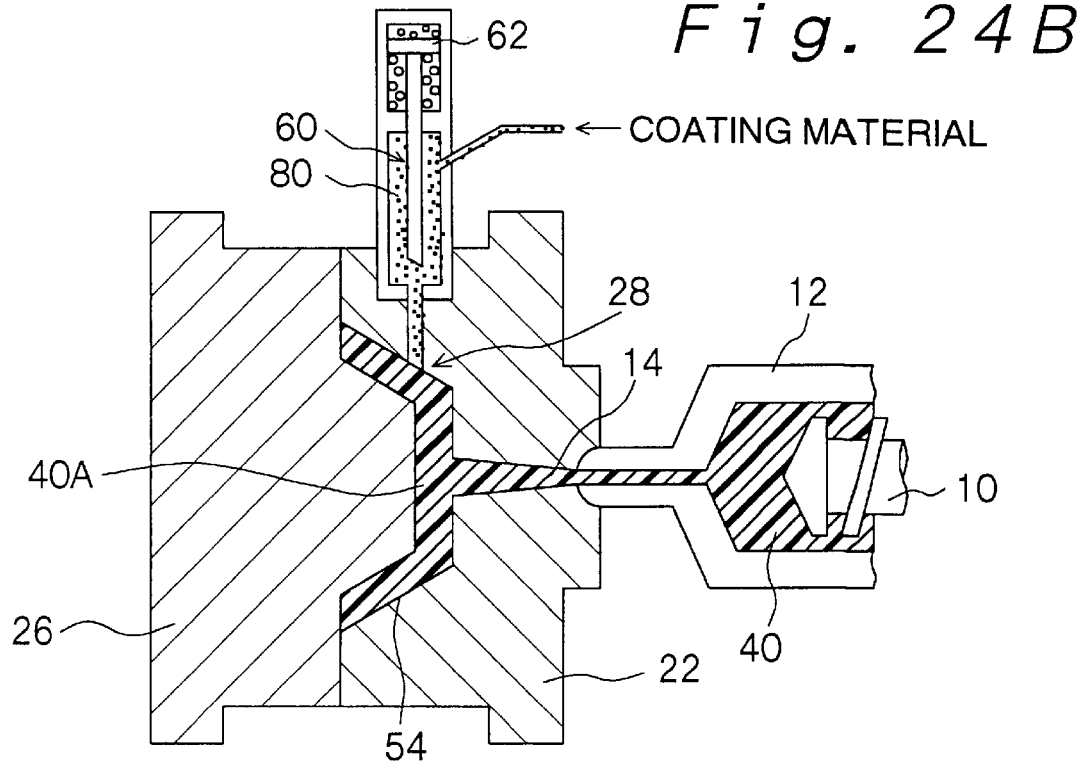

After the dwelling period was terminated, the tip of the shut-off pin 64 was moved back by actuating the hydraulic cylinder 62 of the coating material introduction device, to open the coating material introduction portion 28. The coating material 80 was fed to the coating material feed portion 60 through the pump 70. As a result, the coating material was filled up to the coating material introduction portion 28. Since, however, the molding pressure P was higher than 0 kgf/cm$^2$, no space was formed between the resin 40A and the cavity wall, and the coating material feed portion 60 and the cavity 50 were not communicated with each other. That is, the relationship of $$v_{R2}>v_{C2}$$

more specifically, $$v_{R2}=v_{C0}+\Delta v_{C2}$$

was satisfied. At this stage, therefore, the coating material 80 did not flow into the cavity 50 side. FIG. 24B schematically shows this state. In the second embodiment of the present invention, the molding pressure P caused by the resin 40A is higher than 0 kgf/cm², it is required to prevent the resin 40A from flowing into the coating material introduction portion 28 at a point of time shown in FIG. 24B. For this purpose, that part of the resin 40A which is in contact with the cavity wall can be solidified in advance to some extent. Specifically, this is achieved by a method in which an adequate time is taken before the shut-off pin 64 is moved back after the dwelling period, or by a method using a crystalline resin such that a part of the resin 40A in contact with the cavity wall undergoes rapid solidifying compared with the other part of the resin 40A.

Figure 25A:
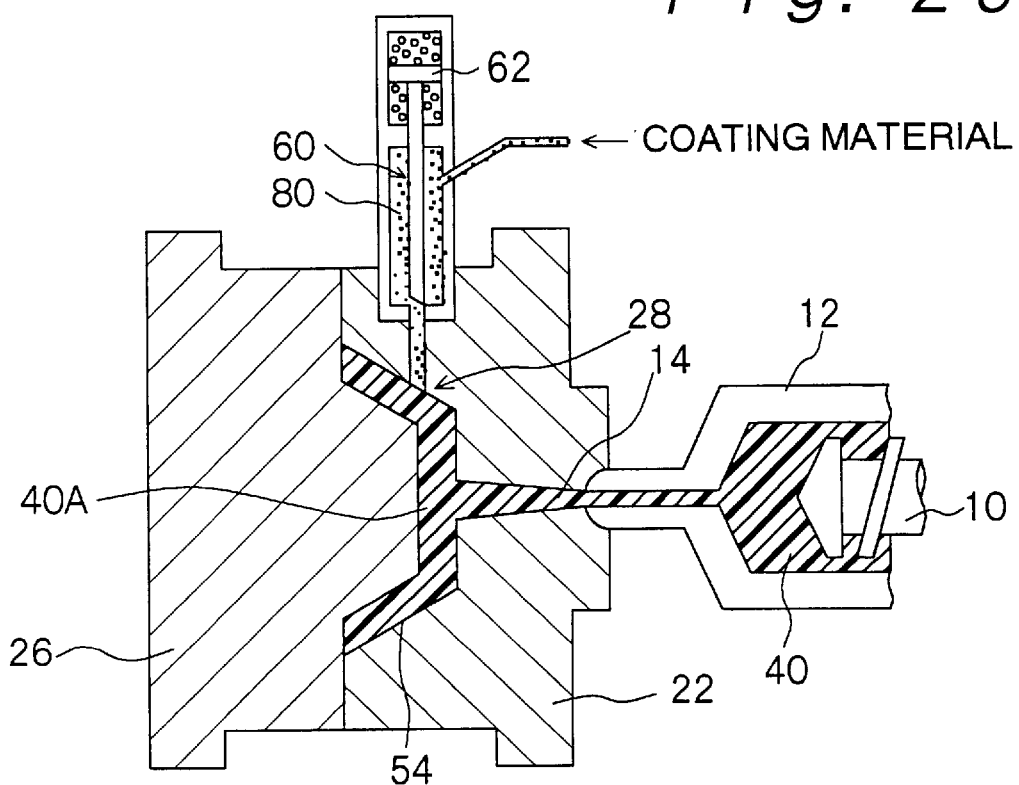
FIGS. 25A and 25B are schematic views of a part of a mold, etc., showing a state immediately before the introduction of a coating material, and a state in which the coating material is being introduced, in the method of injection-molding a thermoplastic resin in Example 5.

Then, the tip of the shut-off pin 64 was moved forward by moving forward the hydraulic cylinder 62 of the coating material introduction device. FIG. 25A shows a state immediately before the introduction of the coating material. When the tip of the shut-off pin 64 further moved forward, the coating material 80 was introduced into the boundary 54 between the resin 40A in the cavity 50 and the cavity wall (see FIG. 25B). The introduction of the coating material was initiated 4 seconds after the dwelling period was terminated, and the amount of the introduced coating material was 0.2 cm³.

Figure 25B:
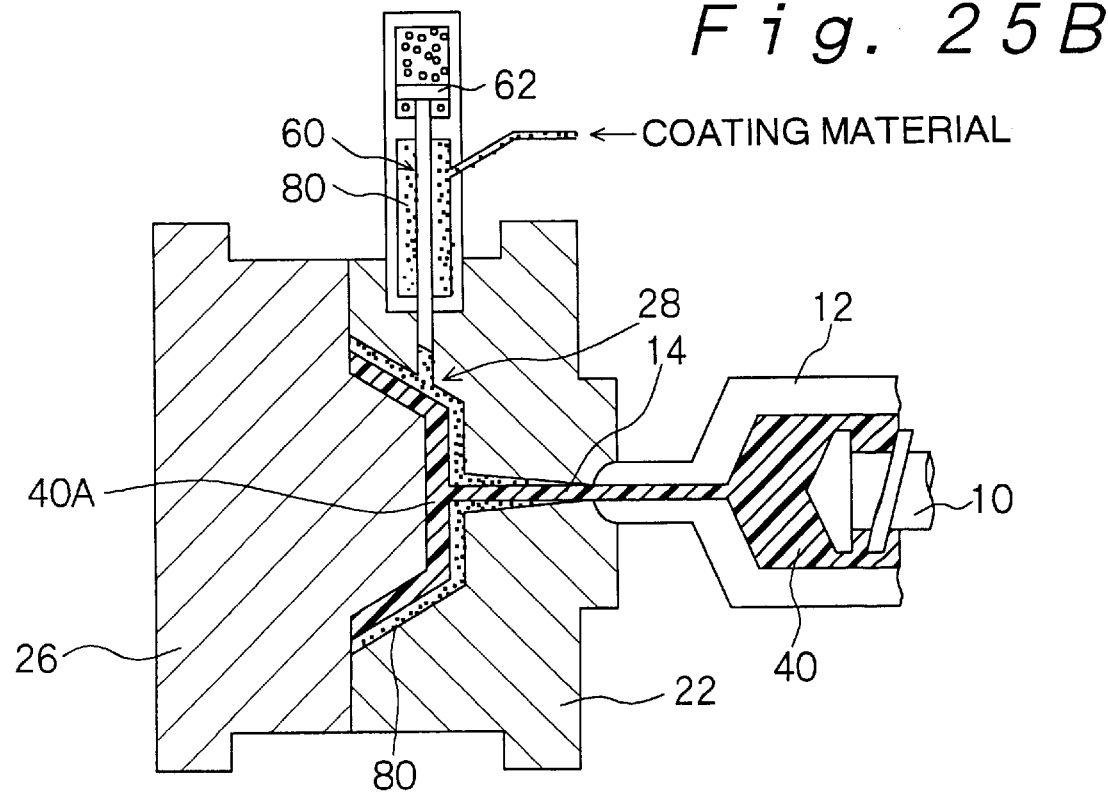
Figure 26A:
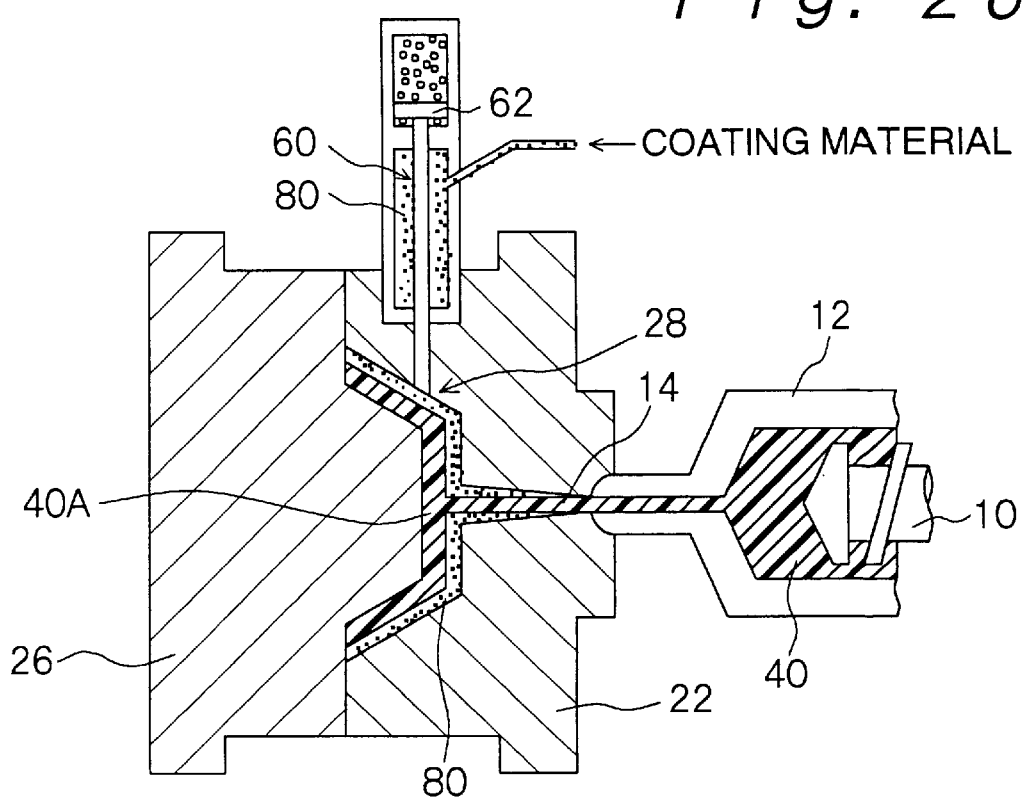
FIGS. 26A and 26B are schematic views of a part of a mold, etc., showing a state in which the formation of a coating is completed in the method of injection-molding a thermoplastic resin in Example 5.
Figure 26B:
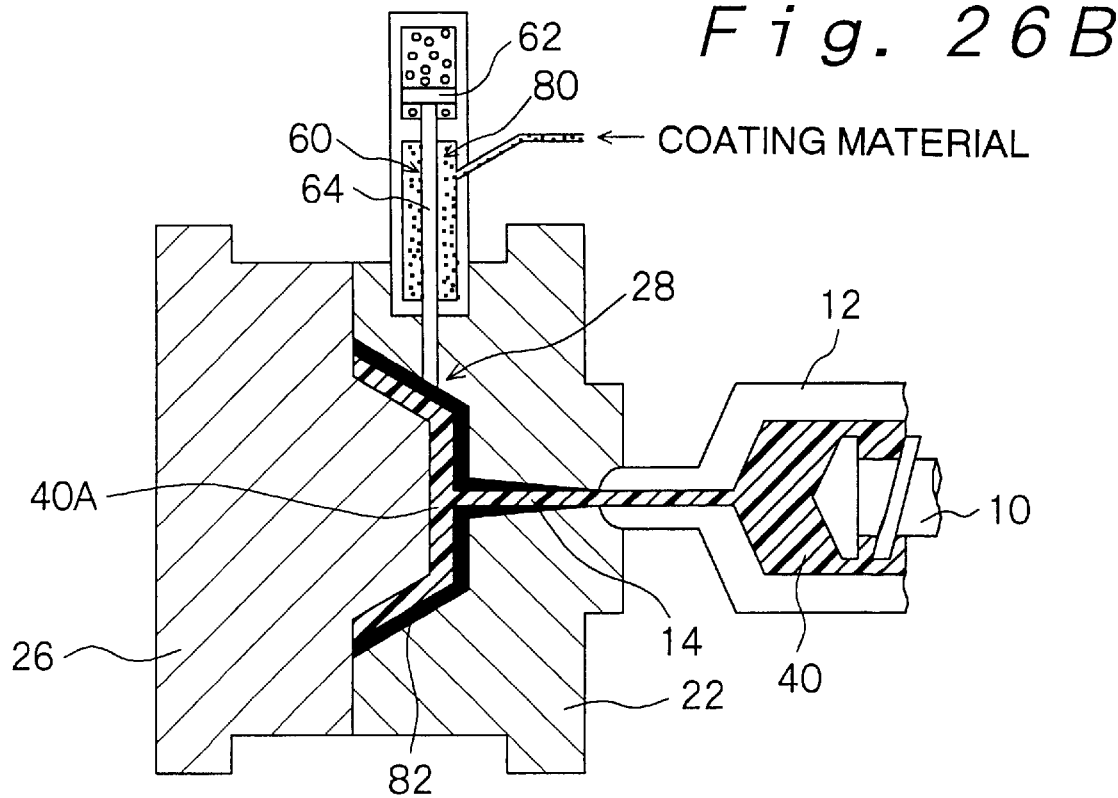

In this case, the coating material 80 was introduced while it compressed the resin 40A in the cavity 50, while it spaced the movable mold member 26 from the fixed mold member 22 to some extent or while it worked in both ways. The state in which the coating material 80 is introduced into the boundary 54 between the resin 40A in the cavity 50 and the cavity wall depends upon the pressure for introducing the coating material, the clamping force and the flexibility of the resin 40A. FIG. 25B and FIGS. 26A and 26B show a schematic enlarged view of a state in which the resin 40A is compressed with the coating material 80. In this state, the relationship of $$v_{F0}=\Delta v_{C3}+\Delta v_{R3}$$

is satisfied. The mold may have such a socket and spigot structure (a telescopic structure) that the cavity can be maintained even if the movable mold member 26 is spaced from the fixed mold member 22 to some extent, while the illustration of the socket and spigot structure is omitted in the Figures.

The conditions for introducing the coating material were as follows.

Pressure for introducing the coating material ($P_{inj}$) 500 kgf/cm²-G

Molding pressure in the introduction of the coating material (P): 300 kgf/cm²

Peak pressure of the molding pressure immediately after the introduction of the coating material ($P_{peak}$): 500 kgf/cm²

FIG. 27 schematically shows a change of the hydraulic pressure which is exerted on the shut-off pin 64 when the coating material is introduced. In a state (time $t_0$) shown in FIG. 24A, the hydraulic cylinder 62 exerted a high pressure on the shut-off pin 64 to prevent the shut-off pin 64 from moving back under the pressure of the injected molten resin 40. Thereafter, the pressure to be applied to the shut-off pin 64 was decreased to 0 kgf/cm²-G, and further, a backward pressure was then applied to the shut-off pin 64 to move the shut-off pin 64 back as shown in FIG. 24B (time $t_1$–$t_2$).

The pressure applied to the shut-off pin 64 increased from a state shown in FIG. 25A (time $t_2$) to a point of time ($t_3$) when the coating material 80 was introduced into the boundary 54 between the resin 40A in the cavity 50 and the cavity wall through the coating material introduction portion 28 as shown in FIG. 25B. During a period of from $t_3$ to $t_4$, the coating material 80 was continuously introduced into the boundary 54 between the resin 40A in the cavity 50 and the cavity wall. The pressure exerted on the shut-off pin 64 in the above case was taken as a pressure for introducing the coating material ($P_{inj}$). The pressure for introducing the coating material ($P_{inj}$) was equivalent to the total of the molding pressure P and the flow resistance value of the coating material. Generally, therefore, $p_{peak}>P$ is satisfied. When the movement of the shut-off pin 64 forward proceeded considerably, and when a considerable amount of the coating material was introduced, it was difficult to introduce the coating material. As a result, the pressure to be applied to the shut-off pin 64, required for introducing the coating material, increased. At a time $t_5$ in FIG. 27, the shut-off pin 64 arrived at its forward end, and the coating material introduction portion 28 was closed with the tip of the shut-off pin 64 (see FIG. 26A). In this manner, the introduction of the coating material finished, and the coating material feed portion 60 and the cavity 50 ware no longer communicated with each other. The hydraulic cylinder 62 worked on to exert a pressure on the shut-off pin 64 so that the shut-off pin 64 was not moved back.

Then, the coating material 80 was cured completely or to such an extent that the mold releasing operation was not hampered, to form a coating 82 on the surface of the resin 40A in the cavity 50 (see FIG. 26B). The curing was carried out for 120 seconds. During this period, the cooling and solidifying of the injection-molded resin continued. Then, the clamping force which had been exerted so far was removed by moving back a hydraulic piston 32 with the clamping hydraulic cylinder 30, to carry out the mold releasing operation. Finally, an injection-molded article was taken out of the mold. The molding pressure P' immediately before the mold releasing was about 320 kgf/cm². Since the thermoplastic resin used satisfied the relationship of $V_2>V_{22}$, the relationship of $v_{R4}+v_{F4}<v_{R5}+v_{F5}$ was satisfied.

In the above manner, there was obtained an injection-molded article having the coating 82 of the coating composition on nearly the entire surface thereof. The coating 82 had an average thickness of 30 μm in the bottom portion of the box-shaped injection-molded article.

FIG. 28 shows a change of the molding pressure with time in Example 5. The molding pressure immediately before the introduction of the coating material did not decrease as far as 0 kgf/cm². The resin therefore continued to press the cavity wall after the introduction of the coating material, and the molding pressure did not decrease to 0 kgf/cm². In other words, there was formed no space (gap) between the resin 40A in the cavity 50 and the cavity wall. The position of the movable mold member relative to the fixed mold member was nearly constant from the injection of the molten resin to the mold releasing.

The molding pressure $P_{22}$ immediately before the introduction of the coating material was 300 kgf/cm², and the temperature $T_{22}$ of the resin in the cavity at this point of time was 235° C. FIG. 29 shows a PVT chart of the thermoplastic resin used in Example 5. The PVT chart shown in FIG. 29 is the same as that in FIG. 22. As shown in FIG. 29, when the specific volume of the thermoplastic resin under the conditions (pressure $P_{22}$=300 kgf/cm$^2$, temperature $T_{22}$=235° C.) is $V_{22}$, and when the specific volume of the thermoplastic resin under the conditions (pressure $P_0$=atmospheric pressure, temperature $T_{22}$=235° C.) is $V_2$, $V_{22}$=0.643 cm$^3$/g and $V_2$=0.653 cm$^3$/g. That is, $V_2 > V_{22}$ is satisfied. That is, the relationship of $$v_{C0}+\Delta v_{C2}=v_{R2}<v'_{R5}$$

is satisfied. Therefore, the molding pressure immediately before the introduction of the coating material does not decrease as far as 0 kgf /cm$^2$, and this pressure is recognized as $P_{comp}$.

EXAMPLE 6

Example 6 is also concerned with the second embodiment of the present invention. Example 6 differs from Example 5 in that the clamping force is decreased to a level lower than that in the injection of a molten resin, before the introduction of a coating material 80. That is, the clamping force in the injection of the molten resin was about 100 tons (=$F_{20}$), and the clamping force was decreased to about 5 tons (=$F_{21}$) before the introduction of the coating material 80. That is, $F_{21}/F_{20}$ nearly equals 0.05. The form and size of the cavity are the same as those of Example 5.

Example 6 used the same thermoplastic resin material and the same coating material as those used in Example 5. The injection-molding conditions and the dwelling operation conditions were the same as those in Example 5 and were as follows.

| Injection molding conditions | |
|---|---|
| Mold temperature: | 130° C. |
| Temperature of molten resin: | 270° C. |
| Injection pressure: | 700 kgf/cm$^2$-G |
| Dwelling operation conditions | |
| Dwelling pressure: | 800 kgf/cm$^2$-G |
| Dwelling time: | 9 seconds |

In Example 6, immediately after the dwelling period was terminated, the clamping force was decreased to about 5 tons by operating the clamping hydraulic cylinder 30. The volume of the cavity therefore increased to a little extent ($v_{C0}+\Delta v_{C1}$). Since, however, a thermoplastic resin which satisfied $V_2 > V_{22}$ was used, the relationship of $$v_{C0}+\Delta v_{C2}=v_{R2}<v'_{R5}$$

was still maintained, and the value of $P_{comp}$ was large. Then, the tip of the shut-off pin 64 was moved by moving back the hydraulic cylinder 62 of the coating material introduction device, to open the coating material introduction portion 28. As a result, the coating material was filled up to the coating material introduction portion 28. Since, however, the molding pressure P did not decrease to 0 kgf/cm$^2$, no space was formed between the resin 40A and the cavity wall, and the coating material feed portion 60 and the cavity 50 were not communicated with each other. The coating material 80 therefore did not flow into the cavity 50 side at this stage.

The clamping force was decreased, and then the coating material 80 was introduced into the boundary 54 between the resin 40A in the cavity 50 and the cavity wall by moving the shut-off pin 64 forward. In this case, the relationship of $$v_{F0}=\Delta v_{C3}+\Delta v_{R3}$$

was satisfied, while $\Delta v_{C3}$ was greater than that in Example 5 due to the low-pressure clamping operation. A coating having a larger thickness than that in Example 5 could be therefore formed. The introduction of the coating material was initiated 4 seconds after the dwelling period was terminated.

Conditions for forming the coating

Pressure ($p_{inj}$) for introducing the coating material: about 240 kgf/cm$^2$-G Molding pressure (P) at the time of introduction of the coating material: 100 kgf /cm$^2$ Molding pressure ($P_{peak}$) immediately after the introduction of the coating material: 240 kgf/cm$^2$ Amount of introduced coating material: 0.3 cm$^3$ Conditions for curing the coating Curing time: 120 seconds During the above curing time, the injection-molded resin was continuously cooled. After the introduction of the coating material is completed, the clamping force may be maintained at a decreased level, or it may be increased to such an extent that the formed coating is not damaged.

In the above manner, there was obtained an injection-molded article having a coating 82 of the coating composition on nearly the entire surface thereof. The coating 82 had an average thickness of 50 μm in the bottom portion of the box-shaped injection-molded article.

Figure 30:
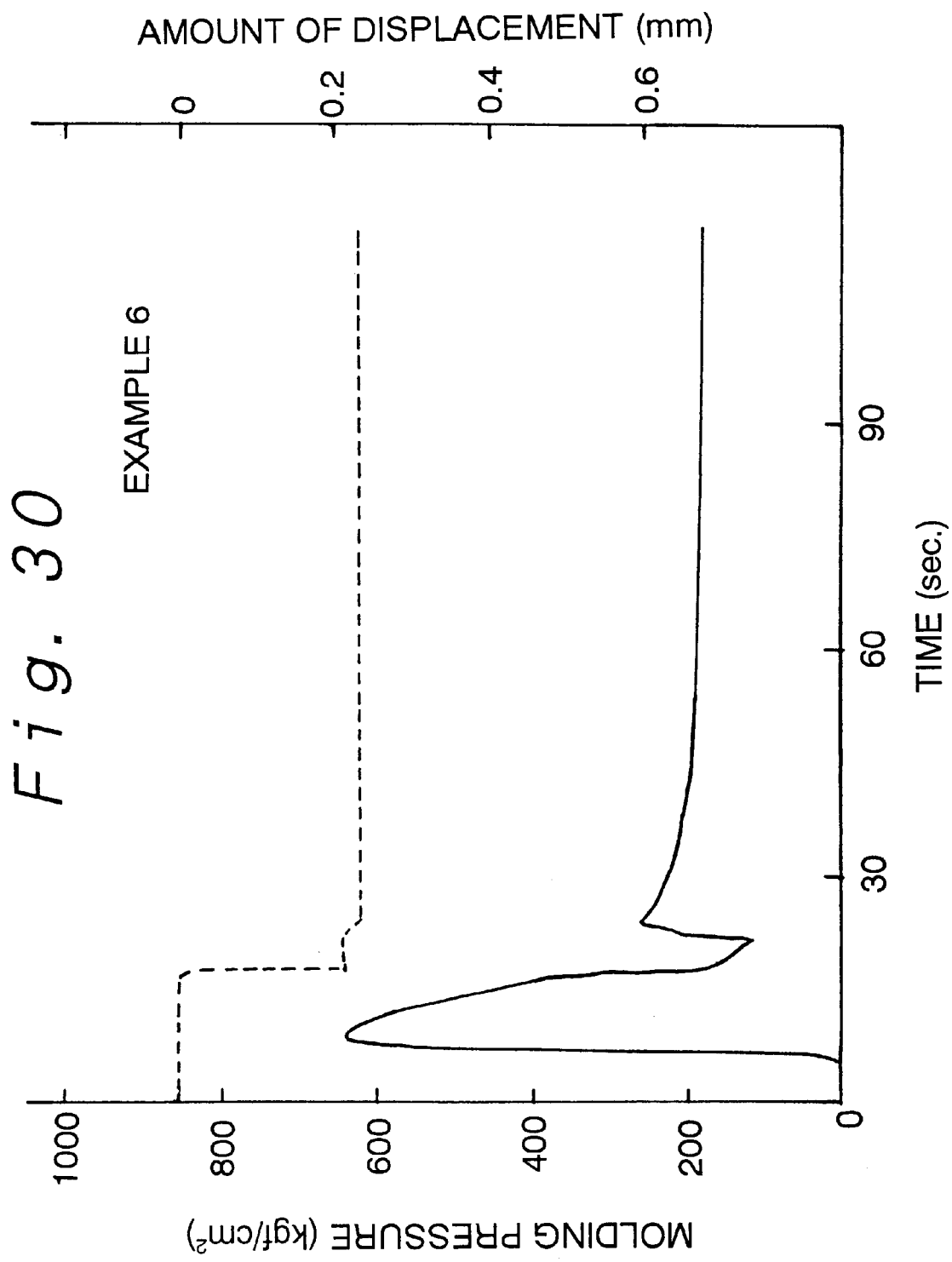
FIG. 30 shows a change of a molding pressure with time and a displacement of a movable mold member from a fixed mold member in Example 6.
Figure 31:
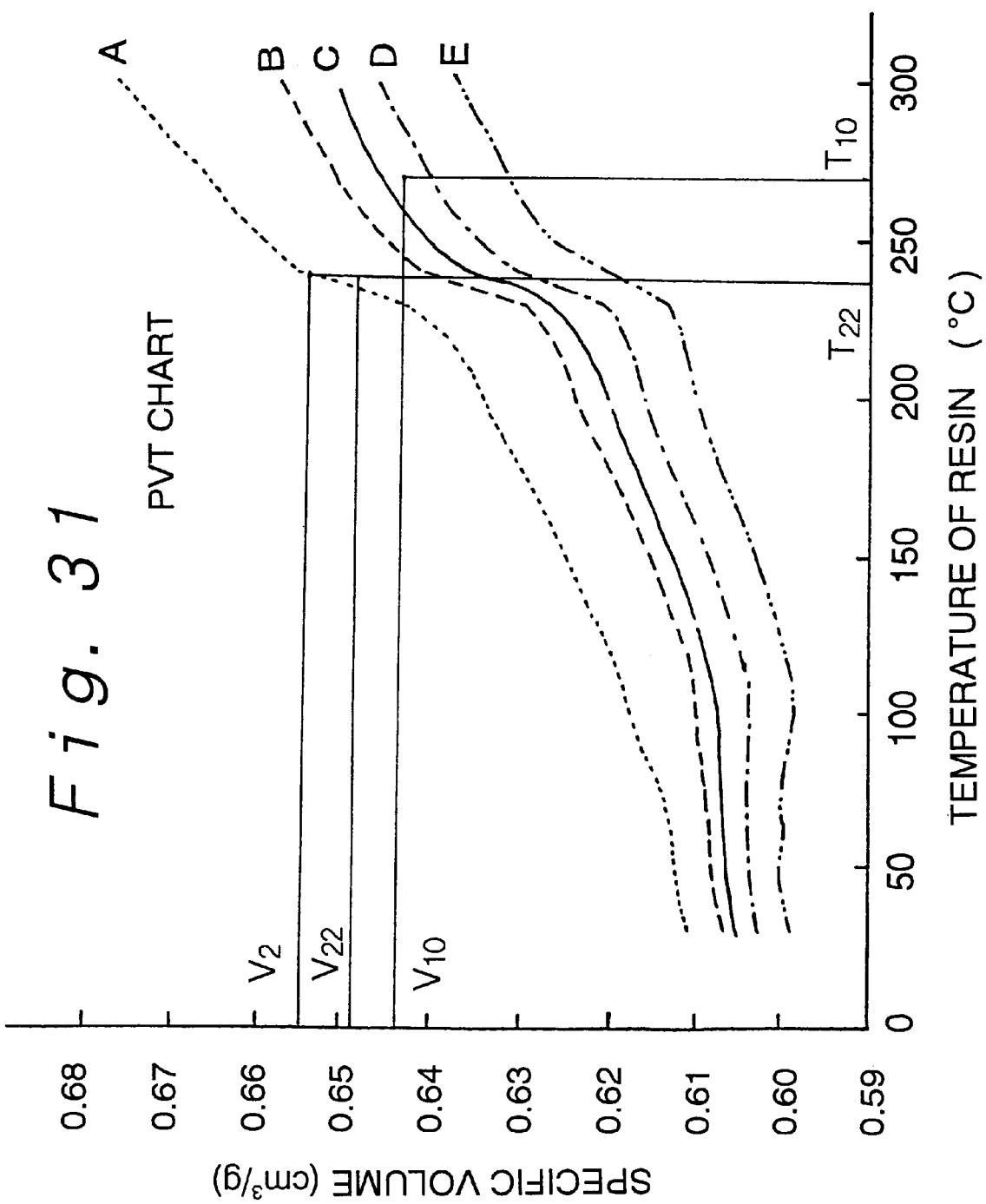
FIG. 31 is a PVT chart of a thermoplastic resin used in Example 6.

In FIG. 30, a solid line and a dotted line show a change of the molding pressure with time and a displacement of the movable mold member from the fixed mold member in Example 6. The molding pressure $P_{22}$ immediately before the introduction of the coating material was 100 kgf/cm$^2$, and the temperature $T_{22}$ of the resin in the cavity at this point of time was 235° C. FIG. 31 shows a PVT chart of the thermoplastic resin used in Example 6. The PVT chart shown in FIG. 31 is the same as that in FIG. 22. As shown in FIG. 31, when the specific volume of the thermoplastic resin under the conditions (pressure $P_{22}$=100 kgf/cm$^2$, temperature $T_{22}$=235° C.) is $V_{22}$, and when the specific volume of the thermoplastic resin under the conditions (pressure $P_0$=atmospheric pressure, temperature $T_{22}$=235° C.) is $V_2$, $V_{22}$=0.648 cm$^3$/g and $V_2$=0.653 cm$^3$/g. That is, $V_2 > V_{22}$ is satisfied. That is, the relationship of $$v_{C0}+\Delta v_{C2}=v_{R2}<v'_{R5}$$

is satisfied. Therefore, the molding pressure immediately before the introduction of the coating material does not decrease as far as 0 kgf/cm$^2$, and this pressure is recognized as $P_{comp}$. In other words, no space (gap) can be formed between the resin 40A in the cavity 50 and the cavity wall.

The molding pressure P' immediately before the mold releasing was about 190 kgf/cm$^2$. That is, the molding pressure P' immediately before the mold releasing did not decrease as far as 0 kgf/cm$^2$. This is because a predetermined amount (volume: $v_{F0}$) of the coating material was introduced into the boundary between the resin in the cavity and the cavity wall such that the relationship of $$v_{C0}+\Delta v_{C4}=v_{R4}+v_{F4}<v_{R5}+v_{F5}$$

was satisfied. Therefore, the resin continued to press the cavity wall after the introduction of the coating material, and the molding pressure did not decrease as far as 0 kgf/cm$^2$.

EXAMPLE 7

Example 7 is also concerned with the second embodiment of the present invention. Example 7 differs from Example 5 in that the clamping force before the introduction of a coating material 80 is decreased to a level lower than that at the time of injection a molten resin, that the movable mold member 26 is then spaced from the fixed mold member 22 in a state in which the cavity 50 is formed by the fixed mold member 22 and the movable mold member 26, and that the coating material 80 is then introduced into the boundary 54 between the resin 40A in the cavity 50 and the cavity wall. In Example 7, the clamping force at the time of injecting the molten resin was about 100 tons, the clamping force was removed (0 ton) before the introduction of the coating material. As a result, the distance (thickness) of the cavity in the mold opening-closing direction increased by about 0.2 mm. Further, the movable mold member 26 was spaced about 0.1 mm from the fixed mold member 22. As a result, the thickness (distance) of the cavity 50 in the mold opening-closing direction was finally 0.3 mm larger than the thickness (distance) at the time of injecting the molten resin. The fixed mold member 22 and the movable mold member 26 of an injection-molding machine suitable for use in the method of injection-molding a thermoplastic resin in Example 7 may have the same structure as that shown in FIG. 23. The form and size of the cavity are the same as those of Example 5.

Example 7 used the same molding thermoplastic resin and the same coating material as those used in Example 5. The injection-molding conditions and the dwelling operation conditions were the same as those in Example 5 and were as follows.

| Injection molding conditions | |
|---|---|
| Mold temperature: | 130° C. |
| Temperature of molten resin: | 270° C. |
| Injection pressure: | 700 kgf/cm²-G |
| Dwelling operation conditions | |
| Dwelling pressure: | 800 kgf/cm²-G |
| Dwelling time: | 9 seconds |

In Example 7, immediately after the dwelling period was terminated, the clamping force was removed by actuating the clamping hydraulic cylinder 30, and the movable mold member 26 was spaced from the fixed mold member 22 by about 0.1 mm. As a result, the thickness (distance) of the cavity 50 in the mold opening-closing direction was finally 0.3 mm. Then, the tip of the shut-off pin 64 was moved back by moving back the hydraulic cylinder 62 of the coating material introduction device, to open the coating material introduction portion 28. As a result, the coating material was filled up to the coating material introduction portion 28. However, the cavity (volume: $v_{C0}+\Delta v_{C2}$) was completely filled with the resin, and the molding pressure was not decreased to 0 kgf/cm². Therefore, no space was formed between the resin 40A and the cavity wall, and the coating material feed portion 60 and the cavity 50 were not communicated with each other. The coating material 80 therefore did not flow to the cavity 50 side at this stage.

The movable mold member 26 was spaced from the fixed mold member 22, and then, the coating material 80 was introduced into the boundary 54 between the resin 40A in the cavity 50 and the cavity wall by moving the shut-off pin 64 forward. The introduction of the coating material was initiated 4 seconds after the dwelling period was terminated. The volume of the coating material to be filled was an amount which was to satisfy $v_{F0}=\Delta v_{C3}+\Delta v_{R3}$. As compared with Example 6, $\Delta v_{C3}$ was large due to the movable mold member spacing operation. A coating having a larger thickness than that in Example 6 could be therefore formed.

Conditions for forming the coating

Pressure ($P_{inj}$) for introducing the coating material: about 200 kgf/cm²-G

Molding pressure (P) at the time of introduction of the coating material: 50 kgf/cm²

Molding pressure ($p_{peak}$) immediately after the introduction of the coating material: 200 kgf/cm²

Amount of introduced coating material:] 0.6 cm³

Conditions for curing the coating

Curing time: 120 seconds

During the above coating curing time, the injection-molded resin was continuously cooled. After the introduction of the coating material is completed, the clamping force may be maintained while it is removed, or it may be increased to such an extent that the formed coating is not damaged.

In the above manner, there was obtained an injection-molded article having a coating 82 of the coating composition on nearly the entire surface thereof. The coating 82 had an average thickness of 100 µm in the bottom portion of the box-shaped injection-molded article.

Figure 32:
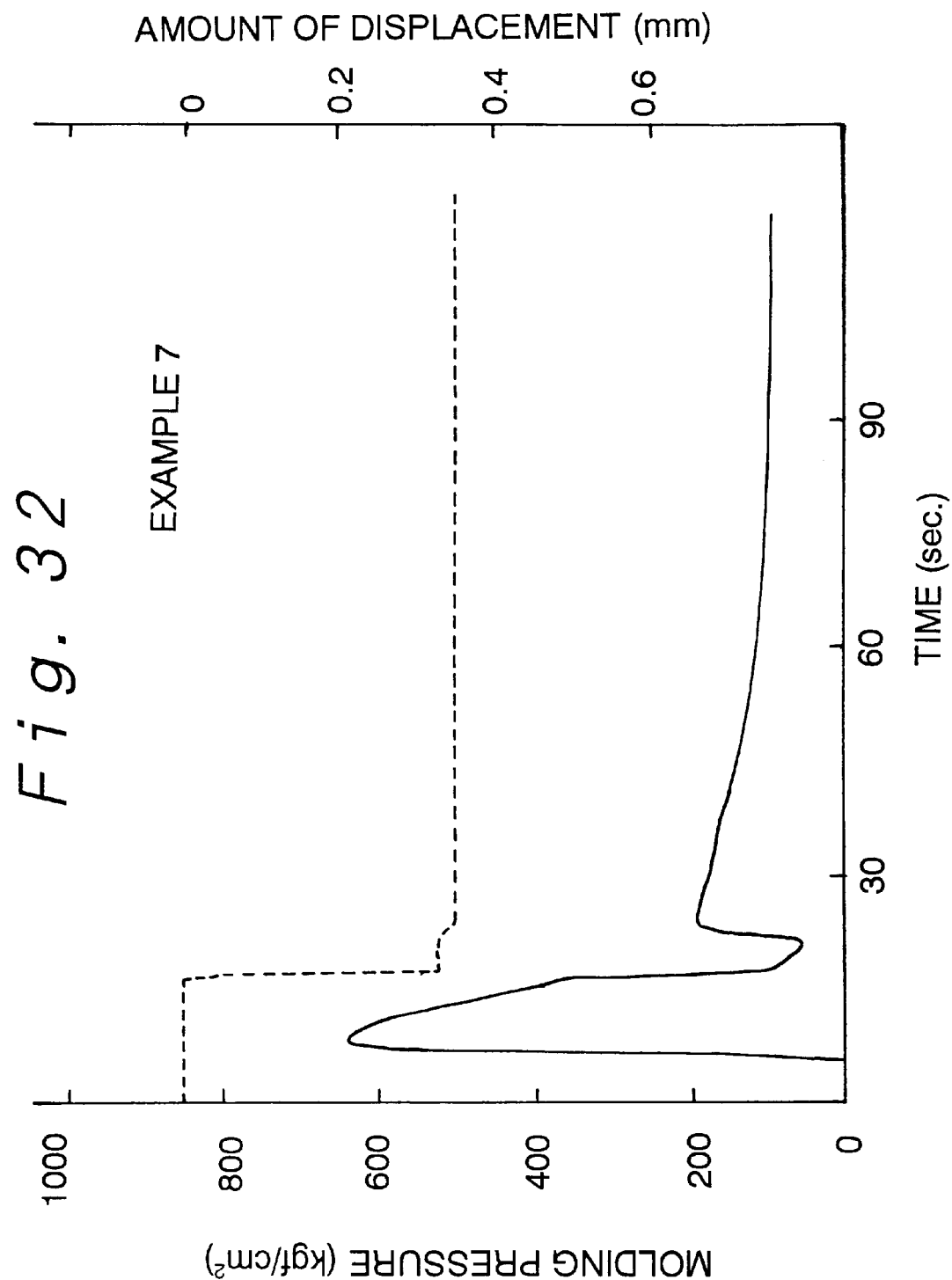
FIG. 32 schematically shows a molding pressure with time and a displacement of a movable mold member from a fixed mold member in Example 7.
Figure 33:
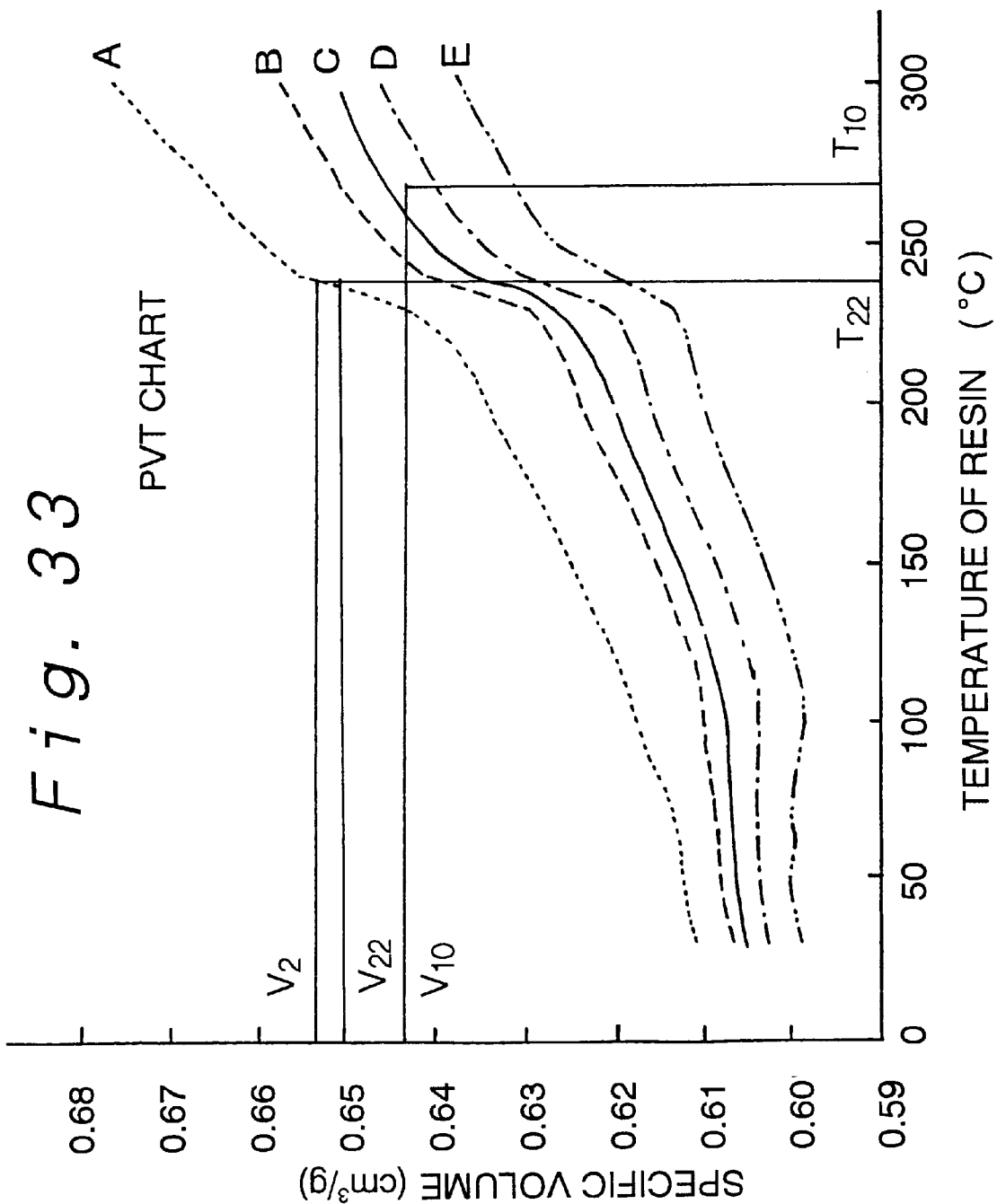
FIG. 33 is a PVT chart of a thermoplastic resin used in Example 7.

In FIG. 32, a solid line and a dotted line show a change of the molding pressure with time and a displacement of the movable mold member from the fixed mold member in Example 7. The molding pressure $P_{22}$ immediately before the introduction of the coating material was 50 kgf/cm², and the temperature $T_{22}$ of the resin in the cavity at this point of time was 235° C. FIG. 33 shows a PVT chart of the thermoplastic resin used in Example 7. The PVT chart shown in FIG. 33 is the same as that in FIG. 22. As shown in FIG. 33, when the specific volume of the thermoplastic resin under the conditions (pressure $P_{22}=50$ kgf/cm², temperature $T_{22}=235°$ C.) is $V_{22}$, and when the specific volume of the thermoplastic resin under the conditions (pressure $P_0$=atmospheric pressure, temperature $T_{22}=235°$ C.) is $V_2$, $V_{22}=0.650$ cm³/g and $V_2=0.653$ cm³/g. That is, $V_2>V_{22}$ is satisfied. That is, the relationship of $$v_{C0}+\Delta v_{C2}=v_{R2}<v'_{R5}$$

is satisfied. Therefore, the molding pressure immediately before the introduction of the coating material does not decrease as far as 0 kgf/cm², and this pressure is recognized as $P_{comp}$. In other words, no space (gap) can be formed between the resin 40A in the cavity 50 and the cavity wall.

The molding pressure P' immediately before the mold releasing was about 100 kgf/cm². That is, the molding pressure P' immediately before the mold releasing did not decrease as far as 0 kgf/cm². This is because a predetermined amount (volume: $v_{F0}$) of the coating material was introduced into the boundary between the resin in the cavity and the cavity wall such that the relationship of $$v_{C0}+\Delta v_{C4}=v_{R4}+v_{F4}<v_{R5}+v_{F5}$$

was satisfied. Therefore, the resin continued to press the cavity wall after the introduction of the coating material, and the molding pressure did not decrease as far as 0 kgf/cm².

The present invention is explained hereinabove with reference to preferred Examples, while the present invention shall not be limited thereto. The conditions and materials explained in Examples are illustrative, and may be altered as required. Further, the structure of the injection molding apparatus used in Examples is illustrative, and may be altered in design as required. For example, in the injection molding apparatus, the fixed mold member 22 is provided with the coating material introduction portion 28, while the movable mold member 26 may be provided with the coating material introduction portion 28, whereby a coating can be formed on an internal surface, for example, of a box-shaped injection-molded article. Further, the fixed mold member 22 may be provided with a coating material introduction portion and the movable mold member 26 may be provided with another coating material introduction portion, for forming a coating on an outer surface, for example, of a box-shaped molded article and a coating on an internal surface of the box-shaped molded article.

In the first embodiment of the present invention, for making it much more easier to form the space 52 between the resin 40A in the cavity 50 and the cavity wall, the dwelling operation may be carried out at a dwelling pressure lower than a generally required dwelling pressure, in a state in which the mold is closed and the clamping force is maintained. The dwelling pressure in this case is preferably 30 to 90%, preferably 40 to 60%, of the generally required dwelling pressure. The clamping force during the dwelling period may be constant or may be consecutively varied. For example, the clamping force may be varied stepwise during the solidification of a molten resin to solidness. Otherwise, after a molten resin is injected into the cavity, the dwelling operation may be carried out in a state in which the mold is closed and the clamping force is maintained, at a dwelling pressure generally required and for a period of time smaller than a dwelling time (period) generally required. In this case, the dwelling time (period) is preferably 20 to 80%, preferably 30 to 50%, of a dwelling time (period) generally required.

In the method of injection-molding a thermoplastic resin, provided by the present invention, the first embodiment or the second embodiment is properly selected such that the molding pressure $p_{peak}$ or $p_{peak}$ immediately after the introduction of the coating material is brought into the already specified range, and at the same time, the mode of the clamping operation (high-pressure clamping operation, low-pressure clamping operation or movable mold member spacing operation) can be properly selected. The best combination of the above can be determined depending upon the kind of a thermoplastic resin used, the flexibility of a resin in the cavity immediately before the introduction of a coating material, the amount of the coating material to be introduced (i.e., thickness of the coating to be formed on an injection-molded article) and the thickness and form of an injection-molded article.

With the method of injection-molding a thermoplastic resin, provided by the present invention, a variously functional coating can be formed on a resin surface in the step of injection-molding a thermoplastic resin. Further, the number of production steps up to an end product can be decreased, the production facilities can be reduced, the processing and treatment time can be decreased, and the production cost can be decreased.

In the first embodiment of the present invention, a space (gap) is formed between a resin in the cavity and the cavity wall, and a coating material is introduced into the space. A uniform coating can be therefore formed on the surface of an injection-molded article. Further, by carrying out the dwelling operation for a predetermined period of time, the occurrence of a sink mark and voids can be prevented. Moreover, the imprintability of a cavity surface to an injection-molded article can be improved. Further, by defining the specific volume of a thermoplastic resin, the value of $P_{comp}$, a compression pressure which an excess of a filled molten resin receives in the cavity, can be reliably brought into 0 kgf/cm$^2$, and a space (gap) can be reliably formed between the surface of an injection-molded article and the cavity wall. Further, by introducing a coating material after the pressure exerted on a resin in the cavity decreases to atmospheric pressure, the coating material can be reliably and uniformly introduced. By defining the value of $p_{peak}$, a coating material in an amount greater than the volume of the space can be reliably introduced (coating material overshot method), and a pressure continues to be exerted on the introduced coating material and further on the coating material which is shrinking. As a result, the imprintability of a cavity wall surface to the surface of the coating is excellent, and the gloss of the surface of the coating improves. Further, the coating has excellent adhesive ability to the thermoplastic resin.

In the second embodiment of the present invention, a coating material is introduced into the boundary between a resin in the cavity and the cavity wall before the molding pressure caused by the resin injected into the cavity completely decreases (in other words, without forming any space between the resin in the cavity and the cavity wall). As a result, a pressure reliably continues to be on the introduced coating material, so that the imprintability of the cavity wall surface to the surface of the coating is excellent and that the coating has an improved glossy surface, even if the coating material shrinks, and that the coating has improved adhesive ability to the thermoplastic resin. By defining the specific volume of the thermoplastic resin, the coating material can be reliably introduced into the boundary between the resin in the cavity and the cavity wall before the molding pressure caused by the resin injected into the cavity does not completely decrease, i.e., in a state of P>0. Further, by defining the value of the molding pressure P immediately before the introduction of the coating material, the coating material can be reliably introduced into the boundary between the resin in the cavity and the cavity wall, or by defining the value of the molding pressure $P_{peak}$ immediately after the introduction of the coating material, a pressure can continued to be on the coating material introduced into the boundary between the resin in the cavity and the cavity wall. Further, by initiating the introduction of the coating material at a point of time, or after, the dwelling period was terminated, the flowing of the molten resin into the coating material injection device can be prevented, and that the coating can be improved in adhesion to the thermoplastic resin.

What is claimed is:

1. A method of injection-molding a thermoplastic resin to form an injection-molded article with a coating from a coating material on a surface thereof, using a mold and a coating material introduction device, said mold having a fixed mold member and a movable mold member, and said coating material introduction device communicating with a cavity, said method comprising the steps of (a) clamping the mold with a clamping force, thereby forming the cavity with the movable mold member and the fixed mold member, (b) injecting a molten thermoplastic resin into the cavity, (c) after completion of injection of the molten resin and in a state in which a pressure caused by the resin injected into the cavity and exerted on a cavity wall is equivalent to 0 kgf/cm$^2$, introducing the coating material from the coating material introduction device into a space between the resin in the cavity and the cavity wall, thereby causing a pressure exerted on the cavity wall, the coating material introduced having a volume which is larger than the volume of the space between the resin in the cavity and the cavity wall immediately before the introduction of the coating material and which is larger than the volume of the space between the resin in the cavity and the cavity wall immediately before mold releasing, and (d) maintaining the pressure caused by the coating material introduced into the space and exerted on the cavity wall at a level higher than 0 kgf/cm² immediately before the mold releasing.

2. The method according to claim 1, wherein the volume of the coating material introduced is equal to the total of the volume of the space between the resin in the cavity and the cavity wall immediately before the introduction of the coating material, plus an increment of cavity volume caused by the movement of the movable mold member in a mold-opening direction caused by introducing the coating material plus a decrement of the resin volume caused by the compression of the resin in the cavity caused by introducing the coating material, and further, the volume of the coating material introduced satisfies $$v_{R4}+v_{F4}<v_{R5}+v_{F5}$$

where $v_{R4}$ is a volume of the resin in the cavity immediately before the mold releasing, $v_{F4}$ is a volume of the coating in the cavity immediately before the mold releasing, $v_{R5}$ is a volume of the injection-molded article immediately after the mold releasing, and $v_{F5}$ is a volume of the coating formed on the surface of the injection-molded article immediately after the mold releasing.

3. The method according to claim 1, wherein the method further includes the step of dwelling operation between the steps (b) and (c), and the coating material is introduced at a point of time when, or after, a dwelling period is terminated.

4. The method according to claim 3, wherein the clamping force is maintained at a constant level during a period from the initiation of the molten resin injection to the mold releasing, and a thermoplastic resin is used which satisfies $V_{12} \leq V_{10}$ in which $V_{12}$ is a specific volume of the thermoplastic resin under conditions of pressure $P_0$ and temperature $T_{12}$, $V_{10}$ is a specific volume of the thermoplastic resin under conditions of pressure $P_{10}$ and temperature $T_{10}$, $P_{10}$ is a pressure caused by the resin injected into the cavity and exerted on the cavity wall at a point of time when the increase of the weight of the thermoplastic resin in the cavity caused by the dwelling operation terminates, $T_{10}$ is a temperature of the thermoplastic resin in the cavity at the above point of time, $T_{12}$ is a temperature of the thermoplastic resin in the cavity immediately before the introduction of the coating material, and $P_0$ is atmospheric pressure.

5. The method according to claim 3, wherein, after the dwelling step is completed, a clamping force is decreased to a level lower than that of the clamping force in the step (a), and a thermoplastic resin is used which satisfies $V_{12} \leq V_{11}$, in which $V_{12}$ is a specific volume of the thermoplastic resin under conditions of pressure $P_0$ and temperature $T_{12}$, $V_{11}$ is a specific volume of the thermoplastic resin under conditions of pressure $P_{11}$ and temperature $T_{11}$, $P_{11}$ is a pressure caused by the resin injected into the cavity and exerted on the cavity wall at a point of time immediately after the clamping force of the mold is decreased, $T_{12}$ is a temperature of the thermoplastic resin in the cavity at the above point of time, $T_{12}$ is a temperature of the thermoplastic resin in the cavity immediately before the introduction of the coating material, and $P_0$ is atmospheric pressure.

6. The method according to claim 5, wherein the clamping force in the step (a) is $F_{10}$, the clamping force decreased to the lower level is $F_{11}$, and the $F_{10}$ and $F_{11}$ satisfy $0 \leq F_{11}/F_{10} \leq 0.3$.

7. The method according to claim 5, wherein the clamping force is decreased within 10 seconds before the coating material is introduced.

8. The method according to claim 4, wherein a pressure caused by the introduction of the coating material and exerted on the cavity wall is $p_{peak}$, and the $p_{peak}$ satisfies $0<p_{peak} \leq 500$ kgf/cm².

9. The method according to claim 4, wherein the thermoplastic resin is an amorphous resin which is not reinforced or an amorphous resin alloy material which is not reinforced.

10. The method according to claim 4, wherein the introduction of the coating material is initiated 10 to 120 seconds after the dwelling period is terminated.

11. The method according to claim 5, wherein a pressure caused by the introduction of the coating material and exerted on the cavity wall is $p_{peak}$ and the $p_{peak}$ satisfies $0<p_{peak} \leq 500$ kgf/cm².

12. The method according to claim 5, wherein the thermoplastic resin is an amorphous resin which is not reinforced or an amorphous resin alloy material which is not reinforced.

13. The method according to claim 5, wherein the introduction of the coating material is initiated 10 to 120 seconds after the dwelling period is terminated.

* * * * *